US012580381B2

(12) United States Patent (10) Patent No.:    US 12,580,381 B2

Peppas et al. (45) Date of Patent:    Mar. 17, 2026

(54) OVERVOLTAGE PROTECTION DEVICE MODULES AND SHEATH BONDING SYSTEMS INCLUDING SAME

(71) Applicant: RIPD IP DEVELOPMENT LTD,
Strovolos (CY)

(72) Inventors: George Peppas, Attica (GR); Michail Pitsikalis, Santorini (GR); Alexis Chorozoglou, Drama (GR); Panagiotis Raptis, Drama (GR)

(73) Assignee: RIPD IP DEVELOPMENT LTD,
Strovolos (CY)

( * ) Notice: Subject to any disclaimer, the term of this patent is extended or adjusted under 35 U.S.C. 154(b) by 177 days.

(21) Appl. No.: 18/527,710

(22) Filed:    Dec. 4, 2023

(65) Prior Publication Data

US 2025/0183656 A1    Jun. 5, 2025

(51) Int. Cl.
*H02H 9/04*    (2006.01)
(52) U.S. Cl.
CPC ............ *H02H 9/045* (2013.01); *H02H 9/043* (2013.01); *H02H 9/044* (2013.01)
(58) Field of Classification Search
CPC ........ H02H 9/045; H02H 9/043; H02H 9/044; H02H 9/042; H02H 9/08; H02H 9/005
USPC .......................................................... 361/56
See application file for complete search history.

(56) References Cited

U.S. PATENT DOCUMENTS

| | | | |
|---|---|---|---|
| 1,144,029 A | 6/1915 | Creighton | |
| 2,158,859 A | 5/1939 | Shinichiro | |
| 2,311,758 A | 2/1943 | Johansson | |
| 2,805,294 A | 9/1957 | Edmunds | |
| 2,971,132 A | 2/1961 | Nash | |
| 3,249,719 A | 5/1966 | Misare et al. | |
| 3,375,405 A | 3/1968 | Chiffee et al. | |

(Continued)

FOREIGN PATENT DOCUMENTS

| | | |
|---|---|---|
| CA | 2098365 A1 | 12/1993 |
| CH | 466427 A | 12/1968 |

(Continued)

OTHER PUBLICATIONS

O. Vlachokyriakou et al., "A New Approach for Sheath Voltage Limiters in Medium Voltage systems," 2022 36th International Conference on Lightning Protection (ICLP), Cape Town, South Africa, 2022, pp. 518-522, doi: 10.1109/ICLP56858.2022.9942504 (Year: 2022).*

(Continued)

*Primary Examiner* — Sreeya Sreevatsa
(74) *Attorney, Agent, or Firm* — Myers Bigel, P.A.

(57)    ABSTRACT

A surge protective device includes a link box including a plurality of connectors and one or more sheath voltage limiter (SVL) circuits. The plurality of connectors are configured to interface with a plurality of cables, each of the plurality of cables including an inner conductor and a conductive sheath surrounding the inner conductor. The one or more sheath voltage limiter (SVL) circuits is/are configured for connection to the plurality of terminals and an electrical ground, the one or more SVL circuits having a residual voltage that is less than a minimum induced voltage generated during a power frequency fault on one or more of the plurality of conductive sheaths, but greater than a nominal operating voltage on the one or more of the plurality of conductive sheaths.

20 Claims, 32 Drawing Sheets

(56)                References Cited

U.S. PATENT DOCUMENTS

| | | | |
|---|---|---|---|
| 3,522,570 A | 8/1970 | Wanaselja | |
| 3,711,794 A | 1/1973 | Tasca et al. | |
| 3,743,996 A | 7/1973 | Harnden | |
| 3,813,577 A | 5/1974 | Kawiecke | |
| 3,863,111 A | 1/1975 | Martzloff | |
| 4,015,228 A | 3/1977 | Eda et al. | |
| 4,023,133 A | 5/1977 | Knapp | |
| 4,085,397 A | 4/1978 | Yagher, Jr. | |
| 4,092,694 A | 5/1978 | Stetson | |
| 4,217,618 A | 8/1980 | Kellenbenz et al. | |
| 4,240,124 A | 12/1980 | Westrom | |
| 4,241,374 A | 12/1980 | Gilberts | |
| 4,249,224 A | 2/1981 | Baumbach | |
| 4,288,833 A | 9/1981 | Howell | |
| 4,355,345 A | 10/1982 | Franchet | |
| 4,425,017 A | 1/1984 | Chan | |
| 4,493,003 A | 1/1985 | Mickelson et al. | |
| 4,571,656 A | 2/1986 | Ruckman | |
| 4,595,635 A | 6/1986 | Dubrow et al. | |
| 4,600,261 A | 7/1986 | Debbaut | |
| 4,638,284 A | 1/1987 | Levinson | |
| 4,677,518 A | 6/1987 | Hershfield | |
| 4,701,574 A | 10/1987 | Shimirak et al. | |
| 4,906,963 A | 3/1990 | Ackermann et al. | |
| 4,908,730 A | 3/1990 | Westrom | |
| 4,956,696 A | 9/1990 | Hoppe et al. | |
| 5,006,950 A | 4/1991 | Allina | |
| 5,130,884 A | 7/1992 | Allina | |
| 5,172,296 A | 12/1992 | Kaczmarek | |
| 5,311,164 A | 5/1994 | Ikeda et al. | |
| 5,436,786 A | 7/1995 | Pelly et al. | |
| 5,519,564 A | 5/1996 | Carpenter | |
| 5,523,916 A | 6/1996 | Kaczmarek | |
| 5,529,508 A | 6/1996 | Chiotis et al. | |
| 5,588,856 A | 12/1996 | Collins et al. | |
| 5,608,596 A | 3/1997 | Smith et al. | |
| 5,621,599 A | 4/1997 | Larsen et al. | |
| 5,652,690 A | 7/1997 | Mansfield et al. | |
| 5,721,664 A | 2/1998 | Uken et al. | |
| 5,724,221 A | 3/1998 | Law | |
| 5,745,322 A | 4/1998 | Duffy et al. | |
| 5,781,394 A | 7/1998 | Lorenz et al. | |
| 5,808,850 A | 9/1998 | Carpenter | |
| 5,812,047 A | 9/1998 | Van | |
| 5,936,824 A | 8/1999 | Carpenter | |
| 5,982,597 A | 11/1999 | Webb | |
| 5,990,778 A | 11/1999 | Struempler et al. | |
| 6,038,119 A | 3/2000 | Atkins et al. | |
| 6,094,128 A | 7/2000 | Bennett et al. | |
| 6,172,865 B1 | 1/2001 | Boy et al. | |
| 6,175,480 B1 | 1/2001 | Karmazyn | |
| 6,222,433 B1 | 4/2001 | Ramakrishnan et al. | |
| 6,226,162 B1 | 5/2001 | Kladar et al. | |
| 6,226,166 B1 | 5/2001 | Gumley et al. | |
| 6,430,019 B1 | 8/2002 | Martenson et al. | |
| 6,430,020 B1 | 8/2002 | Atkins et al. | |
| 6,459,559 B1 | 10/2002 | Christofersen | |
| 6,556,402 B2 | 4/2003 | Kizis et al. | |
| 6,614,640 B2 | 9/2003 | Richter et al. | |
| 6,930,871 B2 | 8/2005 | Macanda | |
| 7,433,169 B2 | 10/2008 | Kamel et al. | |
| 7,558,041 B2 | 7/2009 | Lagnoux | |
| 7,684,166 B2 | 3/2010 | Donati et al. | |
| 7,738,231 B2 | 6/2010 | Lagnoux | |
| 8,493,170 B2 | 7/2013 | Zaeuner et al. | |
| 8,659,866 B2 | 2/2014 | Douglass et al. | |
| 8,699,197 B2 | 4/2014 | Douglass et al. | |
| 8,743,525 B2 | 6/2014 | Xepapas et al. | |
| 8,766,762 B2 | 7/2014 | Depping et al. | |
| 8,929,042 B2 | 1/2015 | Pfitzer et al. | |
| 9,349,548 B2 | 5/2016 | Juricev | |
| 9,355,763 B2 | 5/2016 | Xu | |
| 9,570,260 B2 | 2/2017 | Yang et al. | |
| 9,634,554 B2 | 4/2017 | Falk et al. | |
| 9,750,122 B1 | 8/2017 | Elizondo-Decanini | |
| 9,906,017 B2 | 2/2018 | Tsovilis et al. | |
| 10,050,436 B2 | 8/2018 | Buchanan | |
| 10,447,026 B2 | 10/2019 | Kostakis et al. | |
| 10,707,678 B2 | 7/2020 | Tavcar et al. | |
| 11,150,291 B1 * | 10/2021 | Smith | G01R 31/008 |
| 11,527,879 B2 | 12/2022 | Politis et al. | |
| 11,723,145 B2 | 8/2023 | Znideric et al. | |
| 11,862,967 B2 | 1/2024 | Peppas et al. | |
| 2002/0018331 A1 | 2/2002 | Takahashi | |
| 2002/0024792 A1 | 2/2002 | Cantagrel | |
| 2002/0159212 A1 | 10/2002 | Oughton | |
| 2003/0184926 A1 | 10/2003 | Wu et al. | |
| 2004/0150937 A1 | 8/2004 | Bobert et al. | |
| 2004/0257742 A1 | 12/2004 | Zeller et al. | |
| 2005/0185356 A1 | 8/2005 | Durth | |
| 2005/0231872 A1 | 10/2005 | Schimanski et al. | |
| 2006/0034031 A1 | 2/2006 | Lehuede | |
| 2006/0245125 A1 | 11/2006 | Aszmus | |
| 2006/0291127 A1 | 12/2006 | Kim et al. | |
| 2007/0217106 A1 | 9/2007 | Lagnoux | |
| 2008/0043395 A1 | 2/2008 | Donati et al. | |
| 2008/0049370 A1 | 2/2008 | Adachi et al. | |
| 2009/0302992 A1 | 12/2009 | Cernicka | |
| 2011/0013330 A1 | 1/2011 | Crevenat et al. | |
| 2011/0193674 A1 | 8/2011 | Zaeuner et al. | |
| 2011/0248816 A1 | 10/2011 | Duval et al. | |
| 2012/0050935 A1 | 3/2012 | Douglass et al. | |
| 2012/0086539 A1 | 4/2012 | Duval et al. | |
| 2012/0086540 A1 | 4/2012 | Duval et al. | |
| 2012/0206848 A1 | 8/2012 | Gillespie et al. | |
| 2012/0250205 A1 | 10/2012 | Pfitzer et al. | |
| 2012/0268850 A1 | 10/2012 | Rainer et al. | |
| 2013/0038976 A1 | 2/2013 | Hagerty | |
| 2013/0200617 A1 * | 8/2013 | Smith | H02J 3/381 |
| | | | 290/43 |
| 2013/0200986 A1 | 8/2013 | Koprivsek | |
| 2013/0208387 A1 | 8/2013 | Nguyen | |
| 2013/0265685 A1 | 10/2013 | Zauner et al. | |
| 2013/0335869 A1 | 12/2013 | Xepapas et al. | |
| 2014/0010704 A1 | 1/2014 | Ishida et al. | |
| 2014/0092514 A1 | 4/2014 | Chen | |
| 2014/0292472 A1 | 10/2014 | Qin et al. | |
| 2014/0327990 A1 | 11/2014 | Juricev | |
| 2015/0014538 A1 | 1/2015 | Holliday | |
| 2015/0103462 A1 | 4/2015 | Depping | |
| 2015/0107972 A1 | 4/2015 | Oh | |
| 2015/0108899 A1 | 4/2015 | Ramabhadran et al. | |
| 2015/0270086 A1 | 9/2015 | Chen | |
| 2015/0280420 A1 | 10/2015 | Mao | |
| 2015/0349523 A1 | 12/2015 | Tsovilis et al. | |
| 2016/0087520 A1 | 3/2016 | Falk et al. | |
| 2016/0276821 A1 | 9/2016 | Politis et al. | |
| 2016/0329701 A1 | 11/2016 | Bandel | |
| 2017/0311462 A1 | 10/2017 | Kamensek et al. | |
| 2018/0138697 A1 | 5/2018 | Crevenat et al. | |
| 2018/0138698 A1 | 5/2018 | Tsovilis et al. | |
| 2018/0151318 A1 | 5/2018 | Kamensek et al. | |
| 2018/0183230 A1 | 6/2018 | Kostakis et al. | |
| 2018/0183232 A1 * | 6/2018 | Tavcar | H02H 9/044 |
| 2018/0330908 A1 | 11/2018 | Vrhunc et al. | |
| 2018/0341024 A1 | 11/2018 | Shetty et al. | |
| 2019/0080826 A1 | 3/2019 | Kamensek et al. | |
| 2019/0099132 A1 | 4/2019 | Mulinti et al. | |
| 2020/0035386 A1 | 1/2020 | Hsu | |
| 2020/0036185 A1 | 1/2020 | Tsovilis et al. | |
| 2022/0166199 A1 * | 5/2022 | Burks | H02G 15/1055 |

FOREIGN PATENT DOCUMENTS

| | | | |
|---|---|---|---|
| CN | 106026067 A | 10/2016 | |
| DE | 1018953 B | 11/1957 | |
| DE | 3111096 A1 | 9/1982 | |
| DE | 3428258 A1 | 2/1986 | |
| DE | 4235329 A1 | 4/1994 | |
| DE | 69201021 T2 | 2/1995 | |
| DE | 4438593 A1 | 5/1996 | |
| DE | 19823446 A1 | 11/1999 | |
| DE | 19839422 A1 | 3/2000 | |
| DE | 19843519 A1 | 4/2000 | |

(56) References Cited

FOREIGN PATENT DOCUMENTS

| DE | 202004006227 U1 | 9/2004 |
| DE | 10323220 A1 | 12/2004 |
| DE | 102005048003 A1 | 4/2007 |
| DE | 102006003274 A1 | 7/2007 |
| DE | 202008004699 U1 | 6/2008 |
| DE | 102007014336 A1 | 10/2008 |
| DE | 102007030653 A1 | 2/2009 |
| DE | 102008017423 A1 | 10/2009 |
| DE | 102008026555 A1 | 12/2009 |
| DE | 102009004704 A1 | 3/2010 |
| DE | 102012004678 A1 | 9/2013 |
| DE | 202006021210 U1 | 9/2013 |
| DE | 102013103753 A1 | 10/2013 |
| DE | 102013011216 B3 | 10/2014 |
| DE | 102013107807 B3 | 1/2015 |
| DE | 102013021936 B3 | 2/2015 |
| DE | 102014016938 B3 | 2/2016 |
| DE | 102014016830 A1 | 3/2016 |
| EP | 0108518 A2 | 5/1984 |
| EP | 0203737 A2 | 12/1986 |
| EP | 0335479 A2 | 10/1989 |
| EP | 0445054 A1 | 9/1991 |
| EP | 0462694 A2 | 12/1991 |
| EP | 0516416 A1 | 12/1992 |
| EP | 0603428 A1 | 6/1994 |
| EP | 0785625 A2 | 7/1997 |
| EP | 0963590 A1 | 12/1999 |
| EP | 1094550 A2 | 4/2001 |
| EP | 1102371 A1 | 5/2001 |
| EP | 1116246 A1 | 7/2001 |
| EP | 1148530 A1 | 10/2001 |
| EP | 1355327 A2 | 10/2003 |
| EP | 1458072 A1 | 9/2004 |
| EP | 1261977 B1 | 8/2005 |
| EP | 1798742 A1 | 6/2007 |
| EP | 1855365 A1 | 11/2007 |
| EP | 2075811 A2 | 7/2009 |
| EP | 2201654 A1 | 6/2010 |
| EP | 2419976 A2 | 2/2012 |
| EP | 2707892 A1 | 3/2014 |
| EP | 2725588 A1 | 4/2014 |
| EP | 2953142 A1 | 12/2015 |
| EP | 2954538 A1 | 12/2015 |
| EP | 3001525 A1 | 3/2016 |
| EP | 3240132 A1 | 11/2017 |
| EP | 3460938 A1 | 3/2019 |
| EP | 3989379 A1 | 4/2022 |
| EP | 4060842 A1 * | 9/2022 | ............. H02H 9/044 |
| FR | 2574589 A1 | 6/1986 |
| FR | 2622047 A1 | 4/1989 |
| FR | 2897231 A1 | 8/2007 |
| JP | S60187002 A | 9/1985 |
| JP | S60226103 A | 11/1985 |
| JP | S60258905 A | 12/1985 |
| JP | S61198701 A | 9/1986 |
| JP | H01176687 A | 7/1989 |
| JP | H05176445 A | 7/1993 |
| JP | H09326546 A | 12/1997 |
| JP | 2002525861 A | 8/2002 |
| JP | 2002525862 A | 8/2002 |
| JP | 2005294459 A | 10/2005 |
| JP | 2012204473 A | 10/2012 |
| JP | 5493065 B2 | 3/2014 |
| SI | 9700277 A | 4/1999 |
| SI | 9700332 A | 6/1999 |
| SI | 20781 A | 6/2002 |
| SI | 20782 A | 6/2002 |
| SI | 22030 A | 10/2006 |
| SI | 23303 A | 8/2011 |
| SI | 23749 A | 11/2012 |
| SI | 24371 A | 11/2014 |
| WO | 8800603 A2 | 1/1988 |
| WO | 9005401 A1 | 5/1990 |
| WO | 9515600 A1 | 6/1995 |
| WO | 9524756 A1 | 9/1995 |
| WO | 9742693 A1 | 11/1997 |
| WO | 9838653 A1 | 9/1998 |
| WO | 0017892 A1 | 3/2000 |
| WO | 2007117163 A1 | 10/2007 |
| WO | 2008009507 A1 | 1/2008 |
| WO | 2008104824 A1 | 9/2008 |
| WO | 2010120834 A2 | 10/2010 |
| WO | 2011102811 A2 | 8/2011 |
| WO | 2012026888 A1 | 3/2012 |
| WO | 2012154134 A1 | 11/2012 |
| WO | 2013044961 A1 | 4/2013 |
| WO | 2016101776 A1 | 6/2016 |
| WO | 2016110360 A1 | 7/2016 |

OTHER PUBLICATIONS https://www.powerandcables.com/svls-sheath-voltage-limiters-for-protection-of-mv-hv-cables/ Apr. 29, 2019 (Year: 2019).*
Data Book Library 1997 Passive Components, Siemens Matsushita Components (pp. 15-17, 26-32, 36-37, 39, 161, 166, 167, 169, 171-174) (1997).
FormexTM GK/Formex Product Data Flame Retardant Polypropylene Sheet, ITW Formex (4 pages) (2002).
Raycap "RayvossTM Transient Voltage Surge Suppression System" webpage <http://www.raycap.com/surge/rayvoss.htm> (1 page) (undated, accessed on Nov. 29, 2005) (Date Unknown; Admitted Prior Art).
Translation of DIN-Standards, Built-In Equipment for Electrical Installations; Overall Dimensions and Related Mounting Dimensions (15 pages) (Dec. 1988).
VAL-MS-T1/T2 335/12.5/3+1, Extract from the online catalog, Phoenix Contact GmbH & Co. KG, http://catalog.phoenixcontact.net/phoenix/treeViewClick.do?UID=2800184 (7 pages) (May 22, 2014).
"RayvossTM "Applications" webpage http://www.rayvoss.com/applications.htm accessed on Nov. 29, 2005 (4 pages) (undated)".
Beitz, W. , et al., "Chapter 1: Mechanical Design Elements—Component Connections", in Dubbel Taschenbuch für den Maschinenbau. Springer, Germany, 1997, G24-G25.
DuPont , "DuPont 4300 Series Resistors", Technical Data Sheet, May 2013, (3 pages).
Oberg, Erik , et al., "Soldering and Brazing", Machinery's Handbook 27th Edition. McCauley, C. J., Heald, R. L., and Hussain, M. I. (Eds.). Industrial Press Inc., New York, NY, 2004, 1380-1382.
Raycap, "Revolutionary Lightning Protection Technology", Raycap Corporation Press Release, webpage, http://www.raycap.com/news/020930.htm accessed on Nov. 29, 2005 (Date Unknown; Admitted Prior Art), (1 page).
Raycap , "Strikesorb® 30 Series OEM Surge Suppression Solutions", brochure, Apr. 17, 2009, (2 pages).
Raycap , "The Next Generation Surge Protection Rayvoss™", brochure, May 4, 2012, (4 pages).
Raycap , "The Ultimate Overvoltage Protection Rayvoss™", brochure, 2005, (4 pages).
Raycap , "The Ultimate Overvoltage Protection Rayvoss™", brochure, Jan. 2009, (4 pages).
Raycap , "The Ultimate Overvoltage Protection: RayvossTM", brochure (Date Unknown; Admitted Prior Art), (4 pages).
Rayvosstm , "Frequently Asked Questions", webpage, http://www.rayvoss.com/faq.htm accessed on Nov. 29, 2005 (Date Unknown; Admitted Prior Art), (2 pages).
Rayvosstm , "Technical Information", webpage, http://www.rayvoss.com/tech_info.htm accessed on Nov. 29, 2005 (Date Unknown; Admitted Prior Art), (3 pages).
Rayvosstm , "The Ultimate Overvoltage Protection", webpage, http://www.rayvoss.com accessed on Nov. 29, 2005 (Date Unknown; Admitted Prior Art), (2 pages).
Extended European Search Report corresponding to European Patent Application No. 24203404.9 (9 pages) (dated Apr. 15, 2025).
Hitachi ABB "Application Note 3.1: Cable sheaths overvoltage protection", IEEE Draft WGDS; 1328025400445, IEEE-SA Imeet Central, Piscataway, NJ USA, vol. SPDC, Oct. 4, 2023, pp. 1-14, URL: https://ieee-sa.imeetcentral.com/p/aQA H02HAAAAFEew_.

(56) References Cited

OTHER PUBLICATIONS

Power Solutions Pty Ltd "Link Boxes", IEEE Draft WGDS;
861536632759, IEEE-SA Imeet Central, Piscataway, NJ USA, vol.
G6, Jun. 4, 2019 (Jun. 4, 2019), pp. 1-12, Retrieved from the
Internet: URL:https://ieee-sa.imeetcentral.com/p/aQAAAAAD3l8v.
Vlachokyriakou, et al., "A New Approach for Sheath Voltage
Limiters in Medium Voltage systems", 36th International Confer-
ence on Lighting Protection, pp. 518-522 (2022).

* cited by examiner

PHASE L2
PHASE L2
PHASE L3
METALLIC SHEATH
COAXIAL MEDIUM CABLE

P1, P2, P3

OVERVOLTAGE PROTECTION DEVICE MODULES AND SHEATH BONDING SYSTEMS INCLUDING SAME

FIELD OF THE INVENTION

The present invention relates to overvoltage protection devices and, more particularly, to overvoltage protection devices including varistors.

BACKGROUND OF THE INVENTION

In some power generation and transmission systems, electricity is transmitted at medium voltage (in the range of from 5 kV to 36 kV) over medium voltage (MV) cables. For example, power from power sources such as photovoltaic parks and wind turbines may be transmitted to a utility substation over MV cables. The MV cables include a main electrical conductor, an insulation layer surrounding the main conductor with two dielectric layers inside and outside of the insulation layer, an electrically conductive metal shield/sheath surrounding the insulation layer, and a jacket surrounding the sheath.

In such applications, induced sheath voltages and induced circulating currents in the sheath can cause problems. To mitigate these effects, cable sheath bonding or earthing techniques are employed. These sheath bonding techniques include single-point bonding, solid-bonding, and cross-bonding.

In solid bonding, each cable sheath is solidly connected to earth ground at both ends of the sheath. Substantial circulating currents may be induced in the sheath by the current conducted through the main conductor of the MV cable, resulting in significant power losses and heat generation.

In single-point bonding, each cable sheath is solidly earth grounded at a first end and the opposing second end of the sheath is isolated from ground. The second end is typically connected to a sheath voltage limiter (SVL) that is connected to ground to provide surge protection from induced lightning events (mainly 8/20 us surge current waveform). The SVL typically includes a varistor-based surge arrestor that shorts the sheath to ground in response to a sufficient overvoltage (corresponding surge event) on the sheath. The connections and SVLs may be provided in a link box to which the sheaths are connected via connecting cables.

In cross-bonding, each sheath of a major section of cable is severed or sectionalized into three minor (as an example, it could be less or more depending on the cross-bonding scheme selected form the engineer) sections. The outer ends of the minor sections or outer ends of the major section of the cable are solidly earth grounded. The inner ends of the minor sections are cross-connected between sheaths. The cross-connected ends are typically connected to an SVL that is connected to ground to provide Temporary Overvoltage (TOV) protection. The cross-connections and SVLs may be performed in a link box. The sheaths are connected to the cross-connections via connecting cables. When the minor sections have equal lengths, the induced sheath voltages in the minor sections are equal in magnitude, but 120° out of phase with each other. When the sheaths are cross-connected, each sheath circuit contains one section from each phase, such that the total voltage in each circuit sums to approximately zero. By solidly bonding the sheaths at the ends of the major section of cable, the net voltage in the loop will be approximately zero and the circulating currents will be zero in an idealized case.

SUMMARY

According to some embodiments, a sheath bonding system includes a link box including a plurality of connectors and one or more sheath voltage limiter (SVL) circuits. The plurality of connectors are configured to interface with a plurality of cables, each of the plurality of cables including an inner conductor and a conductive sheath surrounding the inner conductor. The one or more sheath voltage limiter (SVL) circuits is/are configured for connection to the plurality of terminals and an electrical ground, the one or more SVL circuits having a residual voltage that is less than a minimum induced voltage generated during a power frequency fault on one or more of the plurality of conductive sheaths, but greater than a nominal operating voltage on the one or more of the plurality of conductive sheaths.

According to some embodiments, the one or more SVL circuits has a maximum continuous operating voltage that is less than the minimum induced voltage generated during the power frequency fault on the one or more of the plurality of cables, but greater than the nominal operating voltage on the one or more of the plurality of cables.

In some embodiments, the maximum continuous operating voltage is about 10% greater than the nominal operating voltage on the one or more of the plurality of conductive sheaths.

According to some embodiments, the plurality of connectors are configured to connect the conductive sheaths of the respective ones of the plurality of cables to each other in a cross-connect arrangement.

In some embodiments, the plurality of connectors are configured to connect the conductive sheaths to the one or more SVL circuits in a single point bonding arrangement.

According to some embodiments, the plurality of cables are configured to operate as medium voltage power cables.

In some embodiments, medium voltage is in a range of about 5 kV to about 36 kV.

According to some embodiments, the one or more SVL circuits each has a withstand energy characteristic associated therewith, and each of the SVL circuits is configured to non-destructively process a power frequency fault or a transient overvoltage event when the power frequency fault or the transient overvoltage event does not exceed the withstand energy characteristic of the respective SVL circuit.

In some embodiments, the withstand characteristic of each of the one or more SVL circuits is 33 kA applied in a 10/350 μs profile.

According to some embodiments, the plurality of cables are arranged in a trefoil formation.

According to some embodiments, the one or more SVL circuits comprise one or more varistors.

According to some embodiments, each of the one or more varistors includes a first fail-safe system and a second fail-safe system.

In some embodiments, the first fail-safe system is configured to arc in response to current received through the respective varistor.

In some embodiments, the second fail-safe system is configured to operate in response to heat generated by current received through the respective varistor.

In some embodiments, the second fail-safe system comprises a meltable member.

According to some embodiments, the minimum induced voltage generated during a power frequency fault is about 500-1000 volts.

In some embodiments, the residual voltage is in a range of about 80%-90% of the minimum induced voltage generated during the power frequency fault.

According to some embodiments, the plurality of cables are configured to operate as high voltage power cables. In some embodiments, high voltage is in a range of about 150 kV to about 400 kV.

According to some embodiments, a sheath bonding system, comprises: a plurality of cables, each of the plurality of cables including an inner conductor and a conductive sheath surrounding the inner conductor; and one or more sheath voltage limiter (SVL) circuits configured for connection to the plurality of cables and an electrical ground, the one or more SVL circuits having a residual voltage that is less than a minimum induced voltage generated during a power frequency fault on one or more of the plurality of conductive sheaths, but greater than a nominal operating voltage on the one or more of the plurality of conductive sheaths.

In some embodiments, the one or more SVL circuits has a maximum continuous operating voltage that is less than the minimum induced voltage generated during the power frequency fault on the one or more of the plurality of cables, but greater than the nominal operating voltage on the one or more of the plurality of cables.

In some embodiments, the maximum continuous operating voltage is about 10% greater than the nominal operating voltage on the one or more of the plurality of conductive sheaths.

In some embodiments, the conductive sheaths of the respective ones of the plurality of cables are connected to each other in a cross-connect arrangement.

In some embodiments, the conductive sheaths are connected to the one or more SVL circuits in a single point bonding arrangement.

In some embodiments, the minimum induced voltage generated during a power frequency fault is about 500-1000 volts.

In some embodiments, the residual voltage is in a range of about 80%-90% of the minimum induced voltage generated during the power frequency fault.

According to some embodiments, a sheath bonding system comprises: a link box comprising a plurality of terminals and a plurality of connectors connected to the plurality of terminals; a plurality of cables, each of the plurality of cables including an inner conductor and a conductive sheath surrounding the inner conductor; a plurality of linking cables configured to connect the plurality of cables to the plurality of connectors; and one or more sheath voltage limiter (SVL) circuits configured for connection to the plurality of terminals and an electrical ground, the one or more SVL circuits having a residual voltage that is less than a minimum induced voltage generated during a power frequency fault on one or more of the plurality of conductive sheaths, but greater than a nominal operating voltage on the one or more of the plurality of conductive sheaths.

In some embodiments, the plurality of conductive sheaths are sectionalized into sheath minor sections, the sheath bonding system further comprising: a plurality of cable joints, respective ones of the plurality of cable joints being configured to electrically isolate adjacent ends of the sheath minor sections from one another.

In some embodiments, the plurality of cable joints are further configured to electrically connect the plurality of linking cables to the sheath minor sections.

In some embodiments, the plurality of connectors are configured to connect the conductive sheaths of the respective ones of the plurality of cables to each other in a cross-connect arrangement.

In some embodiments, the plurality of connectors are configured to connect the conductive sheaths to the one or more SVL circuits in a single point bonding arrangement.

According to some embodiments, a power generation system comprises: an electrical power source; a transmission grid; a plurality of cables configured to couple the electrical power source to the transmission grid, each of the plurality of transmission cables including an inner conductor and a conductive sheath surrounding the inner conductor; and one or more sheath voltage limiter (SVL) circuits configured for connection to the plurality of cables and an electrical ground, the one or more SVL circuits having a residual voltage that is less than a minimum induced voltage generated during a power frequency fault on one or more of the plurality of conductive sheaths, but greater than a nominal operating voltage on the one or more of the plurality of conductive sheaths.

In some embodiments, the power generation system further comprises: a medium voltage transformer configured to couple the electrical power source to the plurality of cables; and generator cables that are configured to couple the medium voltage transformer to the electrical power source.

In some embodiments, the power generation system further comprises: a medium voltage-to-high voltage transformer configured to couple the plurality of cables to the transmission grid; wherein the plurality of cables are further configured to couple the medium voltage transformer to the medium voltage-to-high voltage transformer.

In some embodiments, the power generation system further comprises: utility cables that are configured to couple the medium voltage-to-high voltage transformer to the transmission grid.

BRIEF DESCRIPTION OF THE DRAWINGS

The accompanying drawings, which form a part of the specification, illustrate embodiments of the present invention.

DETAILED DESCRIPTION OF EMBODIMENTS OF THE INVENTION

Figure 1:
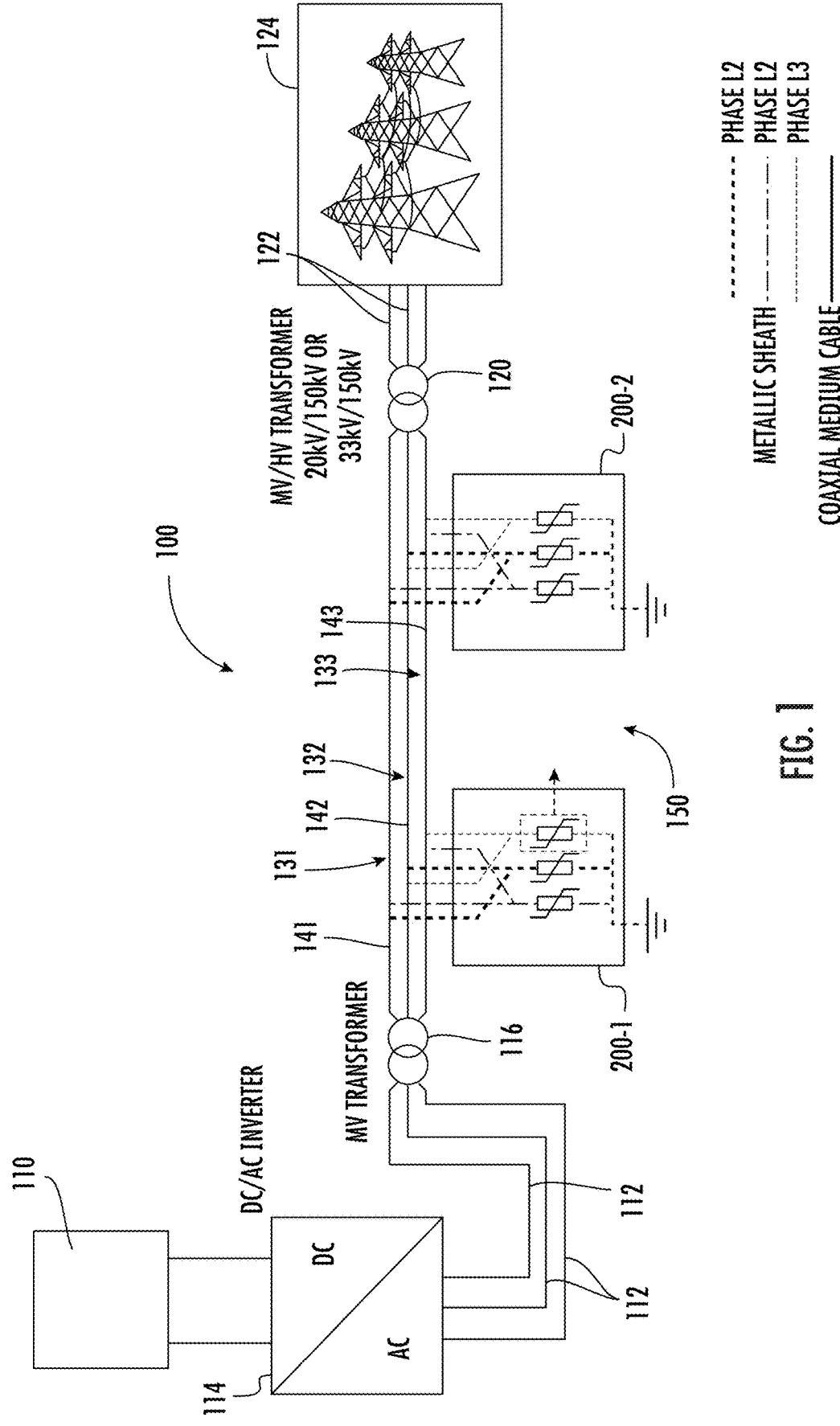
FIG. 1 is a schematic view of an electrical power generation system including a sheath bonding system according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art. It is noted that aspects described with respect to one embodiment may be incorporated in different embodiments although not specifically described relative thereto. That is, all embodiments and/or features of any embodiments can be combined in any way and/or combination.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams. Alternatively, a unitary object can be a composition composed of multiple parts or components secured together at joints or seams.

As used herein, the term "wafer" means a substrate having a thickness which is relatively small compared to its diameter, length or width dimensions.

As used herein, "directly grounded" or "solidly grounded" means the grounded component (e.g., a cable sheath) is connected to electrical ground or earth without a permanently or conditionally electrically insulating element (e.g., a varistor) being located between the grounded component and the electrical ground.

As used herein a sheath voltage limiter (SVL) is a protective device to limit high voltage surges appearing on the open circuited sheaths of specially bonded cable system susceptible to transient voltages, which may arise, for example, from lightning, switching transients, and/or short circuit current. SVLs are configured between the sheath and ground.

As used herein, residual voltage refers to the voltage across the terminals of the SVL while it is conducting during a transient event.

As used herein, impulse current withstand capability denotes the maximum impulse current, conforming to a specified waveform, that the SVL can endure without incurring damage.

As used herein, the maximum continuous operating voltage (MCOV) $U_c$ is the maximum voltage at which the SVL remains non-conductive and is further characterized by a leakage current that does not exceed a specified limit. An SVL configured to have an MCOV magnitude that is around 10% greater than nominal root mean square voltage of the power line.

Figure 2:
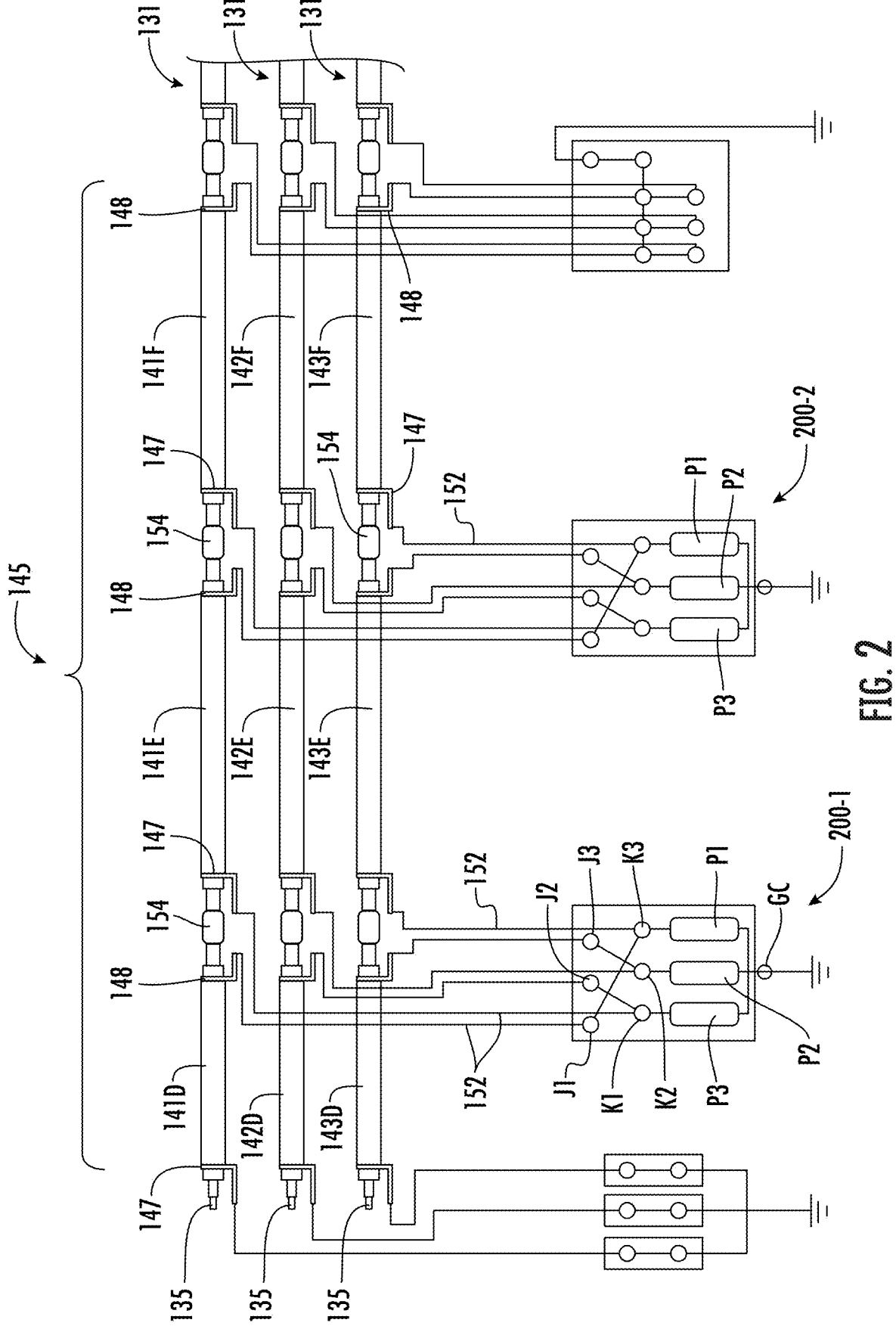
FIG. 2 is a fragmentary view of the electrical power generation system of FIG. 1.

Embodiments of the inventive concept are described herein with respect to SVLs used in conjunction with a sheaths being configured in a cross-bonding or single point bonding configuration. It will be understood that embodiments of the inventive concept are not limited to these two types of bonding configurations and other sheath bonding arrangements can be used in various embodiments of the inventive concept. With reference to FIGS. 1, 2 and 4-7, overvoltage protection devices (OVPD) or link boxes according to embodiments of the present invention are shown therein and designated 200-1, 200-2. The link boxes 200-1, 200-2 may form a part of a sheath bonding or overvoltage/induced current control system 150 according to some embodiments. The sheath bonding system 150 may be incorporated into a power generation system 100 as illustrated in FIGS. 1 and 2 in accordance with some embodiments.

The illustrated power generation system 100 includes an electrical power source 110, generator cables 112, a medium voltage transformer 116, transmission cables 131, 132, 133, a medium voltage-to-high voltage transformer 120, utility cables 122, an electrical power transmission grid 124, and the sheath bonding system 150. The generator cables 112 connect the power source 110 to the MV transformer 116, which raises the voltage to the appropriate voltage for transmission (referred to herein as the "medium voltage"), as discussed in more detail below. The transmission cables 131, 132, 133 connect the MV transformer 116 to the MV/HV transformer 120. In some embodiments, the transmission cables 131, 132, and 133 may be arranged in a trefoil formation. Each transmission cable 131, 132, 133 conducts a respective one of the three phases of a three-phase electric power system. The MV/HV transformer 120 raises the voltage from the medium voltage to the appropriate voltage for transmission (referred to herein as the "high voltage"), as discussed in more detail below. The transmission grid 124 is connected to the HV side of the MV/HV transformer 120.

The electrical power source 110 may be any suitable power generator(s). In some embodiments, the electrical power source 110 includes one or more wind turbine generators. In some embodiments, the electrical power source 110 includes multiple wind turbine generators each of which is connected to the MV transformer 116 (e.g., at a substation) via a respective generator cable 112.

In some embodiments, the electrical power source 110 includes one or more photovoltaic (PV) panels. In some embodiments, the electrical power source 110 is a solar station or park including multiple PV panels or arrays of PV panels each of which is connected to the MV transformer 116 (e.g., at a substation) via a respective generator cable 112. The system 100 may further include a DC-to-AC converter 114 between the PV panel(s) and the MV transformer 116.

Figures 3, 4:
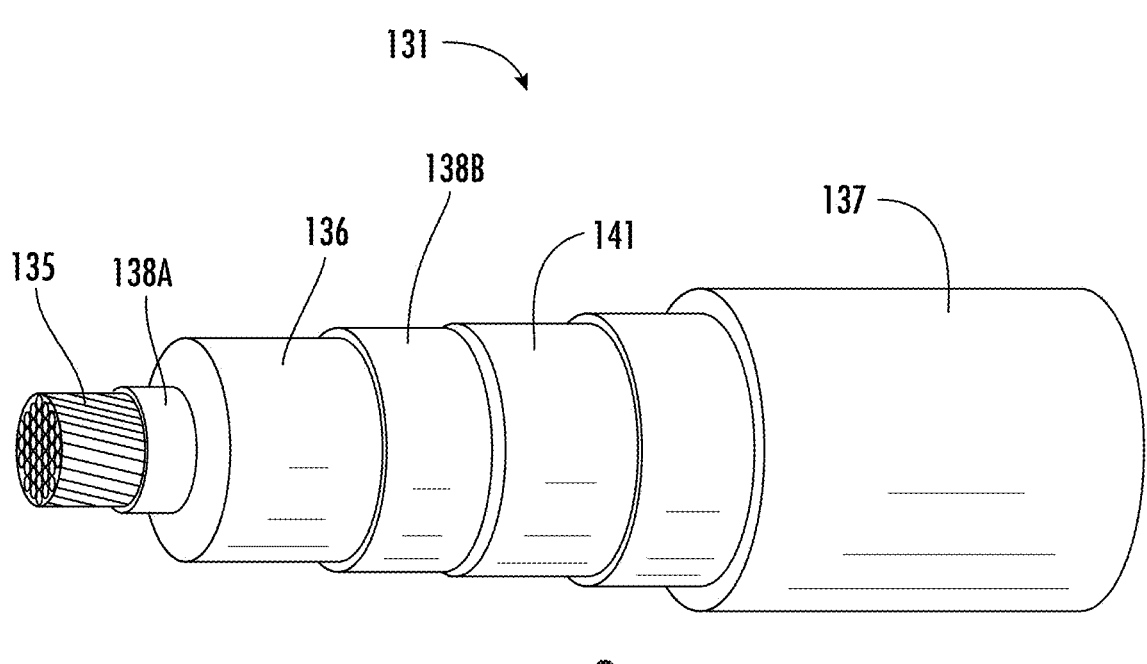
FIG. 3 is a fragmentary view of a power transmission cable of the electrical power generation system of FIG. 1.
FIG. 4 is a schematic view of an SVL forming a part of a link box of the sheath bonding system of FIG. 1.
Figure 5:
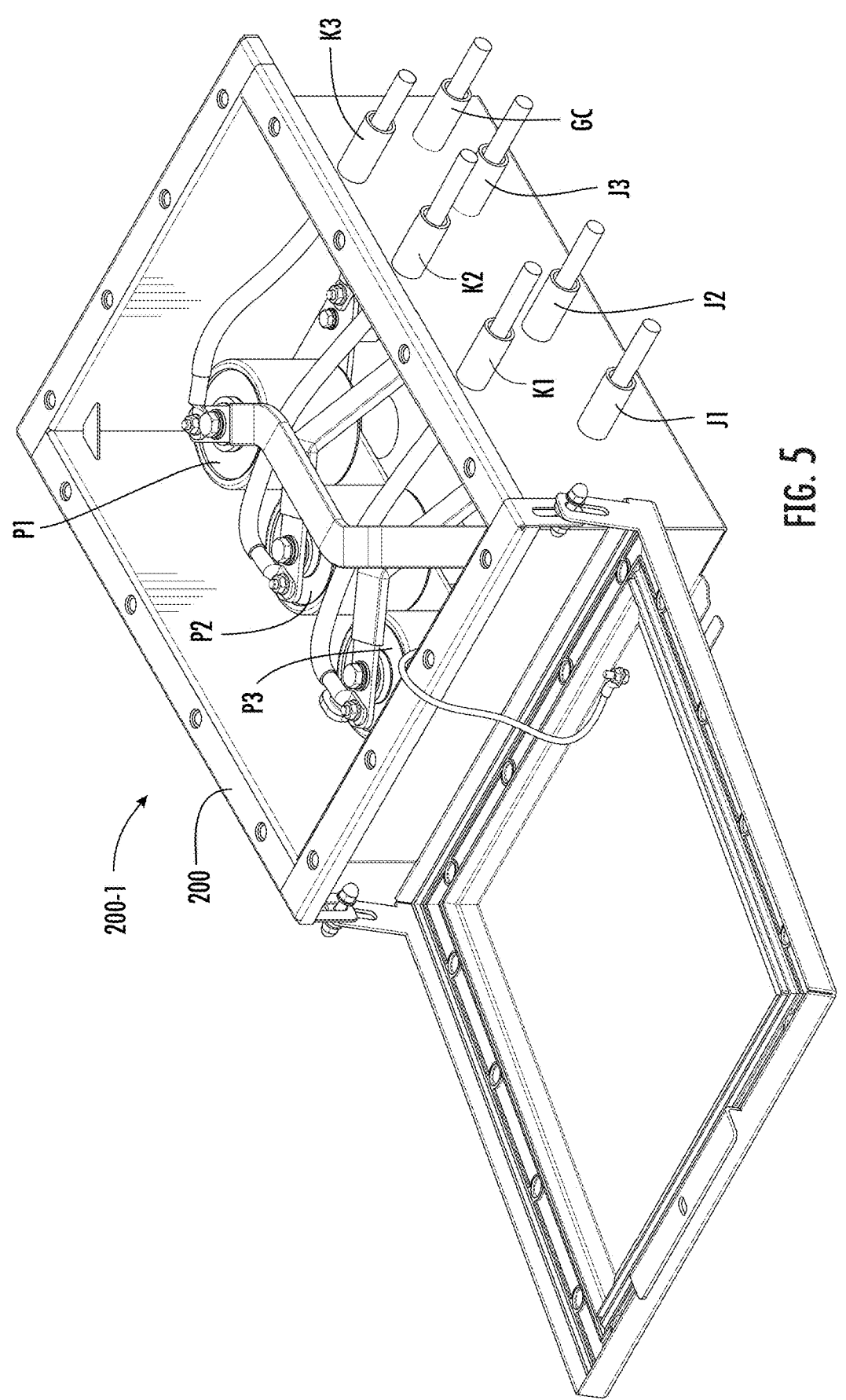
FIG. 5 is a top perspective view of a link box of the sheath bonding system of FIG. 1.
Figure 6:
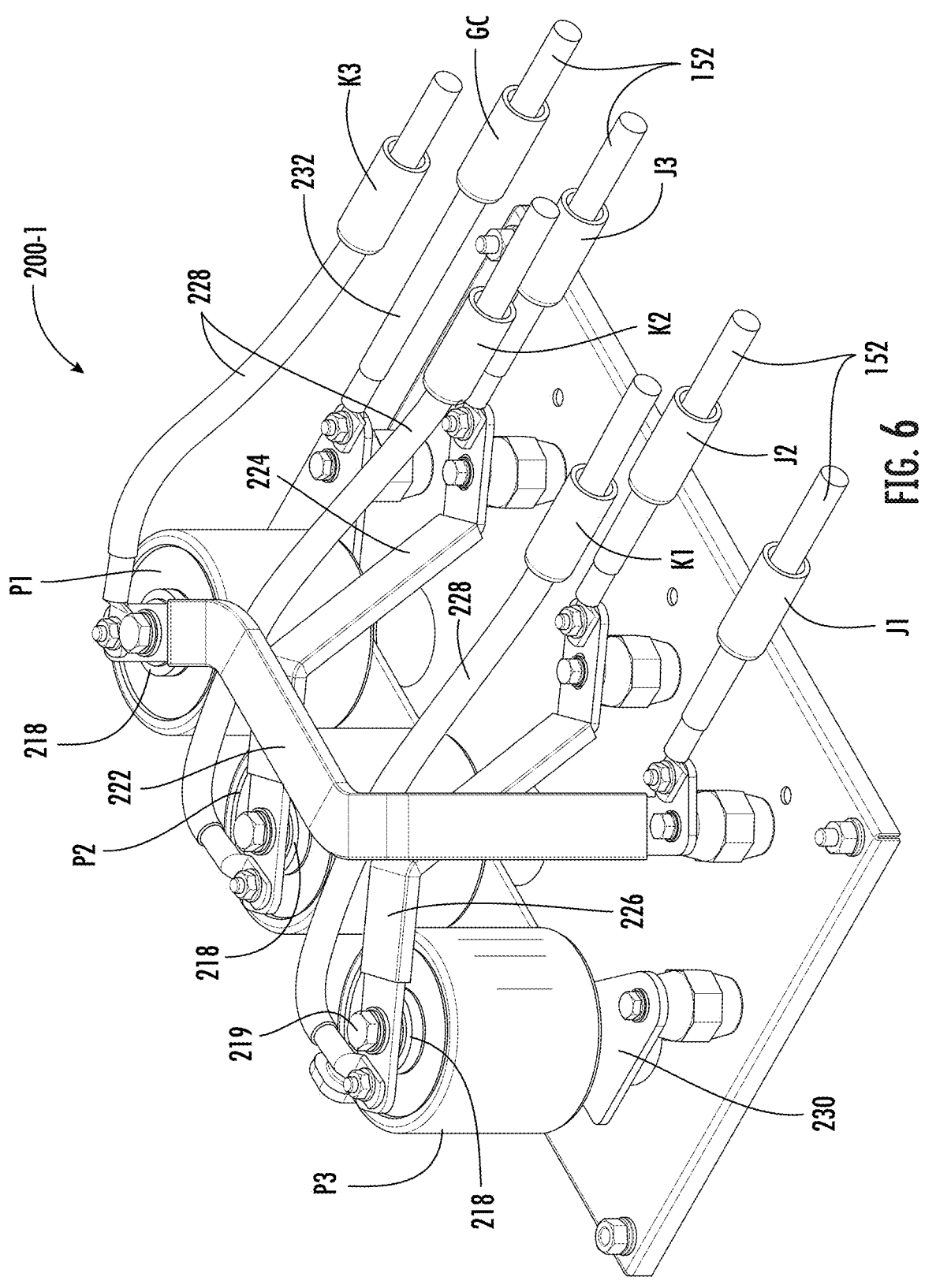
FIG. 6 is a fragmentary, top perspective view of the link box of FIG. 5.
Figure 7:
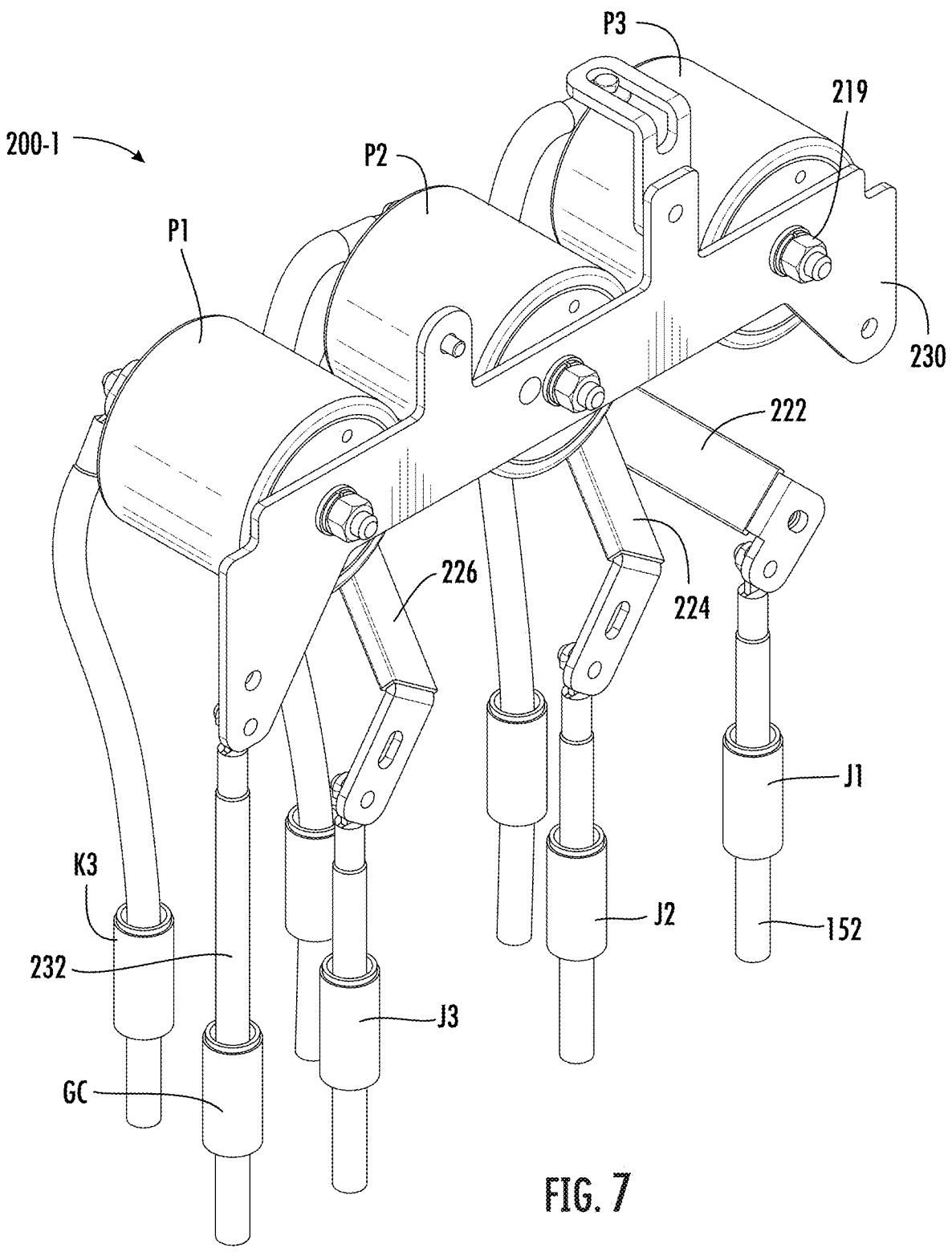
FIG. 7 is a fragmentary, bottom perspective view of the link box of FIG. 5.
Figure 8:
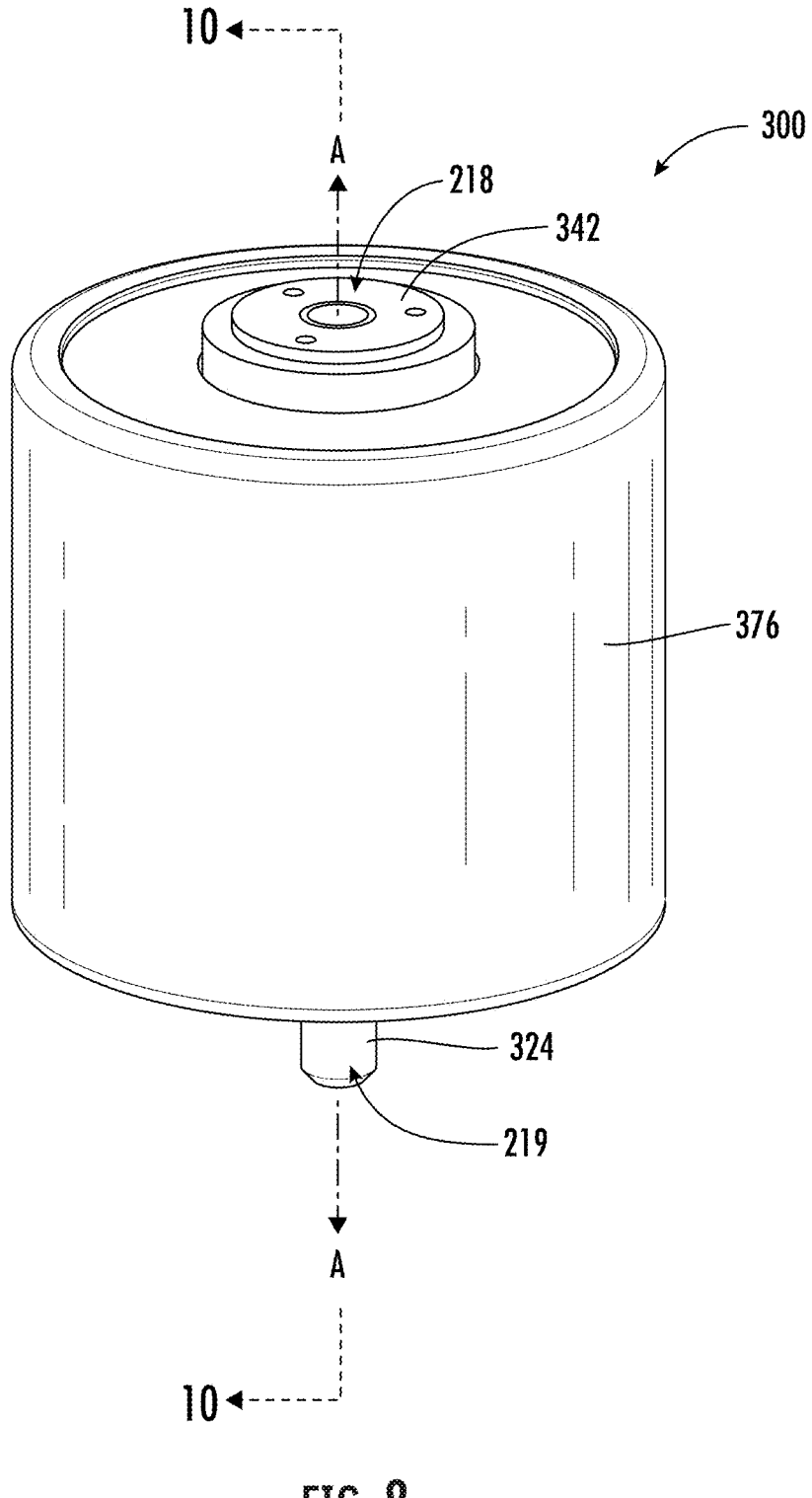
FIG. 8 is a top perspective view of an SVL module of the link box of FIG. 5.

In some embodiments, the cables 131, 132, 133 are single core or conductor coaxial cables. FIG. 3 shows the construction of the cable 131 and the cables 132, 133 may be constructed in the same manner. The cable 131 includes an electrically conductive metal main conductor 135, an insulation layer 136 surrounding the main conductor 135, an electrically conductive metal shield or sheath 141 surrounding the insulation 136, and an electrically insulating jacket 137 surrounding the sheath 141. The cable 131 may also include a semiconductor screen layer 138A between the conductor 135 and the insulation 136 and/or a semiconductor screen layer 138B between the insulation 136 and the sheath 141. The sheaths of the cables 132 and 133 are designated herein as sheaths 142 and 143, respectively.

The sheath bonding system 150 includes the link boxes 200-1, 200-2, linking cables 152, and cable joints 154 (FIG. 2).

As discussed below, the sheaths 141, 142, 143 are sectionalized into sheath minor sections 141D, 141E, 141F, 142D, 142E, 142F, 143D, 143E, 143F. The cable joints 154 electrically isolate the adjacent ends of the sheath minor sections from one another, and provide electrical connections between the linking cables 152 and the ends of the sheath minor sections. The cable joints 154 may include components to environmentally seal or protect the cable 131, 132, 133 at sheath break locations.

The link boxes 200-1 and 200-2 may be constructed in the same manner. Accordingly, it will be appreciated that the description of the link box 200-1 below likewise applies to the link box 200-2.

The link box 200-2 includes a link box housing 202, three SVLs P1, P2, P3, three metal interconnect busbars 222, 224, 226, interconnect cables 228, a metal ground busbar 230, and a ground cable 232. Each SVL P1, P2, P3 has an SVL input terminal 218 and an SVL ground terminal 219. The interconnect busbars 222, 224 and 226 are electrically connected to the input terminals 218 of the SVLs P1, P2 and P3, respectively, by fasteners 236.

Each SVL P1, P2, P3 includes a varistor or varistors 215 (FIG. 4) connected between the terminals 218, 219. The varistor or varistors 215 are referred to hereinbelow as the varistor 215; however, it will be appreciated that the varistor 215 may be multiple varistors electrically connected in series and/or parallel. In some embodiments, the varistors 215 are metal-oxide varistors (MOVs).

The link box 200-2 further includes a ground connector GC connected to the ground busbar 230 by a ground cable 232.

The link box 200-2 further includes three input connectors J1, J2, J3 and three output connectors K1, K2, K3.

The input connector J1 and the output connector K3 are electrically connected to one another and to the input terminal 218 of the SVL P1 by the interconnect busbar 222.

The input connector J3 and the output connector K2 are electrically connected to one another and to the input terminal 218 of the SVL P2 by the interconnect busbar 224.

The input connector J2 and the output connector K1 are electrically connected to one another and to the input terminal 218 of the SVL P3 by the interconnect busbar 226.

With reference to FIGS. 1 and 2, the cross-bonding architecture of the sheath bonding system 150 is illustrated therein. It will be appreciated that other cross-bonding architectures may be used in place of the illustrated configuration using the link boxes 200-1, 200-2. For example, the embodiments of FIGS. 1 and 2 illustrate a cross-connection example of a cross-bonding architecture between the minor sections of sheaths of three different cables. In other embodiments, rather than cross-connecting the sheaths, the cables may be transposed in the different minor sections.

The transmission lines 131, 132, 133 each include a sheath major section 145. In the illustrated configuration, each major section spans from the MV transformer 116 to the MV/HV transformer 120.

Each sheath major section 145 is segmented or sectionalized into three sheath minor sections. That is, each sheath 141, 142, 143 is cut, broken or separated along the cable's axis into three sequential sheath minor sections.

The major section 145 of the sheath 141 is sectioned into sheath minor sections 141D, 141E, 141F. The major section 145 of the sheath 142 is sectioned into sheath minor sections 142D, 142E, 142F. The major section 145 of the sheath 141 is sectioned into sheath minor sections 143D, 143E, 143F. Each sheath minor sections 141D, 141E, 141F, 142D, 142E, 142F 143D, 143E, 143F has opposed ends 147 and 148 (FIG. 2).

The ends of each major section 145 are solidly connected to electrical ground. For example, each end of a major section 145 may be connected to ground at a transformers 116, 120 or the beginning of another major section.

The ground busbars 230 of the link boxes 200-1, 200-2 are connected to electrical ground at their ground connectors GC.

The minor sheath section ends 147, 148 that are not at the end of a major section 145 are connected to the input connectors J1, J2, J3 and output connectors K1, K2, K3 of the link boxes 200-1, 200-2 as schematically illustrated in FIG. 2. The minor sheath sections 141D, 141E, 141F, 142D, 142E, 142F, 143D, 143E, 143F of the three sheaths 141, 142, 143 are thereby electrically cross-connected in and by the link boxes 200-1, 200-2 as schematically illustrated in FIG. 2.

Additionally, by the link box 200-1 the minor sheath sections 141D, 143E are connected to ground through the SVL P1, the minor sheath sections 143D, 142E are connected to ground through the SVL P2, and the minor sheath sections 142D, 141E are connected to ground through the SVL P3. In the link box 200-1, the minor sheath sections 141E, 143F are connected to ground through the SVL P1, the minor sheath sections 143E, 142F are connected to ground through the SVL P2, and the minor sheath sections 142E, 141F are connected to ground through the SVL P3. These minor sheath sections are connected to ground only indirectly or selectively, as discussed herein. That is, the SVLs P1, P2, P3 do not directly bond the sheaths 141, 142, 143 to ground.

The SVLs P1, P2, P3 electrically isolate the ends of the minor sheath sections from ground except in response to conditions that cause SVLs to conduct. More particularly, the varistor 215 of each SVL P1, P2, P3 electrically insulates the sheaths from ground or electrically connects the sheaths to ground, depending on the conditions of the system and the state of the varistor 215. Additionally, each SVL P1, P2, P3 has a fail-safe system 217 that causes the SVL P1, P2, P3 to short or connect the associated sheaths to ground in response to some conditions or events. Each fail-safe system 217 may include multiple fail-safe mechanisms that respond to different conditions or events.

As is well known, a varistor has an innate nominal clamping voltage VNOM (sometimes referred to as the "breakdown voltage" or simply the "varistor voltage") at which the varistor begins to conduct current. Below the VNOM, the varistor will not pass current. Above the VNOM, the varistor will conduct a current (i.e., a leakage current or a surge current). The VNOM of a varistor is typically specified as the measured voltage across the varistor with a DC current of 1 mA.

As is known, a varistor has three modes of operation. In a first normal mode (discussed above), up to a nominal voltage, the varistor is practically an electrical insulator. In a second normal mode (also discussed above), when the varistor is subjected to an overvoltage, the varistor temporarily and reversibly becomes an electrical conductor during the overvoltage condition and returns to the first mode thereafter. In a third mode (the so-called end of life mode), the varistor is effectively depleted and becomes a permanent, non-reversible electrical conductor.

The varistor also has an innate clamping voltage VC (sometimes referred to as simply the "clamping voltage"). The clamping voltage VC is defined as the maximum voltage measured across the varistor when a specified current is applied to the varistor over time according to a standard protocol. The clamping voltage may also be referred to as the residual voltage.

In the absence of an overvoltage condition, the varistor 215 provides high resistance such that no current flows through the SVL P1, P2, P3 as it appears electrically as an open circuit. That is, ordinarily the varistor 215 passes no current. The terminals 218, 219 are electrically isolated from one another by the varistor 215. In the event of an overcurrent surge event (typically transient; e.g., lightning strike) or an overvoltage condition or event (typically longer in duration than an overcurrent surge event) exceeding VNOM, the resistance of the varistor wafer decreases rapidly, allowing current to flow through the SVL P1, P2, P3 and create a shunt path for current flow to ground. Normally, the varistors 150 recover from these events without significant overheating of the SVL P1, P2, P3.

The VNOM of a given varistor begins at a certain value and over time could degrade to a lower effective VNOM value as a result of varistor aging. Typically, a varistor is initially rated for a "maximum continuous operating voltage" (MCOV), indicating that the VNOM of the varistor exceeds the rated MCOV when first placed in service. Typically, the maximum continuous operating voltage, which may be denoted as $U_c$, is around 10% higher than the nominal root mean square voltage between the conductor and earth ground.

Varistor aging (i.e., degradation resulting in reduction of the VNOM) can be caused by surge currents or continuous leakage currents (during continuous overvoltage events) applied to the varistor in service, as well as by passage of time with the nominal voltage applied on the varistor (rare case, typically caused by low quality varistors). Aging degradation is generally thermally induced.

Varistors have multiple failure modes. The failure modes include: 1) the varistor fails as a short circuit; and 2) the varistor fails as a linear resistance. The failure of the varistor to a short circuit or to a linear resistance may be caused by the conduction of a single or multiple surge currents of sufficient magnitude and duration or by a single or multiple continuous overvoltage events that will drive a sufficient current through the varistor.

A short circuit failure typically manifests as a localized pinhole or puncture site (herein, "the failure site") extending through the thickness of the varistor. This failure site creates a path for current flow between the two electrodes of a low resistance, but high enough to generate ohmic losses and cause overheating of the device even at low fault currents. Sufficiently large fault current through the varistor can melt the varistor in the region of the failure site and generate an electric arc.

A varistor failure as a linear resistance will cause the conduction of a limited current through the varistor that will result in a buildup of heat. This heat buildup may result in catastrophic thermal runaway and the device temperature may exceed a prescribed maximum temperature. For example, the maximum allowable temperature for the exterior surfaces of the device may be set by code or standard to prevent combustion of adjacent components. If the leakage current is not interrupted at a certain period of time, the overheating will result eventually in the failure of the varistor to a short circuit as defined above.

In some cases, the current through the failed varistor could also be limited by the power system itself (e.g., ground resistance in the system or in photo-voltaic (PV) power source applications where the fault current depends on the power generation capability of the system at the time of the failure) resulting in a progressive build up of temperature, even if the varistor failure is a short circuit. There are cases where there is a limited leakage current flow through the varistor due to extended in time overvoltage conditions due to power system failures, for example. These conditions may lead to temperature build up in the device, such as when the varistor has failed as a linear resistance and could possibly lead to the failure of the varistor either as a linear resistance or as a short circuit as described above.

In some cases, the varistor 215 may assume an "end of life" mode in which the varistor 215 is depleted in full or in part (i.e., in an "end of life" state), leading to an end of life failure. When the varistor 215 reaches its end of life, the varistor 215 will become substantially a short circuit with a very low but non-zero ohmic resistance.

As a result, in an end of life condition, a fault current will continuously flow through the varistor 215 even in the absence of an overvoltage condition. In this case, the current may continue to flow through the varistor 215, thereby generating heat from ohmic losses in the varistor 215. If the condition was permitted to persist, the heat generated in the SVL P1, P2, P3 could build up until the SVL P1, P2, P3 melts or explodes. Such an event may be regarded as catastrophic. If the fault current were of sufficient magnitude, the fault current may induce or generate electric arcing through and around the varistor 215 (herein, an "arcing event"). Such an arcing event may rapidly generate additional heat in the SVL P1, P2, P3 and/or may cause localized damage to other components of the link box 200-1, 200-2.

In the case of the SVLs P1, P2, P3, the fail-safe system 217 of each SVL P1, P2, P3 is adapted and configured to electrically short circuit the current applied to the SVL P1, P2, P3 around the varistor 215 to prevent or reduce the generation of heat in the varistor. In this way, the fail-safe system 217 can operate as a switch to bypass the varistor 215 and prevent overheating and catastrophic failure as described above.

According to embodiments of the invention, the fail-safe system 217 includes two fail-safe mechanisms that operate independently of one another. More particularly, in some embodiments, the first fail-safe mechanism will operate to short circuit the SVL P1, P2, P3 when a first type or set of operating conditions are experienced by the SVL P1, P2, P3 and the second fail-safe mechanism will operate to short circuit the SVL P1, P2, P3 when a second type or set of operating conditions, different from the first, are experienced by the SVL P1, P2, P3. That is, under different circumstances, the first fail-safe mechanism may operate or execute first or the second fail-safe mechanism may operate or execute first. Ordinarily, though not necessarily, only one of the fail-safe mechanisms will execute, whereupon the conditions necessary to invoke the other fail-safe mechanism will be prevented from arising.

The power generation system 100, the sheath cross-bonding system 150, and the SVLs P1, P2, P3 will operate as follows in use. Referring now to FIGS. 1 and 2, during normal operation, as the current from the source 110 is transmitted through the main conductors 135 of the phase cables 131, 132, 133 to the transformer 116, voltages will be developed on the conductors 135, which may capacitively induce voltages on the sheaths 141, 142, and 143 surrounding the conductors.

The cross-bonding of the sheath minor sections 141D, 141E, 141F, 142D, 142E, 142F, 143D, 143E, 143F serves to reduce or eliminate circulating currents induced in the sheaths 141, 142, 143 by the current transmitted through the main conductors 135 of the cables 131, 132, 133. The mechanism by which this occurs is well-known to those of skill in the art and will not be described in detail herein. Generally, the inner ends of the outer minor sections 141D, 142D, 143D, 141F, 142F, 143F and both ends of the middle minor sections 141E, 142E, 143E are cross-connected by the link boxes 200-1, 200-2. The phase voltages on the sheaths 141, 142, 143 are 120 degrees apart and substantially equal. The sheath minor sections 141D, 141E, 141F, 142D, 142E, 142F, 143D, 143E, 143F are cross-connected such that the net induced voltage on each major section 145 is near-zero. That is, the sheath voltages cancel one another or sum up to a small value and the sheath induced currents sum up to near zero. The ends of the sheath minor sections are electrically isolated from one another except via the link box connections. In some cases, the sections of the cables corresponding to the sheath minor sections are physically transposed to reduce any residual sheath voltage.

SVLs may be placed in a link box to prevent or reduce damage to a cable sheath during TOV events, such as lightning strikes. If lightning strikes the earth near the grounding point of the sheath or the grounding point itself, the sheath can conduct the lightning, which may create a traveling wave that reflects at junctions where the resistance changes, such as the line termination or the cable joints. This can create standing waves throughout the cable line, which may cause overvoltages that can damage the cable jacket. The overvoltage created by the lightning strike can be significant and may damage the cable jacket at multiple points.

Conventionally, an SVL may be configured with both a conducting characteristic, i.e., residual voltage, that is greater than a worse case induced power frequency voltage, but is less than an induced voltage resulting from a TOV event, such as a lightning strike. Typically, each SVL would also be configured with an MCOV characteristic that is greater the worse case inducted power frequency voltage to ensure that the SVL does not conduct during power frequency faults, such as short circuits. These SVLs may, however, provide paths to ground for traveling waves generated in the cable sheaths due to TOV events, such as lightning strikes. The SVLs may further limit the overvoltage of the traveling wave to the residual voltage of the SVLs in the link box. Preventing or reducing these overvoltages may reduce the severity of any damage to the cable jacket thereby reducing the likelihood of costly repairs. SVLs configured with these residual voltage and MCOV characteristics and used on medium voltage cables 131, 132, 133 would not, however, protect the sheaths 141, 142, 143 from damage resulting from power frequency faults. According to some embodiments of the inventive concept, each link box 200-1 and 200-2 includes one or more SVLs P1, P2, and P3 that are configured to have a residual voltage and MCOV that are each less than a minimum induced voltage generated on a sheath during a power frequency fault, but greater than the nominal operating voltage on the medium voltage cable sheath. The residual voltage, in some embodiments may be about 80% to about 90% of the minimum induced voltage generated during a power frequency fault. In some embodiments, the minimum induced voltage generated during a power frequency fault may be about 500 volts-1000 volts. During a transient power frequency fault event, the voltage induced into the sheaths 141, 142, and 143 exceeds the effective residual or clamping voltage of the SVLs P1, P2, and P3, which causes the SVLs P1, P2, and P3 to enter a conductive state to divert current to ground as shown in FIGS. 1 and 2.

Thus, according to some embodiments of the inventive concept, the SVLs P1, P2, and P3 used in the link boxes 200-1 and 200-2 are configured with residual voltage and MCOV characteristics that allow the SVLs to conduct and thereby divert current to ground in response to both TOV events, such as lightning strikes, as well power frequency faults, such as short circuits.

Figure 19:
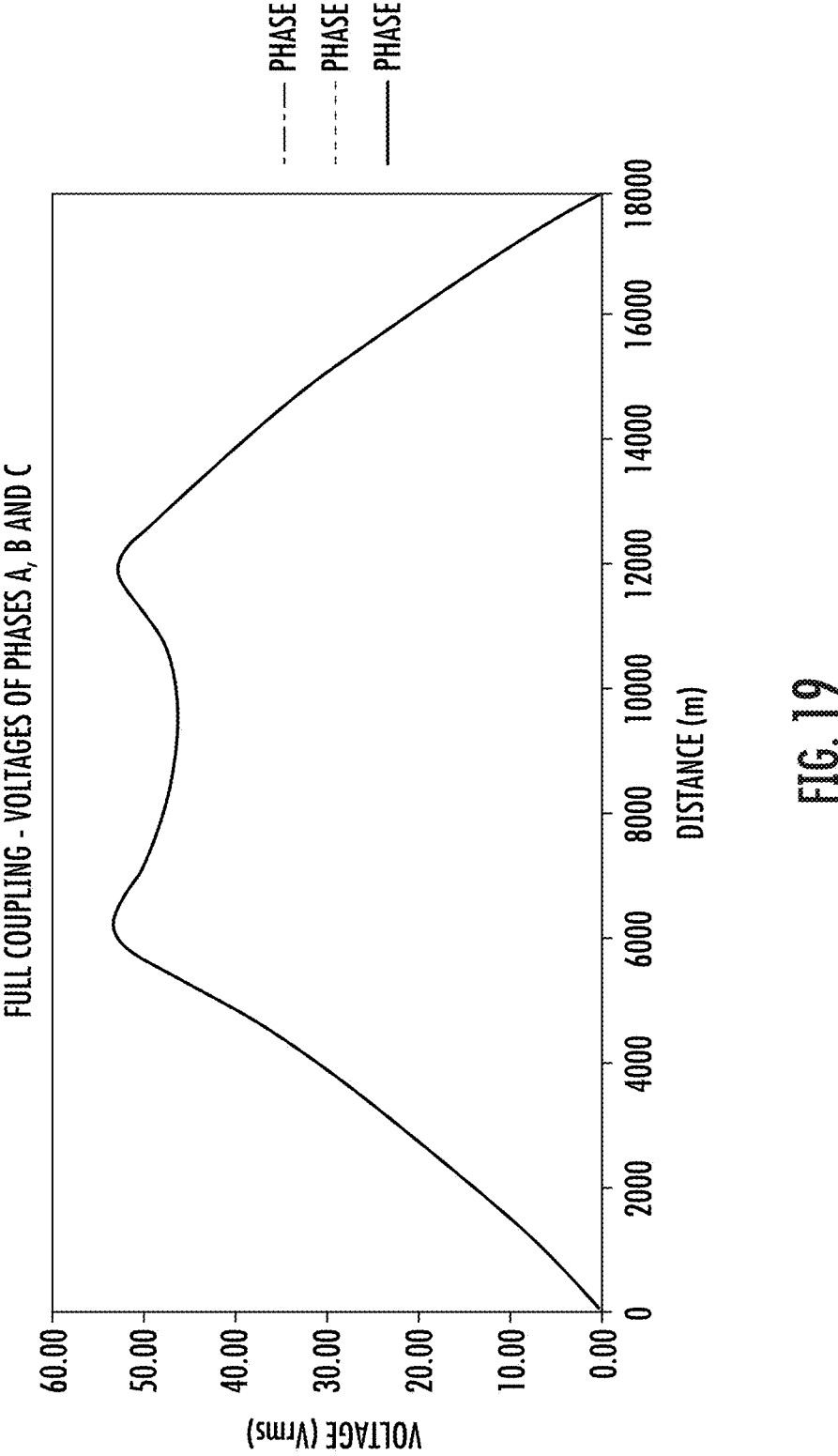
FIGS. 19 and 20 illustrate the induced sheath voltages and currents, respectively, during normal operation of a cross-connected cable using a conventional SVL and an SVL according to embodiments of the inventive concept.
Figure 20:
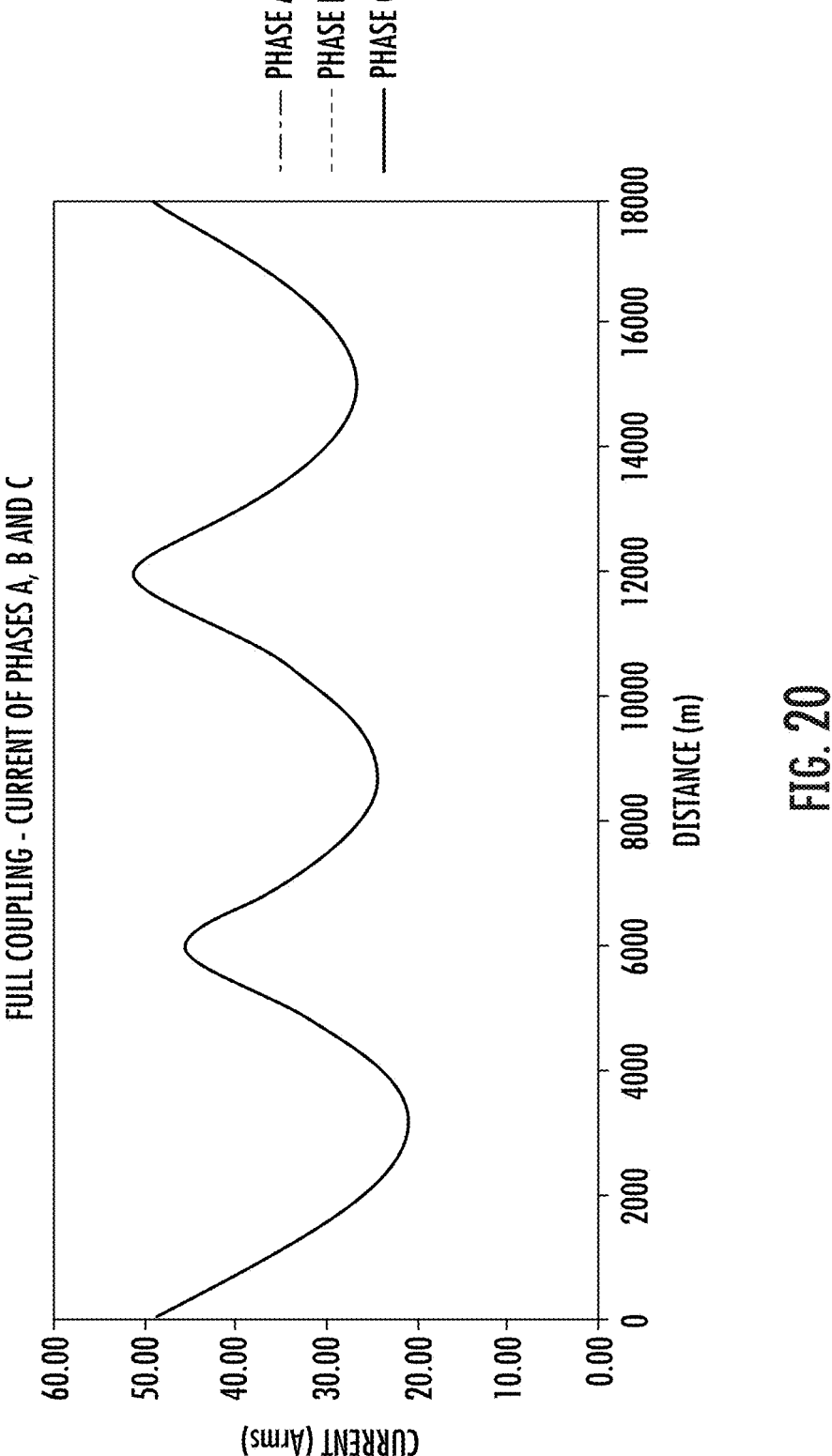
Figure 21:
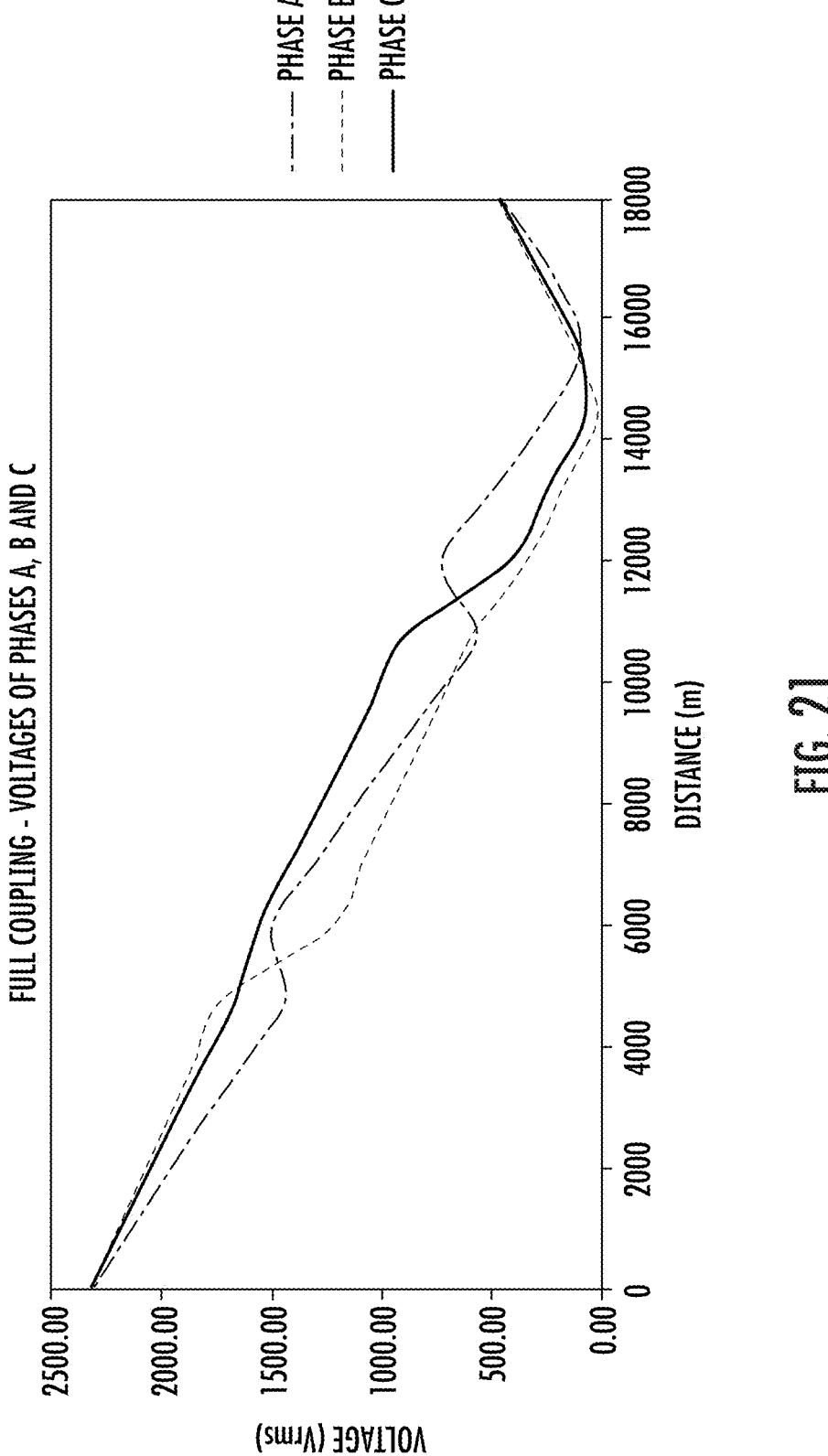
FIGS. 21 and 22 illustrate the voltage on the cross-connected cable in response to a power frequency fault using a conventional SVL and an SVL according to embodiments of the inventive concept.
Figure 22:
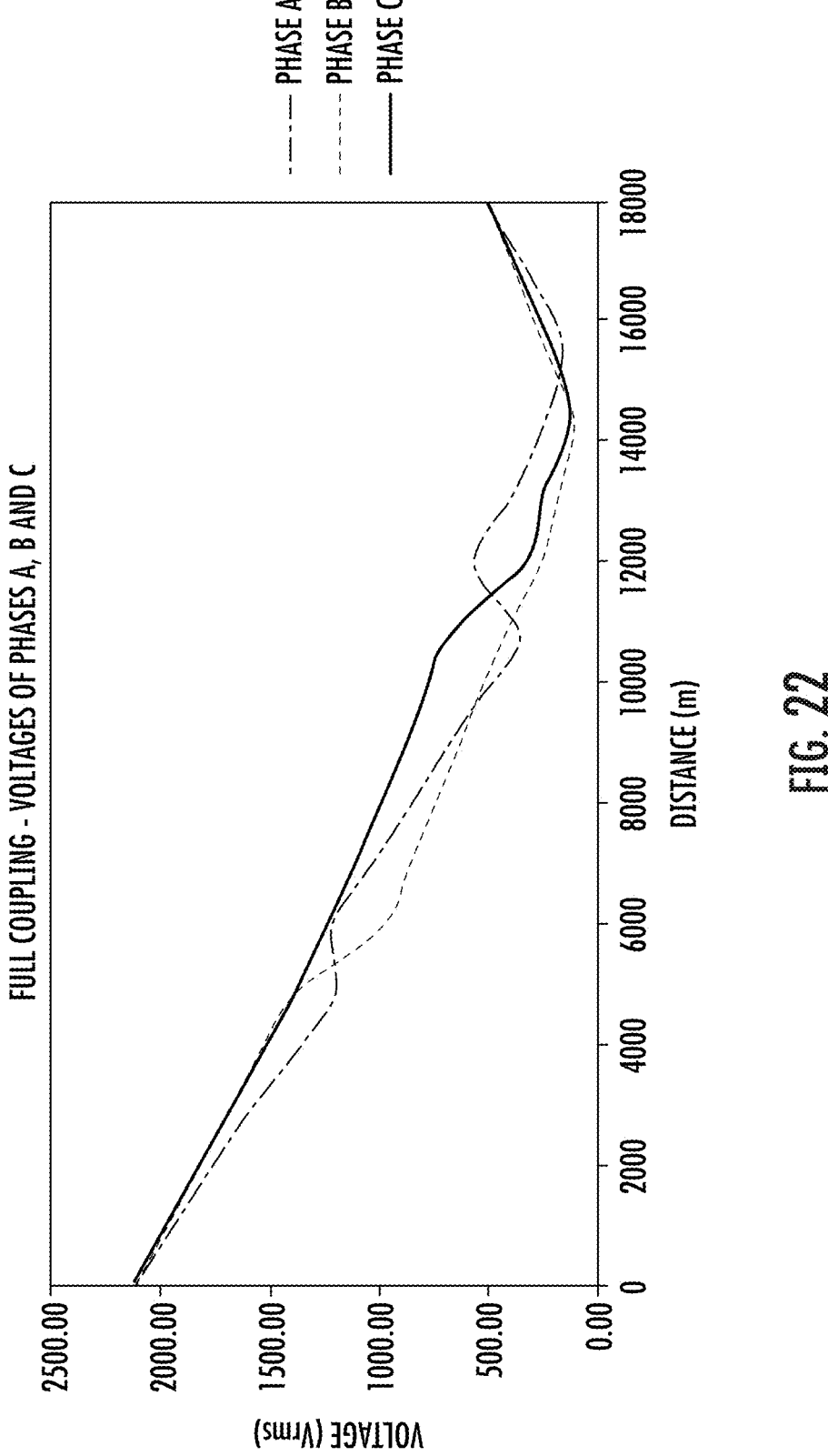
Figure 23:
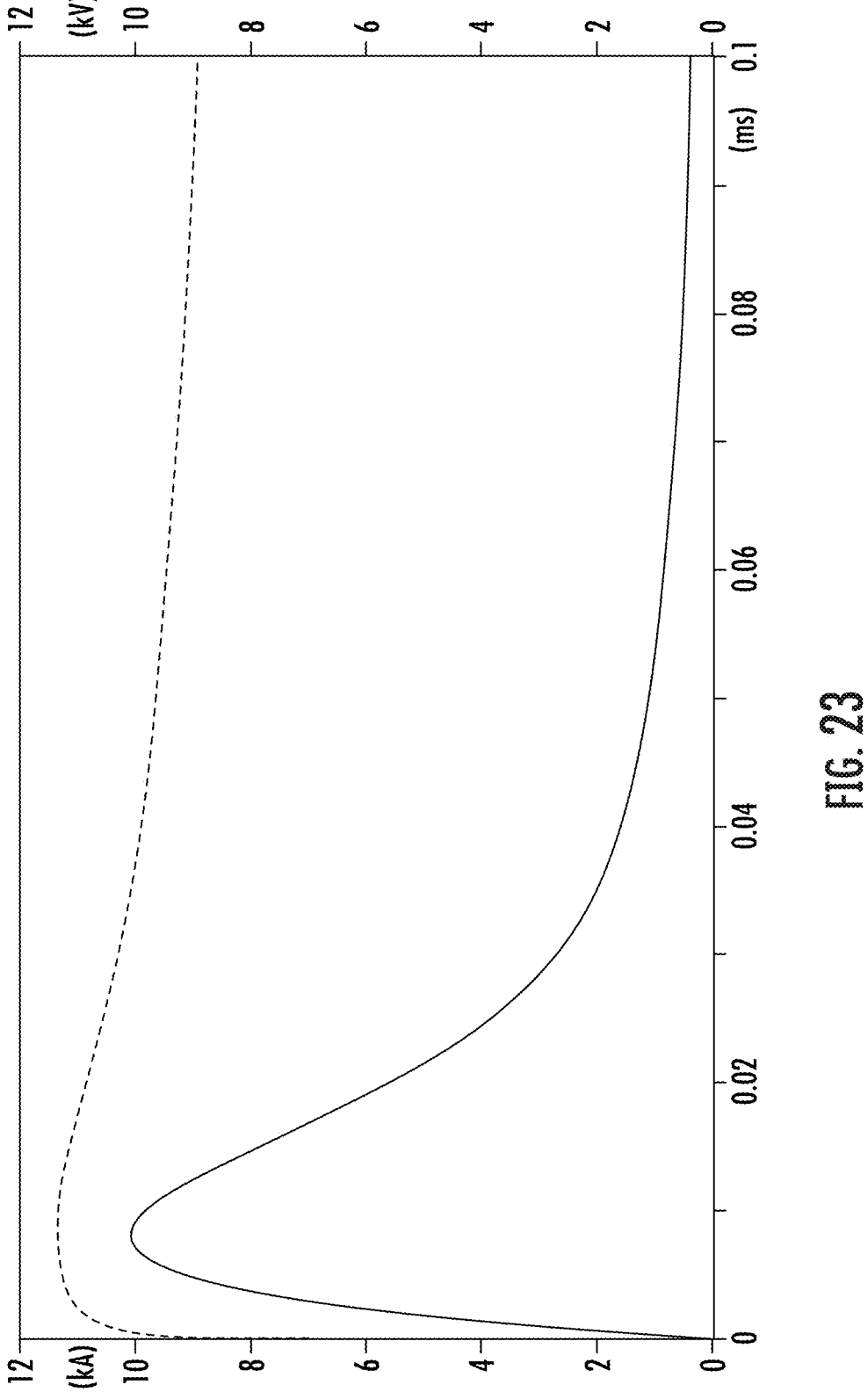
FIGS. 23-26 illustrate the voltage on the cross-connected cable in response to TOV event using a conventional SVL and an SVL according to embodiments of the inventive concept.
Figure 24:
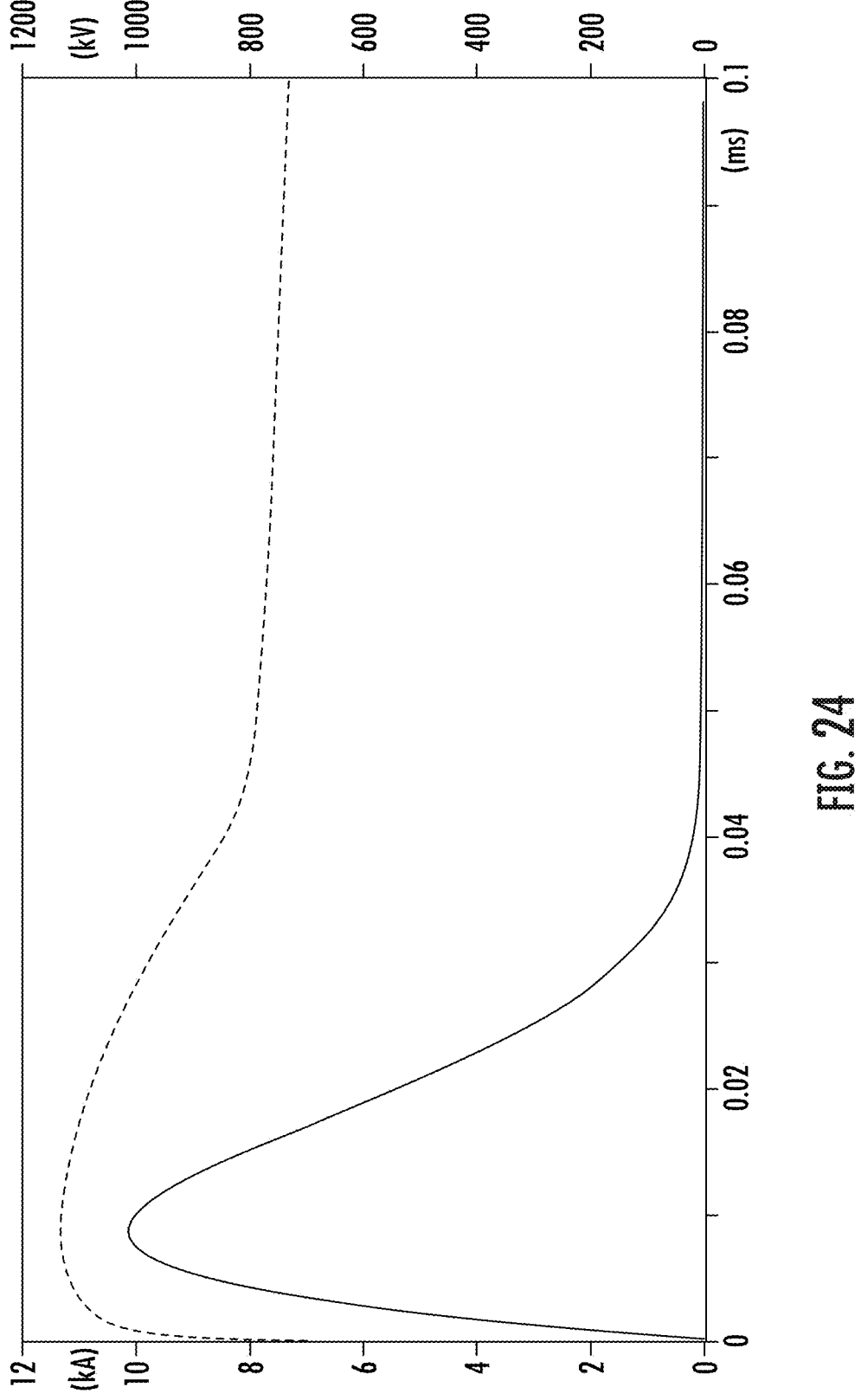

Embodiments of the inventive concept may be illustrated by way of example. A power line is simulated with three conductive cables configured in a cross-connect configuration of a cross-bonding architecture with an 18 km main section divided into three 6 km minor sections. The simulation was performed using SVLs that are configured to conduct only in response to TOV events, such as lightning strikes, but not conduct in response to power frequency faults and using SVLs that are configured to conduct in response to TOV events and power frequency faults. FIGS. 19 and 20 illustrate the induced sheath voltages and currents, respectively during normal operation, i.e., no TOV event or power frequency fault event. FIGS. 21 and 22 illustrate the voltage on the cable in response to a power frequency fault, which is simulated as a 1.5 kA short circuit. FIG. 21 is a graph of the voltage on the cable in which the SVLs are configured to conduct only in response to TOV events and FIG. 22 is graph of the voltage on the cable in which the SVLs are configured to conduct in response to TOV events and power frequency faults.

| | Maximum Induced Sheath Voltage [V] |
|---|---|
| SVL for TOV event only | 2315 |
| SVL for TOV event and power frequency fault | 2117 |

Figure 25:
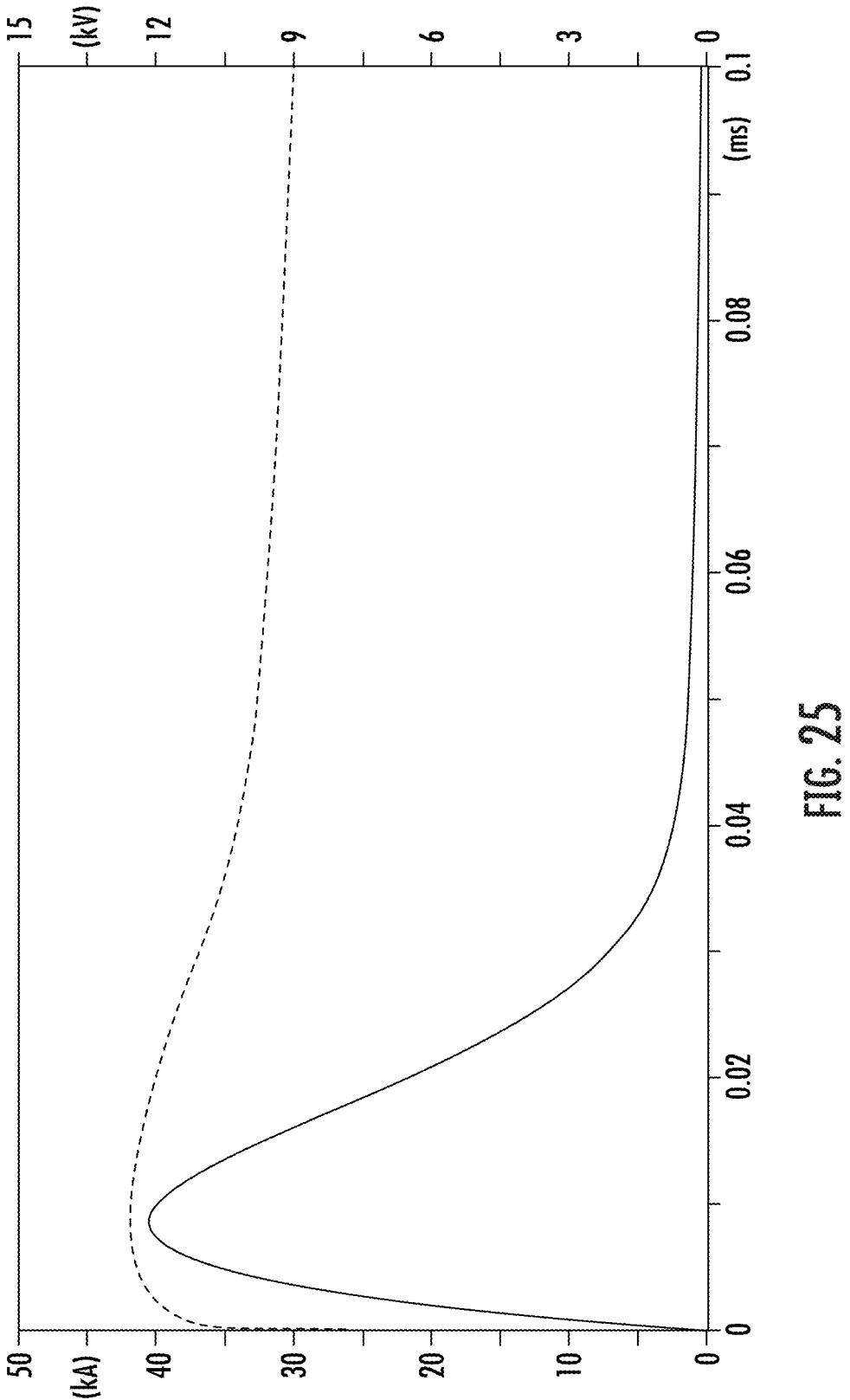
Figure 26:
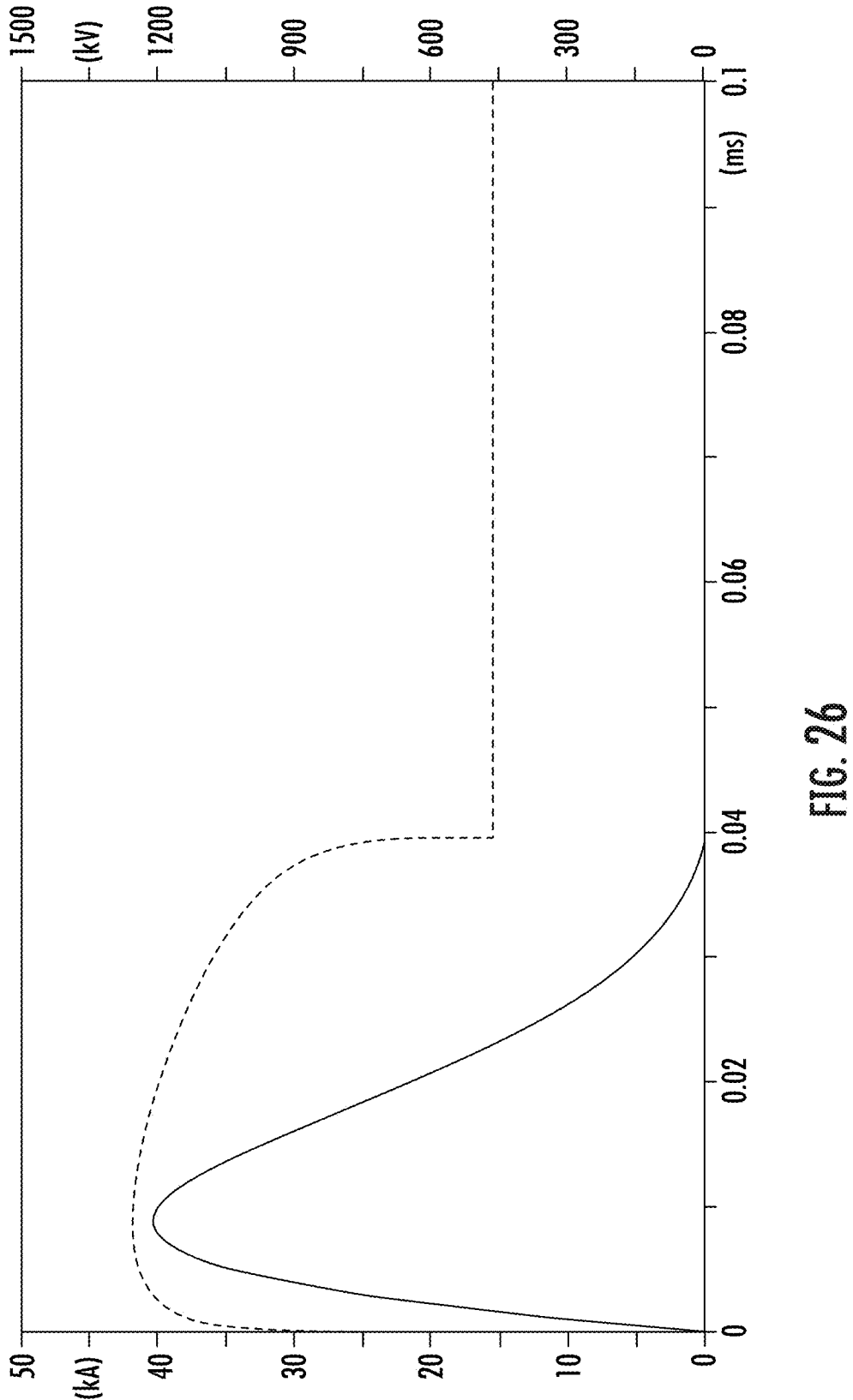

As shown in the graphs and highlighted in the table, the maximum induced voltage in all phases was reduced by ~10% ($200V_{rms}$) when using the SVLs configured for both TOV events and power frequency faults. The SVLs configured to conduct during power frequency faults will start conducting to prevent high induced voltages on the sheath without compromising the low residual voltage during lightning events. FIGS. 23-26 illustrate the voltage on the cable in response to TOV event, such as a lightning strike. During a lightning event the two SVL configurations have a large difference in their residual voltage. To see the difference of the traditional SVL ($U_c$=2800V) and the SVL configured to conduct in response to both TOV events and power frequency faults two simulations were performed. Both SVL types were tested with an 8/20 µs impulse current (8 µs front time and 20 µs time to half). Two different impulses were tested. One at 10 kA per SVL (FIGS. 23 and 24) and one at 40 kA (FIGS. 25 and 26). The simulation results are depicted below. The residual voltages of all the simulations are tabulated below:

| | Impulse Current [kA] | Residual Voltage [kV] |
|---|---|---|
| SVL for TOV event only | 10.0 | 11.34 |
| | 40.5 | 12.57 |
| SVL for TOV event and power frequency fault | 10.1 | 1.13 |
| | 40.3 | 1.25 |

Due to the lower residual voltage, the SVL configured for both TOV events and power frequency faults protects the cable jacket from overvoltages due to lightning events better than the traditional SVLs that are designed to not conduct during power frequency faults. The main reason for that difference in their residual voltage is the difference in the handling of power frequency faults. The traditional SVL has a higher $U_c$ (and so, a higher residual voltage) as it is designed to not conduct during a short-circuit event, in juxtaposition to the SVL configured to conduct during power frequency faults, which has a lower $U_c$ (and by extension a lower residual voltage), which is designed to conduct during a short-circuit event and lower the induced sheath voltage.

With reference to FIGS. 8-15, an SVL module 300 according to some embodiments is shown therein. According to some embodiments, each of the SVLs P1, P2, P3 as discussed herein is constructed and operate as disclosed for the SVL module 300.

Figure 9:
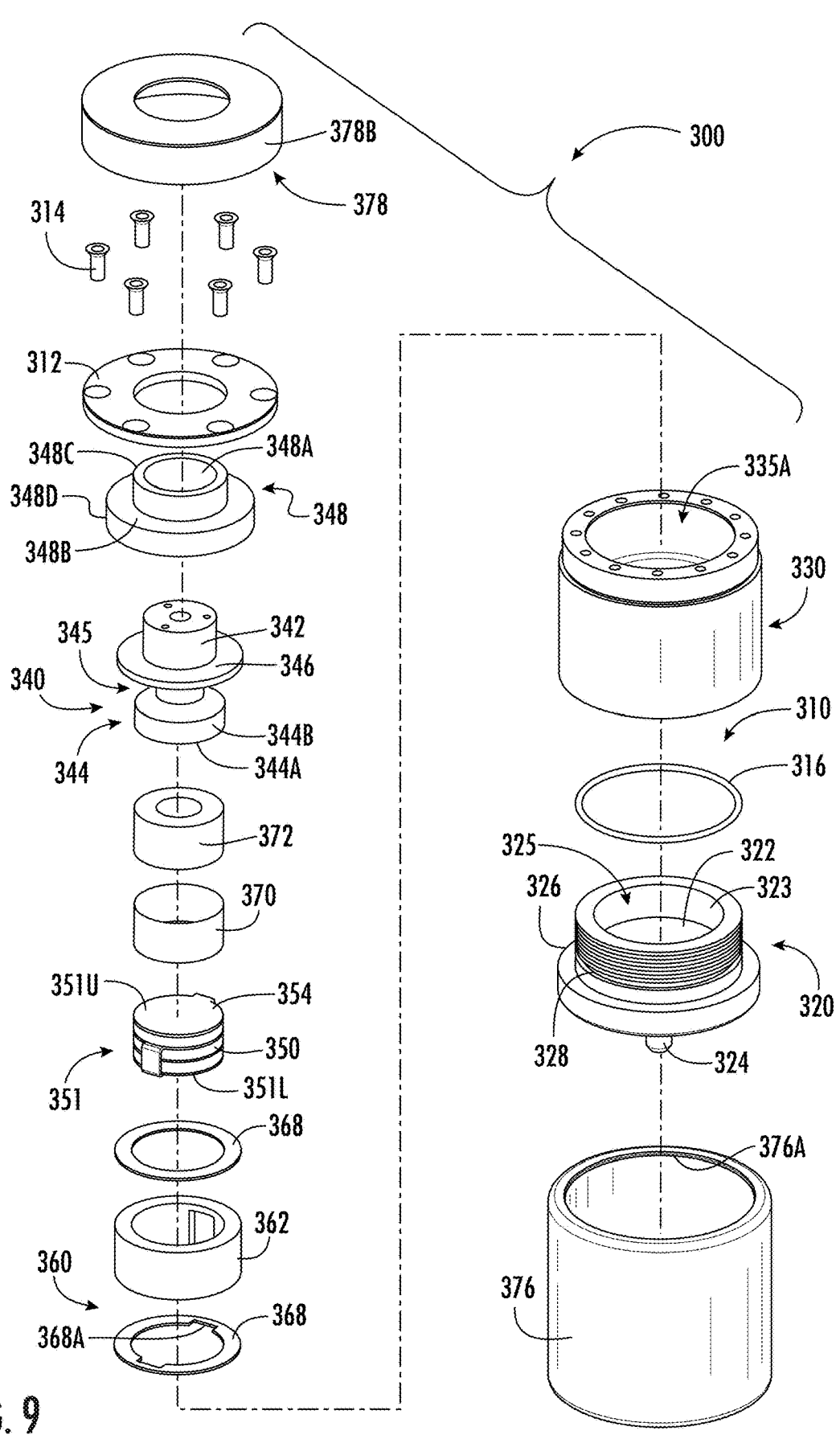
FIG. 9 is an exploded, top perspective view of the SVL module of FIG. 8.
Figure 10:
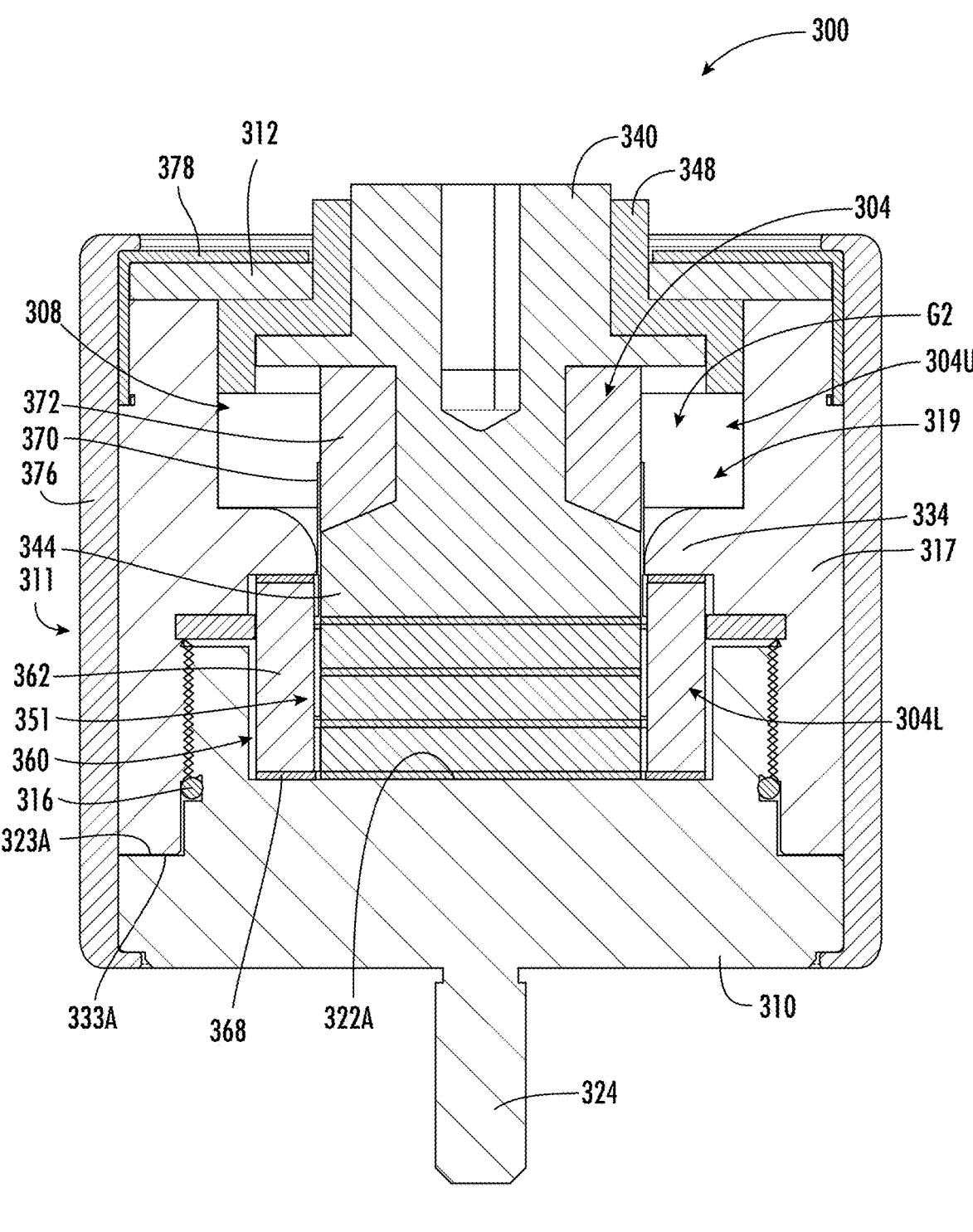
FIG. 10 is a cross-sectional view of the SVL module of FIG. 8 taken along the line 10-10 of FIG. 8.
Figure 11:
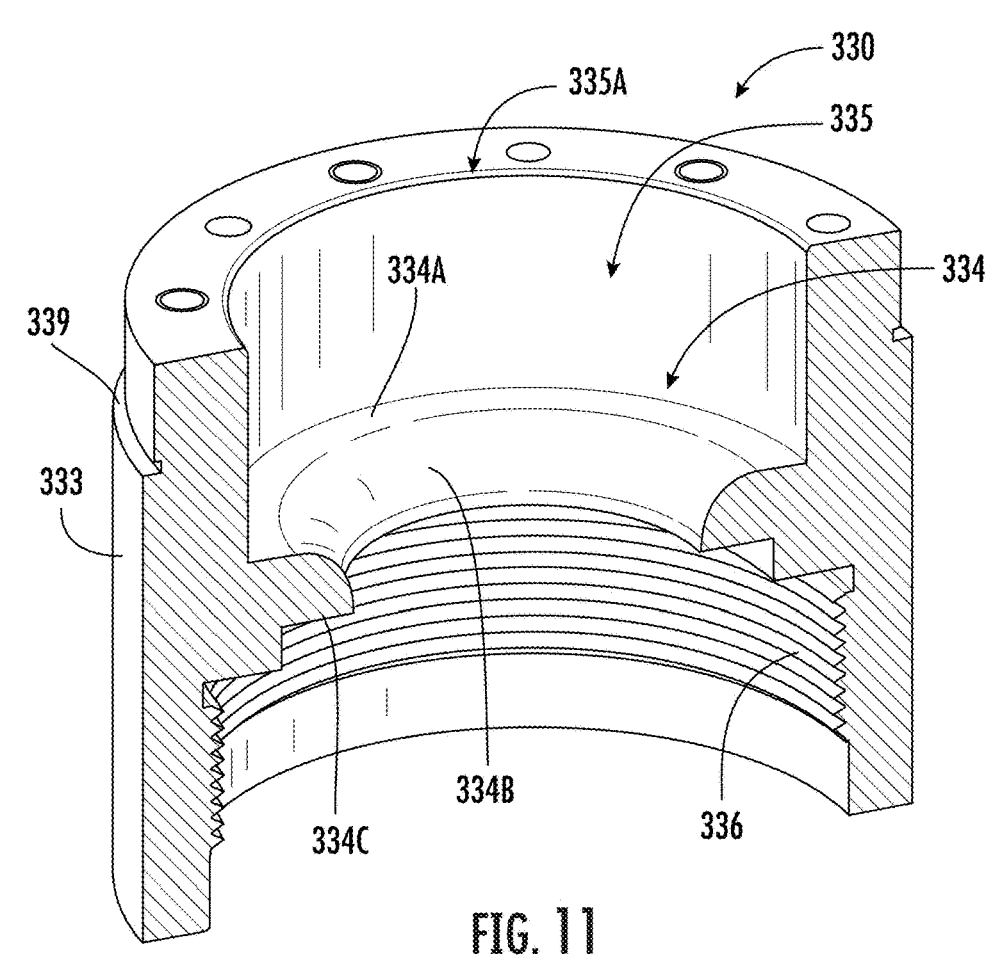
FIG. 11 is a cross-sectional, top perspective view of an extension housing member of the SVL module of FIG. 8.
Figure 12:
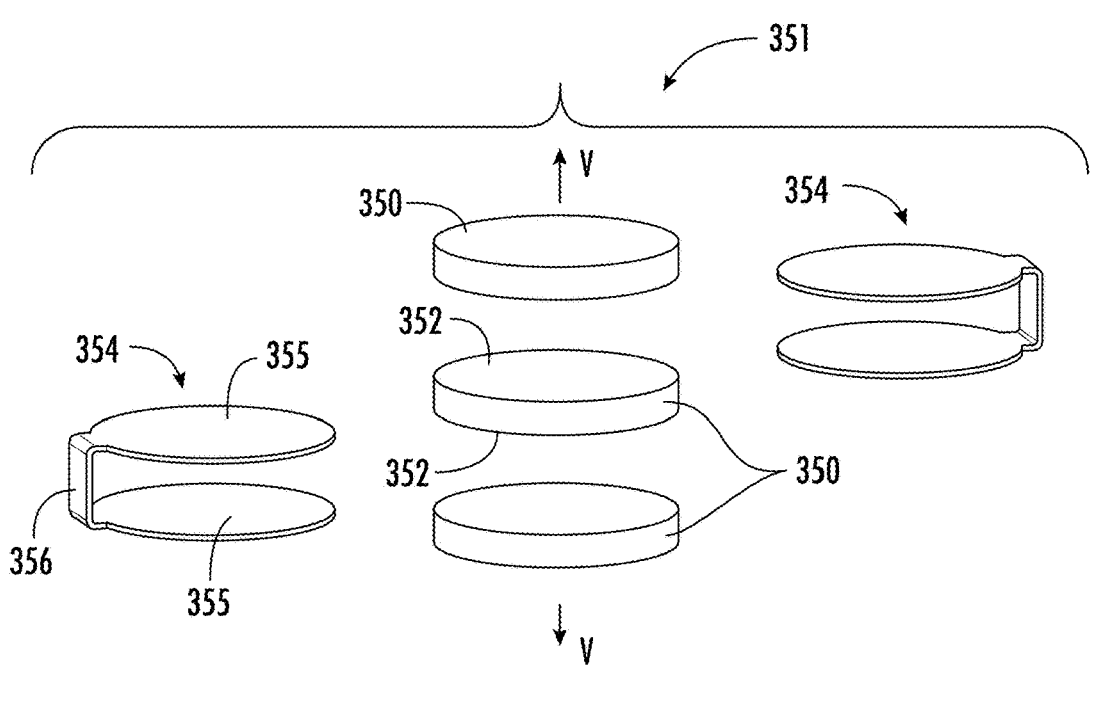
FIG. 12 is an exploded, perspective view of a varistor stack of the SVL module of FIG. 8.
Figure 13:
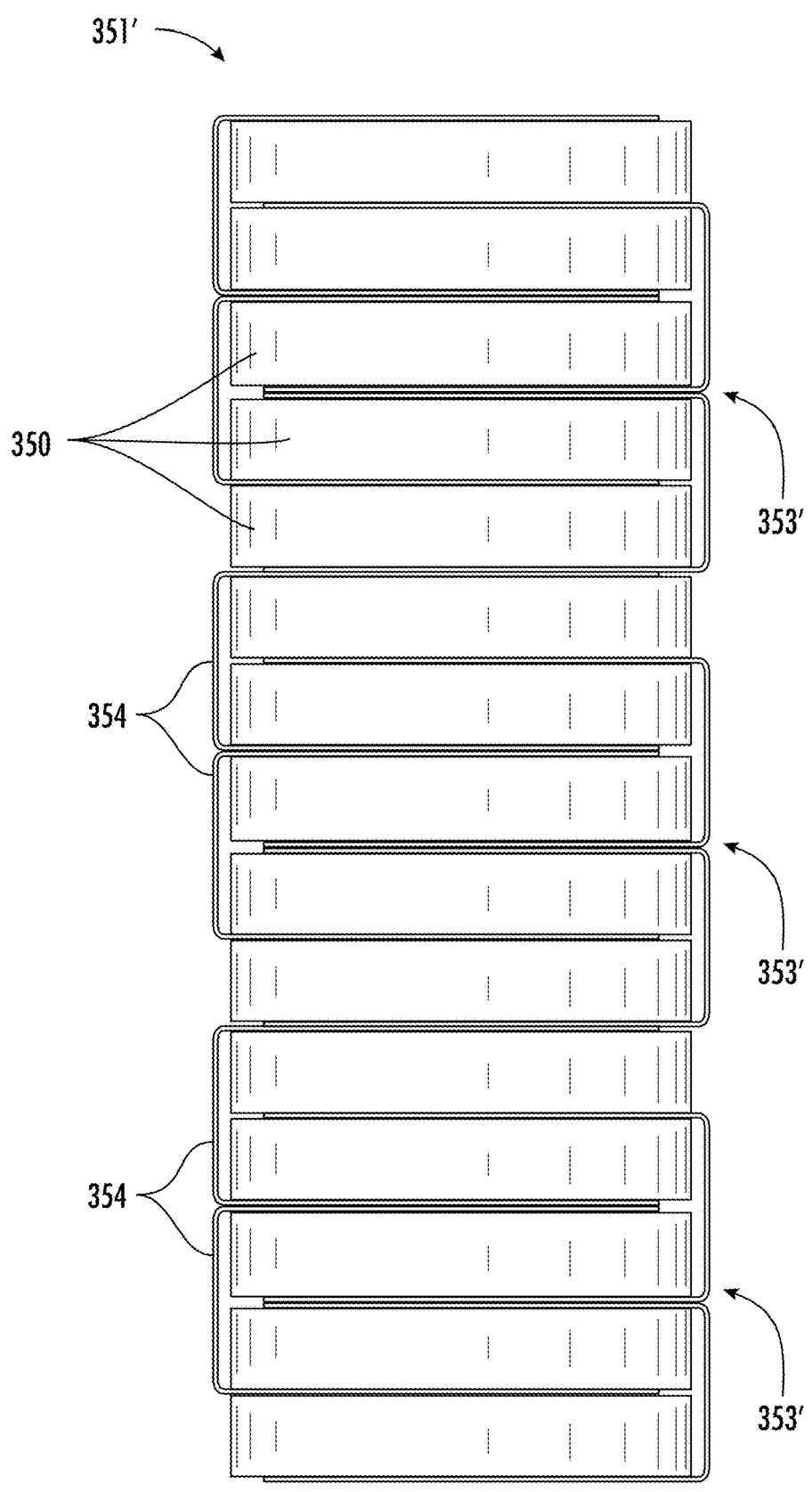
FIG. 13 is a side view of an alternative varistor stack.
Figure 14:
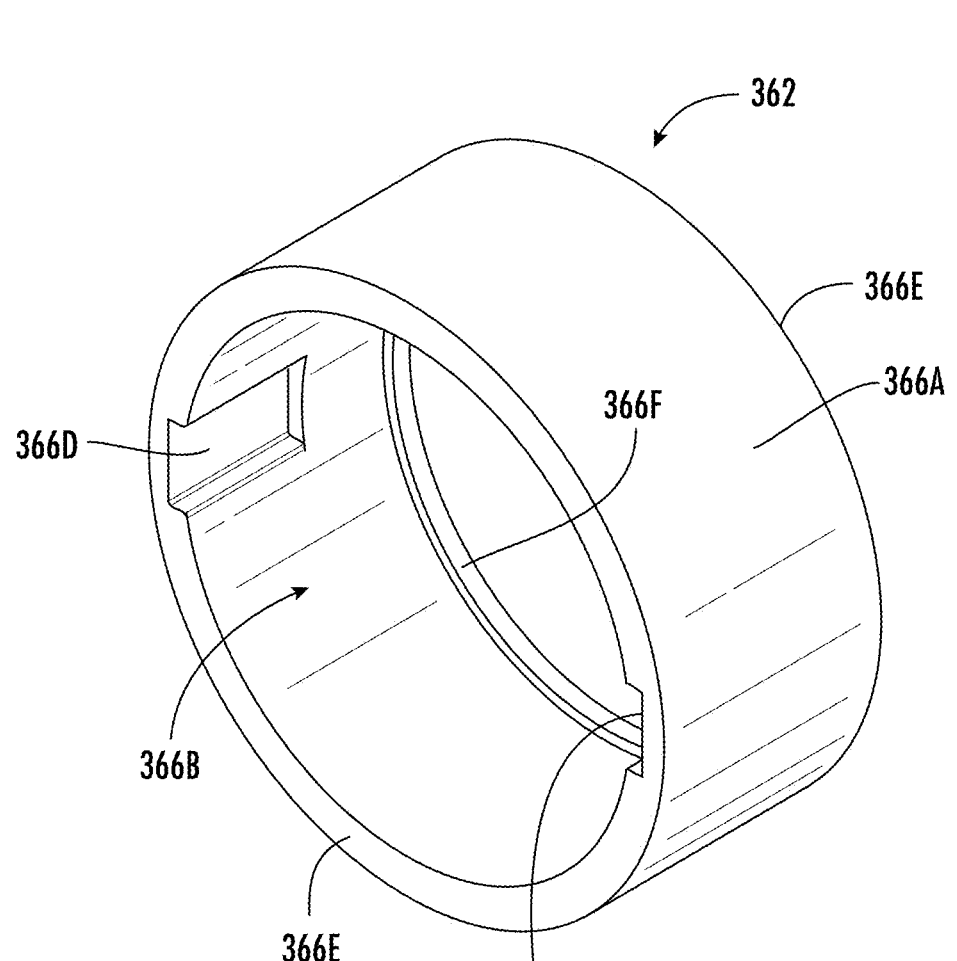
FIG. 14 is perspective view of an insulator sleeve of the SVL module of FIG. 8.
Figure 15:
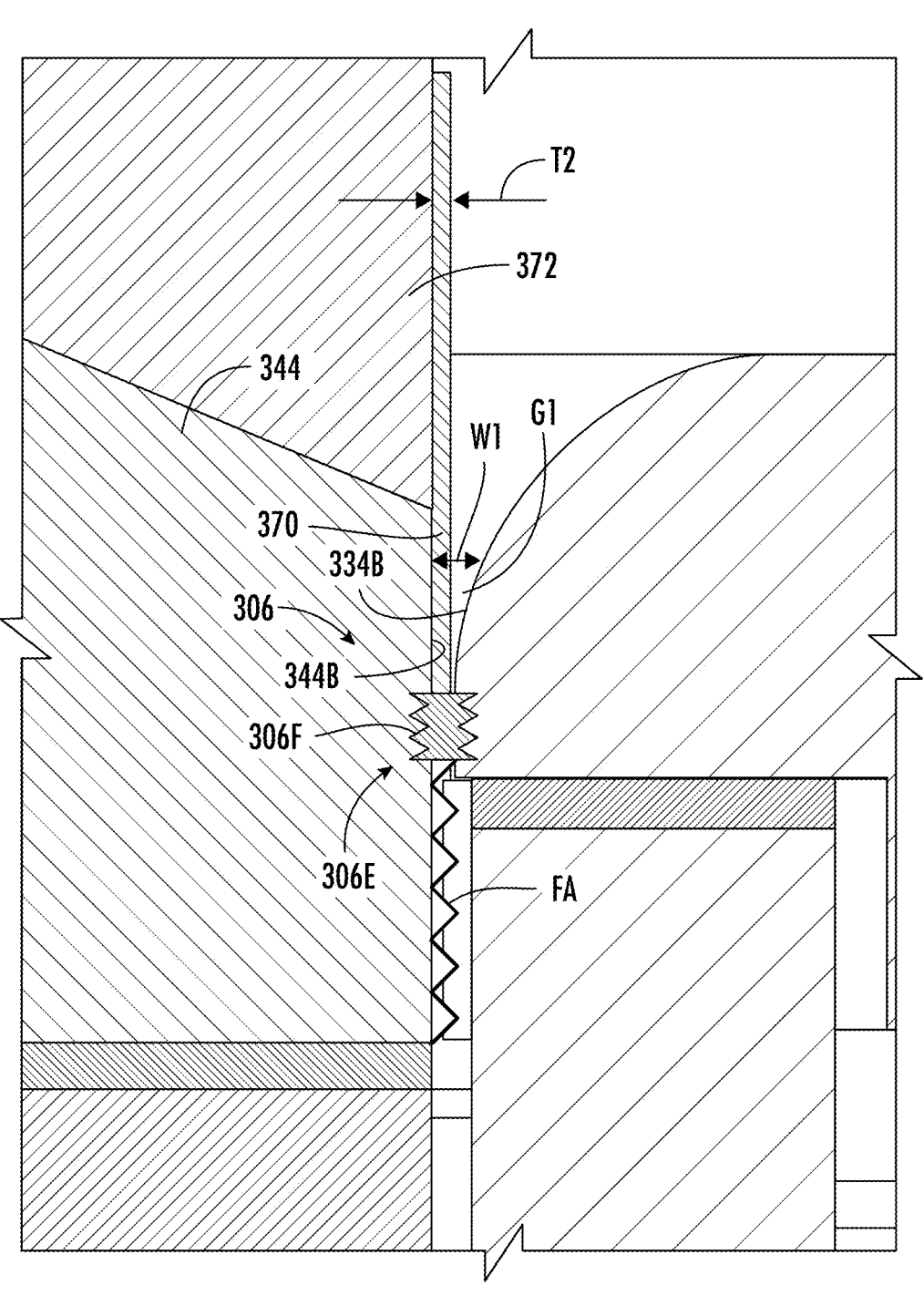
FIG. 15 is an enlarged, fragmentary, cross-sectional view of the SVL module of FIG. 8.

With reference to FIGS. 9, 10, and 15, the SVL module 300 includes a housing assembly 311, a varistor stack 351, an electrical insulator stack assembly 360, an electrical insulator membrane 370, an insulation cover 376, an insulation cap 378, a first fail-safe mechanism 306 (which uses arc fusing), and a second fail-safe mechanism 308 (including a meltable member 372).

The module housing assembly 311 includes and is collectively formed by a lower housing assembly or housing electrode 310, an inner electrode 340, an end cap 312, fasteners 314, and a compression member 348. The housing electrode 310 serves as a second electrode opposite the inner electrode 340. The housing electrode 310 serves an outer electrode.

The lower housing assembly or housing electrode 310 includes two discreet housing parts (namely, a first housing part or member or base housing member 320 and a second housing part or member or extension housing member 330) and an annular scaling member 316. The housing electrode 310 includes a tubular housing side wall 317 and defines a housing cavity 319.

The base housing member 320 is a cup-shaped metallic structure. The base housing member 320 has an end or electrode wall 322 and an integral tubular, cylindrical side wall 323 extending from the end wall 322. The inner surface of the side wall 323 is cylindrical. The side wall 323 and the end wall 322 form a chamber or base cavity 325 communicating with an opening. A threaded terminal post 324 (which serves as the SVL terminal 219) projects axially outwardly from the end wall 322. The end wall 322 has an inwardly facing, substantially planar contact surface 322A. A male screw thread 326 is formed on the outer surface of the side wall 323 at the opening. An annular, substantially planar contact surface 323A is provided below the thread 326 proximate the upper end of the side wall 323. An O-ring groove 328 and a cover locator feature or groove are also defined in the outer surface of the side wall 323.

According to some embodiments, the base housing member 320 is formed of metal. According to some embodiments, the base housing member 320 is formed of aluminum. According to some embodiments, the base housing member 320 is unitary and, in some embodiments, monolithic. The base housing member 320 as illustrated is cylindrically shaped, but may be shaped differently.

The extension housing member 330 (FIG. 11) includes a cylindrical, tubular side wall 333 defining a passage 335 and opposed end openings. A female screw thread 336 is formed on the outer surface of the side wall 333 at the lower opening. An annular, substantially planar contact surface 333A is provided below the thread 336 at the lower end of the side wall 333. A locking groove 339 is also defined in the outer surface of the side wall 333. Fastener holes 338 (e.g., three or more) are defined in the upper end of the side wall 333.

The extension housing member 330 includes an annular, integral flange 334 that projects radially inward from the inner surface of the side wall 333. The flange 334 includes an annular, planar top face 334A, an annular, planar bottom face 334C, and an annular, inwardly facing, rounded side face 334B.

According to some embodiments, the extension housing member 330 is formed of metal. According to some embodiments, the extension housing member 330 is formed of aluminum. According to some embodiments, the extension housing member 330 is unitary and, in some embodiments, monolithic. The extension housing member 330 as illustrated is cylindrically shaped, but may be shaped differently.

According to some embodiments, the annular sealing member 316 is an O-ring. The sealing member 316 may be of any suitable material. According to some embodiments, the sealing member 316 is formed of a resilient material, such as an elastomer.

With reference to FIG. 10, the O-ring 316 (or other sealing member) is seated in the groove 328. The base housing member 320 and the extension housing member 330 are securely fixed together or joined by mating and screwing together the threads 326 and 336 to form a joint HJ. The members 320, 330 are sealed at the joint HJ by the O-ring. The members 320, 330 together form a strong, rigid cup-shaped structure. The members 320, 330 are electrically connected by contact mating between the contact surfaces 323A, 333A. The base housing member 320 and the extension housing member 330 are thus axially stacked along the module axis A-A and in electrical continuity with one another. The base housing member tubular side wall 323 and the extension housing member tubular side wall 333 each form a portion of the housing side wall 317. The base housing member cavity 325 and the extension housing member passage 335 form respective portions of the housing cavity 319.

The SVL housing assembly 311 defines an environmentally sealed, enclosed module chamber 304 that includes the cavity 325 and the passage 335. The module chamber 304 is partitioned into an upper or meltable member chamber 304U and a lower or varistor chamber 304L, by the flange 334 and the inner electrode 340.

The inner electrode 340 has a head 344 disposed in the module chamber 304 and an integral shaft 342 (corresponding to the terminal 218 of the SVLs P1, P2, P3) that projects outwardly through the upper opening of the housing 310.

The head 344 has a substantially planar contact surface 344A that faces the contact surface 322A of the electrode wall 322. The head 344 also has an annular outer side surface 344B.

An integral, annular flange 346 extends radially outwardly from the shaft 342. An annular, sidewardly opening groove 345 is defined by the flange 346 and the head 344 therebetween. A threaded terminal bore 342A is formed in the end of the shaft 342 to receive a bolt for securing the electrode 340 to a cable or busbar, for example.

According to some embodiments, the inner electrode 340 is formed of aluminum. However, any suitable electrically conductive metal may be used. According to some embodiments, the inner electrode 340 is unitary and, in some embodiments, monolithic.

The end cap 312 is substantially plate-shaped and has a profile matching that of the top end of the extension housing member 330. A shaft opening and screw holes are defined in the end cap 312.

According to some embodiments, the end cap 312 is formed of an electrically conductive material. In some embodiments, the end cap 312 is formed of a metal and, in some embodiments, it is formed of aluminum.

The meltable member 372 is annular and is mounted on the inner electrode 340 in the groove 345 within the upper chamber 304U. In some embodiments and as shown, the meltable member 372 is a cylindrical, tubular piece or sleeve. According to some embodiments, the meltable member 372 contacts the shaft 342 and, according to some embodiments, the meltable member 372 contacts the shaft 342 along substantially the full length of the meltable member 372 and the full length of the shaft 342. The meltable member 372 may also engage the lower surface of the flange 334 and the top surface of the head 344. The meltable member 372 is spaced apart from the side wall 333 a distance sufficient to electrically isolate the meltable member 372 from the side wall 333.

The meltable member 372 is formed of a heat-meltable, electrically conductive material. According to some embodiments, the meltable member 372 is formed of metal. According to some embodiments, the meltable member 372 is formed of an electrically conductive metal alloy. According to some embodiments, the meltable member 372 is formed of a metal alloy from the group consisting of aluminum alloy, zinc alloy, and/or tin alloy. However, any suitable electrically conductive metal may be used.

According to some embodiments, the meltable member 372 is selected such that its melting point is greater than a prescribed maximum standard operating temperature. The maximum standard operating temperature may be the greatest temperature expected in the meltable member 372 during normal operation (including handling overvoltage surges within the designed for range of the OVPD module 300) but not during operation which, if left unchecked, would result in thermal runaway. According to some embodiments, the meltable member 372 is formed of a material having a melting point in the range of from about 80 to 160° C. and, according to some embodiments, in the range of from about 80 to 120° C. According to some embodiments, the melting point of the meltable member 372 is at least 20° C. less than the melting points of the extension housing member 330, the inner electrode 340 and the membrane 370, and, according to some embodiments, at least 40° C. less than the melting points of those components.

According to some embodiments, the meltable member 372 has an electrical conductivity in the range of from about $0.5 \times 10^6$ Siemens/meter (S/m) to $4 \times 10^7$ S/m and, according to some embodiments, in the range of from about $1 \times 10^6$ S/m to $3 \times 10^6$ S/m.

The meltable member 372 can be mounted on the electrode 340 in any suitable manner. According to some embodiments, the meltable member 372 is cast or molded onto the electrode 340. According to some embodiments, the meltable member 372 is mechanically secured onto the electrode 340. According to some embodiments, the meltable member 372 is unitary and, in some embodiments, monolithic.

A first annular gap G1 (FIG. 15) is defined radially between the head 344 and the flange side face 334B. According to some embodiments, the gap G1 has a radial width W1 in the range of from about 0.1 mm to 1.0 mm.

A second annular gap G2 (FIG. 10) is defined radially between the meltable member 372 and the side wall 333. The gap G2 defines a tubular void that circumferentially surrounds the meltable member 372. The gap G2 has a larger radial width than the width of the gap G1.

The varistor stack 351 (FIGS. 9 and 12) includes a plurality of varistor members 350 and a plurality of internal parallelization or interconnect members 354. The varistor members 350 and the interconnect members 354 are axially stacked in the lower chamber 304L between the electrode head 344 and the electrode end wall 322 and form the varistor stack 351. The varistor members 350 and the interconnect members 354 are axially aligned along a varistor stack axis V-V, which may be parallel or coaxial with the SVL module axis A-A. The interconnect members 354 electrically interconnect the varistor members 350 and the electrodes 310, 340.

The arrangement of the varistor members 350 and the interconnect members 354 may electrically connect the varistor members 350 in electrical parallel between the electrodes 310, 340, in electrical series between the electrodes 310, 340, or in both electrical parallel and electrical series between the electrodes 310, 340. In the embodiment illustrated in FIG. 9, the varistor stack 351 includes three varistor members 350 and two interconnect members 354 arranged to provide three varistors 350 in parallel. However, other numbers and arrangements of the varistor members 350 and interconnect members 354 may be provided.

In alternative embodiments, the varistor stack can include multiple substacks of varistors stacked in electrical series, with each substack including a plurality of parallel-connected varistors. For example, in the embodiment illustrated in FIG. 13, an alternative varistor stack 351' includes fifteen varistor members 350' and twelve interconnect members 354' arranged to provide three varistor substacks 353' in series, with each varistor substack 353' including five varistors 350' in parallel.

In alternative embodiments, some or all of the varistor members 350 are stacked without interconnect members 354. For example, the SVL module may be assembled with no interconnect members 354.

According to some embodiments, each varistor member 350 is a varistor wafer (i.e., is wafer- or disk-shaped). In some embodiments, each varistor wafer 350 is circular in shape and has a substantially uniform thickness. However, varistor wafers 350 may be formed in other shapes. The thickness and the diameter of the varistor wafers 350 will depend on the varistor characteristics desired for the particular application.

Each varistor wafer 350 has first and second opposed, substantially planar contact surfaces 352.

The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

Each varistor wafer 350 may include a wafer of varistor material coated on either side with a conductive coating so that the exposed surfaces of the coatings serve as the contact surfaces 352. The coatings can be metallization formed of aluminum, copper or silver, for example. Alternatively, the bare surfaces of the varistor material may serve as the contact surfaces 352.

The interconnect members 354 are electrically conductive. Each interconnect member 354 includes a pair of axially spaced apart, disk-shaped contact portions 355 joined by a bridge portion 356.

According to some embodiments, each contact portion 355 is substantially planar, relatively thin and wafer- or disk-shaped. In some embodiments, each contact portion 355 has a diameter to thickness ratio of at least 10. In some embodiments, the thickness of each contact portion 355 is in the range of from about 0.4 mm to 3.0 mm.

According to some embodiments, each contact portion 355 does not have any through holes extending through the thickness of the contact portion.

According to some embodiments, the interconnect members 354 are formed of copper. However, any suitable electrically conductive metal may be used. According to some embodiments, the interconnect members 354 are unitary and, in some embodiments, monolithic.

In the varistor stack 351, the contact portions 355 of the interconnect members 354 are interposed or sandwiched between the varistor wafers 350. The contact portions 355 engage respective ones of the varistor wafer contact surfaces 352. Each said engagement forms an intimate physical or mechanical contact between the interconnect member contact portions and varistor contact surfaces. Each said engagement forms a direct electrical connection or coupling between the interconnect member contact portions and varistor contact surfaces.

The endmost electrical contact surfaces 351U and 351L form the effective electrical contacts between the varistor assembly stack 351 and the electrodes 344 and 310, respectively. The endmost electrical contact surfaces 351U and 351L may each be a varistor contact face 352, a contact portion 355, or an additional electrically conductive component (e.g., a metal spacer plate).

The insulator stack assembly 360 (FIG. 10) includes an insulator body or sleeve 362 and a pair of gaskets 368. The insulator sleeve 362 and the gaskets 368 are axially stacked in the lower chamber 304L between the flange 334 and the electrode wall 322. In other embodiments, the insulator stack assembly includes multiple stacked sleeves 362 with additional gaskets 368 separating adjacent sleeves 362.

The insulator sleeve 362 (FIG. 14) is tubular and includes a side wall 366A defining a through passage 366B. The outer surface of the insulator sleeve 362 is cylindrical and sized and shaped to substantially match the contour of the inner surface of the side wall 323. The inner surface of the insulator sleeve 362 is partially cylindrical to match the contours of the varistor wafers 350. Axially extending slots or receiver channels 366D are defined in the inner surface of the side wall 366A. The insulator sleeve 362 has axially opposed end faces 366E.

The top end of the insulator sleeve 362 further includes an annular barrier flange 366F on its upper end. The barrier flange 366F extends radially inward.

The insulator sleeve 362 is formed of an electrically insulating material. According to some embodiments, the insulator sleeve 362 is formed of an electrically insulating ceramic. Suitable ceramic insulation materials may include alumina, zirconia, zirconia toughened alumina (ZTA), or silicon nitride. According to some embodiments, the insulator sleeve 362 is formed of an electrically insulating high temperature plastic. Suitable high temperature insulation materials may include ULTEM™ 1000, KETRON® 1000 PEEK and similar materials.

The gaskets 368 are annular and may be flat. Some or all the gaskets 368 may include side notches, cut outs or recesses 368A. The gaskets 368 may be shaped the same as or similar to the shapes of the engaging end faces 366E of the insulator sleeve 362.

In some embodiments, the gaskets 368 may be formed of an electrically insulating, resilient, elastomeric material. According to some embodiments, the gaskets 368 are formed of rubber. According to some embodiments, the gaskets 368 are formed of silicone rubber. Suitable materials may include silicone rubber (e.g., VMQ silicone rubber), Styrene Butadiene rubber (SBR), or Polyurethane (PU) elastomers.

In some embodiments, each gasket 368 has a thickness in the range of from about 1 mm to 3 mm.

The gaskets 368 are axially interposed between the end faces 366E of the insulator sleeve 362 and the mating faces 322A, 334C of the housing 310. The recesses 368A are aligned with the receiver channels 366D. The insulator stack assembly 360 circumferentially surrounds the varistor stack 351 through the chamber 304L. The varistor stack 351 is thus separated from the side wall 323 by the insulator stack assembly 360 which is radially interposed therebetween. The barrier flange 366F is positioned immediately below the flange 334 and surrounds the bottom of the head 344.

The membrane 370 (FIGS. 9 and 15) is tubular, relatively thin, and generally cylindrical. The membrane 370 circumferentially surrounds the head 344. In some embodiments, the membrane 370 substantially fully fills the gap G1. In some embodiments, the membrane 370 extends from a top edge above the flange 334 (i.e., in the upper chamber 304U) to a bottom edge below the flange 334. In some embodiments, the bottom edge coincides with the bottom end of the head 344. In some embodiments, the membrane 370 circumferentially surrounds a lower portion of the meltable member 372.

The membrane 370 is formed of a dielectric or electrically insulating material having high melting and combustion temperatures, but which can be disintegrated (such as by melting, burning, combusting or vaporizing) when subjected to an electric arc or the high temperatures created by an electric arc.

According to some embodiments, the membrane 370 is formed of a high temperature polymer and, in some embodiments, a high temperature thermoplastic. In some embodiments, the membrane 370 is formed of polyetherimide (PEI), such as ULTEM™ thermoplastic available from SABIC of Saudi Arabia. In some embodiments, the membrane 370 is formed of non-reinforced polyetherimide or polypropylene.

According to some embodiments, the membrane 370 is formed of a material having a melting point greater than the melting point of the meltable member 372. According to some embodiments, the membrane 370 is formed of a material having a melting point in the range of from about 120 to 200° C. and, according to some embodiments, in the range of from about 140 to 160° C.

According to some embodiments, the membrane 370 material can withstand a voltage of 25 kV per mm of thickness.

According to some embodiments, the membrane 370 has a nominal thickness T2 (FIG. 15) in the range of from about 0.1 to 0.5 mm and, in some embodiments, of 0.3 to 0.4 mm.

The compression member 348 is annular and includes a shaft opening 348A. The compression member 348 includes an annular main body 348B, an integral, annular upper flange 348C and an integral, annular lower flange 348D.

The compression member 348 is formed of an electrically insulating, resilient, elastomeric material. According to some embodiments, the compression member 348 is formed of a material having a hardness in the range of from about 60 Shore A to 85 Shore A. According to some embodiments, the compression member 348 is formed of rubber. According to some embodiments, the compression member 348 is formed of silicone rubber.

The main body 348B of the compression member 348 is captured axially between the end cap 312 and the electrode upper flange 346. The upper flange 348C extends through the end cap opening 312A and the shaft 342 of the electrode 340 extends through the opening 348A, so that the upper flange 348C fills the circumferential gap between the shaft 342 and the end cap 312. The lower flange 348D surrounds the electrode flange 346 so that the lower flange 348D fills the circumferential gap between the electrode flange 346 and the side wall 323.

The compression member 348 serves to electrically insulate the housing electrode 310 from the inner electrode 340. The compressed compression member 348 can also form a seal to constrain or prevent overvoltage event byproducts, such as hot gases and fragments from the varistor wafers 350 from escaping the enclosed chamber 304 through the housing electrode opening 335A.

The main body 348B of the compression member 348 is captured between the end cap 312 and the electrode upper flange 346 and axially compressed (i.e., axially loaded and elastically deformed from its relaxed state) so that the compression member 348 serves as a biasing member and applies a persistent axial pressure or load to the inner electrode 340 and the end cap 312. The compression member 348 thereby persistently biases, presses or loads the electrode head 344 and the end wall 322 against the varistor stack 351 along a load or clamping axis in convergent directions to ensure firm and uniform engagement between the interfacing contact surfaces of the head 344, the end wall 322, the varistor members 336, and the interconnect members 354. In some embodiments, the clamping axis is substantially coincident with the axis A-A.

The cover 376 is used to provide electrical insulation between the housing assembly 311 and surrounding space. The cover 376 is tubular and includes integral upper and lower lock flanges 376A. The cover 376 is configured to fit snugly around the housing electrode 310, extend from end to end. The cover upper and lower lock flanges 376A lock the cover 376 on the housing assembly 311.

The insulation cover 376 may be formed of any suitable electrically insulating material. According to some embodiments, the cover 376 is formed of rubber. According to some embodiments, the cover 376 is formed of silicone rubber.

The insulation cap 378 provides electrical insulation between the inner electrode 340, the end cap 312, the housing electrode 310 and surrounding space. The insulation cap 378 is generally cup-shaped. The cap 378 includes an opening that snugly receives the compression member upper flange 348C. The cap 378 includes an annular flange 378B that is snugly interposed between the insulation cover 376 and the housing member 330. The flange 378B is provided with one or more latch features that interlock with the locking groove 339 of the extension housing member 330 to secure the cap 378.

The insulation cap 378 may be formed of any suitable electrically insulating material. According to some embodiments, the insulation cap 378 is formed of rubber. According to some embodiments, the insulation cap 378 is formed of silicone rubber.

The SVL module 300 is assembled as shown in FIG. 10. When assembled, the flange 334 presses against the insulator stack 360 to fix the insulator stack 360 in place. In some embodiments, the components are configured such that the gaskets 368 are resiliently or elastically deformed and tend to push the insulator sleeves 362, 364 apart. The end cap 312 is bolted to the upper end of the extension housing member 330 using fasteners 314 and holes 338, thereby compressing the compression member 348, which in turn presses the inner electrode 340 against the varistor stack 351.

As discussed above, an SVL module as described can used for each of the SVLs P1, P2, P3. The terminal 342 corresponds to the input terminal 218. The terminal 324 corresponds to the output terminal 219. The fail-safe mechanisms 306, 308 correspond to the fail-safe system 217.

The head 344, flange 334, varistor stack 351, and membrane 370 are relatively constructed and configured to form the first fail-safe system 306. The meltable member 372 and the electrodes 340, 310 are relatively constructed and configured to form the second fail-safe system 308. The first fail-safe system 306 and the second fail-safe system 308 provide safe failure modes for the SVL module 300. The fail-safe systems 306, 308 are adapted to prevent or inhibit overheating or thermal runaway of the SVL module 300, as discussed in more detail below.

The first fail-safe system 306 and the second fail-safe system 308 are each adapted and configured to electrically short circuit the current applied to the SVL module 300 around the varistor 350 to prevent or reduce the generation of heat in the varistor. In this way, the fail-safe systems 306, 308 can operate as switches to bypass the varistor 350 and prevent overheating and catastrophic failure as described above. According to embodiments of the invention, the fail-safe systems 306, 308 operate independently of one another. More particularly, in some embodiments, the fail-safe system 306 will operate to short circuit the SVL module 300 when a first type or set of operating conditions are experienced by the SVL module 300 and the fail-safe system 308 will operate to short circuit the SVL module 300 when a second type or set of operating conditions, different from the first, are experienced by the SVL module 300. That is, under different circumstances, the fail-safe system 308 may operate or execute first or the fail-safe system 306 may operate or execute first. Ordinarily, though not necessarily, only one of the fail-safe systems will execute, whereupon the conditions necessary to invoke the other fail-safe system will be prevented from arising.

The operation of the fail-safe systems 306, 308 will be described in more detail hereinbelow. As used herein, a fail-safe system is "triggered" upon occurrence of the conditions necessary to cause the fail-safe system to operate as described to short circuit the electrodes 310, 340.

Turning to the second fail-safe system 308 in more detail, when heated to a threshold temperature, the meltable member 372 will flow to bridge and electrically connect the electrodes 310, 340. The meltable member 372 thereby redirects the current applied to the device 300 to bypass the varistor 350 so that the current induced heating of the varistor 350 ceases. The fail-safe system 306 may thereby serve to prevent or inhibit thermal runaway without requiring that the current through the SVL device 300 be interrupted.

More particularly, the meltable member 372 initially has a first configuration as shown in FIG. 10 such that it does not electrically couple the inner electrode 340 and the housing electrode 310 except through the head 344. Upon the occurrence of a heat buildup event, the inner electrode 340 is thereby heated. The meltable member 372 is also heated directly and/or by the inner electrode 340. During normal operation, the temperature in the meltable member 372 remains below its melting point so that the meltable member 372 remains in solid form. However, when the temperature of the meltable member 372 exceeds its melting point, the meltable member 372 melts (in full or in part) and flows by force of gravity into a second configuration different from the first configuration. When the device 300 is vertically oriented, the melted meltable member 372 accumulates in the lower portion of the chamber 304U as a reconfigured meltable member (which may be molten in whole or in part). The reconfigured meltable member 372 bridges or short circuits the inner electrode 340 to the housing electrode 310 to bypass the varistor stack 351. That is, a new direct flow path or paths are provided from the surface of the inner electrode 340 to the surfaces of the housing side wall 333 through the reconfigured meltable member 372. According to some embodiments, at least some of these flow paths do not include the varistor stack 351.

The reconfigured meltable member 372 is typically contained in the chamber 304U. The molten meltable member 372 is contained on the upper end by the compression member 348. The molten meltable member 372 is contained on the lower end by the head 344, the flange 334 and the membrane 370. The barrier flange 366B can prevent the meltable member 372 from flowing into the lower chamber 304L and into the varistor stack 351.

According to some embodiments, the second fail-safe system 308 can be triggered by at least two alternative triggering sets of operating conditions, as follows.

The second fail-safe system 308 can be triggered by heat generated in a varistor 350 by excessive leakage current. More particularly, when the voltage across the varistor 350 exceeds the nominal clamping voltage VNOM, a leakage current will pass through the varistor 350 and generate heat therein from ohmic losses. This may occur because the VNOM has dropped due to varistor 350 aging and/or because the voltage applied by the circuit across the device 300 has increased.

The second fail-safe system 308 can also be triggered when a varistor 350 fails as a short circuit. In this case, the varistor 350 will generate heat from a fault current through the short circuit failure site (e.g., a pinhole in the varistor). The fault current generates heat (from high localized ohmic loss heating at the pinhole) in and adjacent the varistor 350. As discussed below, a fail-short varistor may trigger the first fail-safe system 306 instead of the second fail-safe system 308, depending on the magnitude of the fault current and other conditions.

With reference to FIG. 15, the first fail-safe system 306 can be triggered when a varistor 350 fails as a short circuit. In this case, arcing will occur adjacent and within a short circuit failure site in the varistor 350 (i.e., the arc is initiated at the varistor 350). More particularly, the arcing FA will occur between the varistor 350 or an interconnect member 354 and one or both electrodes 310, 340. The arcing will propagate along the head 344 and, in some cases, the varistor stack 353. Ultimately, the arcing propagates or occurs directly between the outer peripheral side wall 344B of the electrode head 344 and the adjacent side surface 334B of the flange 334. This latter arcing causes a metal surface portion of the head side wall 344B and a metal surface portion of the flange side wall 334B to fuse or bond directly to one another in a prescribed region at a bonding or fusing site 306E to form a bonded or fused interface portion, or region 306F. The arc FA fuses or bonds the surfaces and portions 334B, 344B. In some embodiments, the electrodes 310, 340 are both formed of aluminum or aluminum alloy, so that the bond is direct aluminum-to-aluminum, which can provide particularly low ohmic resistance. The fusing or bonding may occur by welding induced by the arc. In this way, the electrodes 310, 340 are shorted at the interface 306F to bypass the varistors 350 so that the current induced heating of the failed varistor 350 ceases.

The electrical insulation membrane 370 is provided between the flange side surface 334B and the electrode head 344 to provide electrical isolation in normal operation. However, the membrane 370 is formed of a material that is quickly disintegrated, melted or vaporized by the arcing so that the membrane 370 does not unduly impede the propagation of the arc or the bonding of the electrodes 310, 340 as described.

The void G2 above the flange 334 around the inner electrode 340 in the chamber 304U provides a break between the adjacent surfaces of the inner electrode 340 and the housing electrode 310 to extinguish the electric arc (i.e., to prevent the arc from continuing up the side wall 333). The void G2 reduces the time required to terminate the arc and facilitates more rapid formation of the bonded interface 306F.

In the event of a fail-short varistor, either or both first and second fail-safe systems 306, 308 may be triggered or activated. The first fail-safe system 306 requires a fault current sufficient to create the arcing, whereas the second fail-safe system 308 does not. When sufficient fault current is present to create the arcing, the first fail-safe system 306 will typically execute and form the electrode short circuit before the second fail-safe system 308 can form the meltable member short. However, if the applied current is insufficient to generate the arcing, the fault current will continue to heat the device 300 until the second fail-safe system 308 is activated. Thus, where a fail-short varistor is the trigger, the second fail-safe system 308 will operate for relatively low current and the first fail-safe system 306 will operate for relatively high current.

Thus, the meltable member 372 and the fused interface 306F each provide a direct electrical contact surface or a low resistance bridge between the inner electrode 340 and the housing electrode 310 and an enlarged current flow path (i.e., a lower resistance short circuit) via the meltable member 372 or the fused site 306F. In this way, the fault or leakage current is directed away from the varistor stack 351. The arcing, ohmic heating and/or other phenomena inducing heat generation are diminished or eliminated, and thermal runaway and/or excessive overheat of the SVL module 300 can be prevented. The SVL module 300 may thereby convert to a relatively low resistance element capable of maintaining a relatively high current safely (i.e., without catastrophic destruction of the device). The fail-safe systems 306, 308 can thus serve to protect the SVL module 300 from catastrophic failure during its end of life mode. The present invention can provide a safe end of life mechanism for a varistor-based overvoltage device. It will be appreciated that the SVL module 300 may be rendered unusable thereafter as an overvoltage protection device, but catastrophic destruction (e.g., resulting in combustion temperature, explosion, or release of materials from the SVL module 300) is avoided.

According to some embodiments, the meltable member 372 bypass and the fused interface 306F bypass each have an ohmic resistance of less than about 3 mOhm.

In some embodiments, the SVL module 300 may be effectively employed in any orientation. For example, the SVL module 300 may be deployed in a vertical orientation or a horizontal orientation. When the meltable member 372 is melted by an overheat generation event, the meltable member 372 will flow to the lower portion of the chamber 304U where it forms a reconfigured meltable member (which may be molten in whole or in part) that bridges the inner electrode 340 and the housing electrode 310 as discussed above. The chamber 304U is sealed so that the molten meltable member 372 does not flow out of the chamber 304U.

The external elastomeric insulating cover sleeve 376 serves to increase the insulation between the SVL module 300 and adjacent devices and to increase the creepage and air clearance distances.

During use, the varistor wafers may be damaged by overheating and may generate arcing inside the SVL housing assembly 311. The SVL housing assembly 311 can contain the damage (e.g., debris, gases and immediate heat) within the SVL module 300, so that the SVL module 300 fails safely. In this way, the SVL module 300 can prevent or reduce any damage to adjacent equipment (e.g., switch gear equipment in the cabinet) and harm to personnel. In this manner, the SVL module 300 can enhance the safety of equipment and personnel.

According to some embodiments, the biased electrodes (e.g., the electrodes 310 and 340) apply a load to the varistors along the axis V-V in the range of from 5 kN to 100 kN depending on its surface area.

In alternative embodiments (not shown), the SVL module 300 may be modified to use biasing or loading means such as metal spring washers and separate sealing means such as elastomeric O-rings.

In the assembled SVL module 300, the large, planar contact surfaces of the components 344, 350, 354, 322 can ensure reliable and consistent electrical contact and connection between the components during an overvoltage or surge current event. The head 344 and the end wall 322 are mechanically loaded against these components to ensure firm and uniform engagement between the mating contact surfaces.

According to some embodiments, the combined thermal mass of the housing (e.g., the housing electrode 310) and the electrode (e.g., the electrode 340) is substantially greater than the thermal mass of each of the varistors captured therebetween. The greater the ratio between the thermal mass of the housing and electrodes and the thermal mass of the varistors, the better the varistors will be preserved during exposure to surge currents and TOV events and therefore the longer the lifetime of the SVL. As used herein, the term "thermal mass" means the product of the specific heat of the material or materials of the object multiplied by the mass or masses of the material or materials of the object. That is, the thermal mass is the quantity of energy required to raise one gram of the material or materials of the object by one degree centigrade times the mass or masses of the material or materials in the object. According to some embodiments, the thermal mass of at least one of the electrode head and the electrode wall is substantially greater than the thermal mass of the varistor. According to some embodiments, the thermal mass of at least one of the electrode head and the electrode wall is at least two times the thermal mass of the varistor, and, according to some embodiments, at least ten times as great. According to some embodiments, the combined thermal masses of the head and the electrode wall are substantially greater than the thermal mass of the varistor, according to some embodiments at least two times the thermal mass of the varistor and, according to some embodiments, at least ten times as great.

Figure 16:
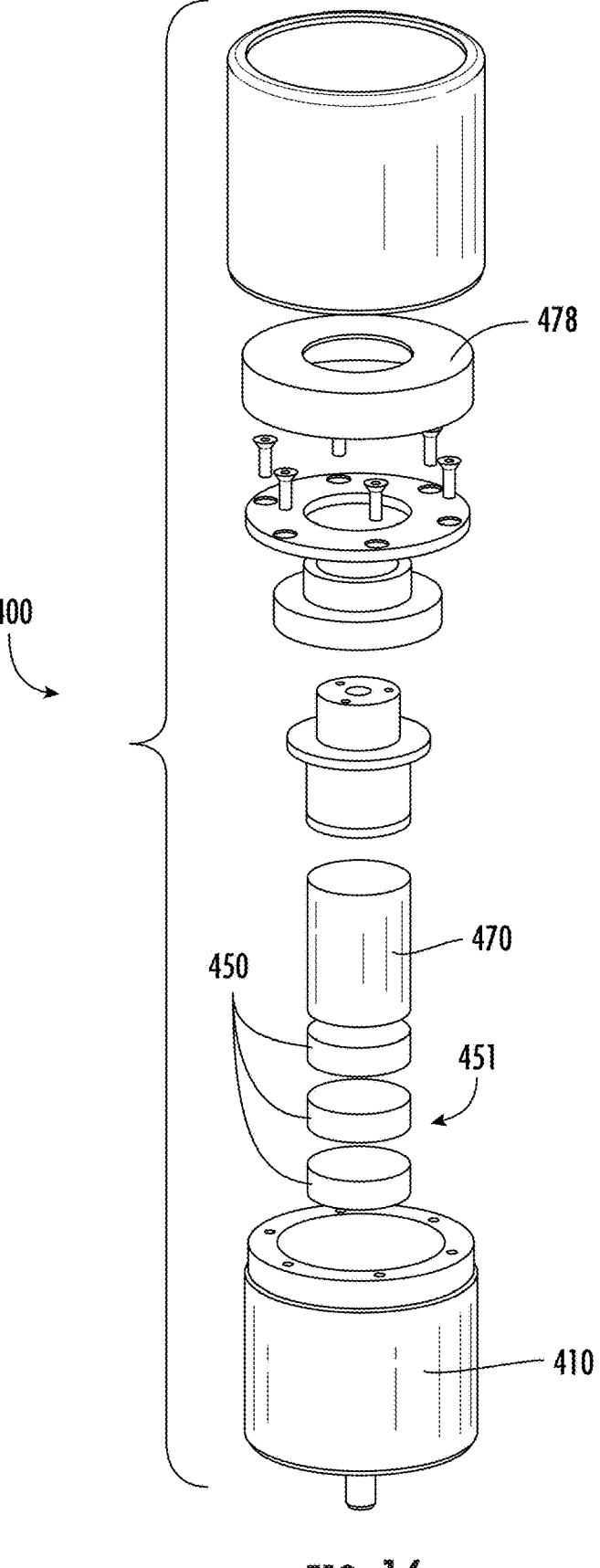
FIG. 16 an exploded, top perspective view of an alternative SVL module of the link box of FIG. 5.
Figure 17:
FIG. 17 is a cross-sectional view of the SVL module of FIG. 16.

With reference to FIGS. 16 and 17, an SVL module 400 according to some embodiments is shown therein. According to some embodiments, each of the SVLs P1, P2, P3 as discussed herein is constructed and operate as disclosed for the SVL module 400.

The SVL module 400 includes a housing assembly 411, a varistor stack 451, an electrical insulator membrane 470, a cover 476, an insulation cap 478, a first fail-safe mechanism 406 (which uses arc fusing), and a second fail-safe mechanism 408 (including a meltable member 472). The components 411, 451, 470, 476, 478, 406, 408, and 472 may be constructed and operate substantially in the same manner as the components 311, 351, 370, 376, 378, 306, 308, and 372, respectively, except as follows.

The module housing assembly 411 includes a one-piece lower housing electrode 410 instead of the two-piece lower housing electrode 310. The varistor stack 451 includes varistors 450 arranged in electrical series instead of parallel. No electrical insulator stack assembly corresponding to the electrical insulator stack assembly 360 is provided. The electrical insulator membrane 470 surrounds the varistor stack 451 to insulate the varistors 450 from the electrode side wall 433. The lower end of the electrical insulator membrane 470 coincides with the lower edge of the lowest varistor 450 of the stack 451.

Figure 18:
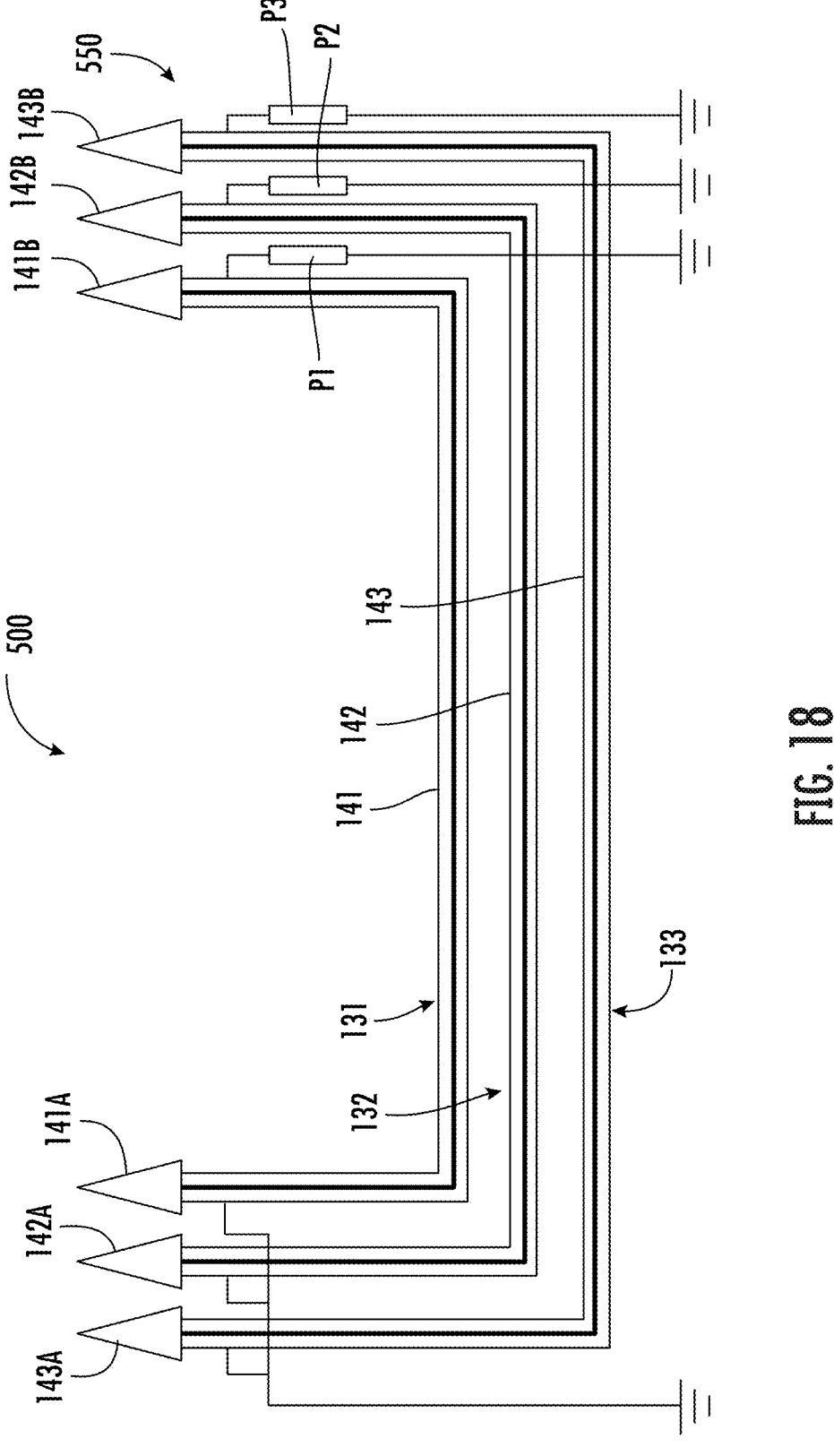
FIG. 18 is a schematic view of an electrical power generation system including a sheath bonding system according to further embodiments.

With reference to FIG. 18, a single-point sheath bonding or overvoltage/induced current control system 550 according to some embodiments is shown therein. The sheath bonding system 550 may be incorporated into the power generation system 100 as illustrated in FIG. 1 to form an alternative power generation system 500 in accordance with some embodiments. The sheath bonding system 550 includes three of the SVLs P1, P2, P3 as disclosed hereinabove.

In the sheath bonding system 550, the first ends 141A, 142A, 143A of the cable sheaths 141, 142 and 143 are each solidly bonded to ground, as illustrated in FIG. 18.

Also, in the sheath bonding system 550, the opposing second ends 141B, 142B, 143B of the cable sheaths 141, 142 and 143 are each connected to ground through the SVLs P1, P2 and P3, respectively. As discussed above with regard to the cross-bonding sheath bonding system 150, the sheaths 141, 142, 143 are connected to ground only indirectly or selectively. That is, the SVLs P1, P2, P3 do not directly bond the sheaths 141, 142, 143 to ground.

The SVLs P1, P2, P3 electrically isolate the ends 141B, 142B, 143B of the sheaths 141, 142, 143 from ground except in response to conditions that cause the SVLs to conduct. More particularly, the varistor 215 of each SVL P1, P2, P3 electrically insulates the sheaths from ground or electrically connects the sheaths to ground, depending on the conditions of the system and the state of the varistor 215. Additionally, each SVL P1, P2, P3 has a fail-safe system 217 that causes the SVL P1, P2, P3 to short or connect the associated sheaths to ground in response to some conditions or events. Each fail-safe system 217 may include multiple fail-safe mechanisms that respond to different conditions or events.

In use, the SVLs P1, P2, P3 will respond to the different operating conditions of or voltage events on the sheaths 141, 142, 143 in the same manner as described for the cross-bonding sheath bonding system 150, and will protect the cables 131, 132, 133 in the same manner.

The sheath bonding system 550 may include a link box including the SVLs P1, P2, P3, a housing containing the SVLs, and associated connectors. However, the link box of the sheath bonding system 550 will not include cross-connection interconnects.

Embodiments of the single point bonding configuration may be illustrated by way of example. In the single point bonding configuration, configuration the sheaths of one end of the cable are directly earthed and the sheaths at the other end of the cable are not earthed or they are earthed through SVLs (either way not directly earthed). These SVLs traditionally do not conduct at steady state or faults such as short-circuits (power frequency faults –50 Hz or 60 HZ, depending on the power system). These sheath voltage limiters protect the cable jacket only during TOV events (e.g., lightning, etc.) from induced overvoltages.

SVLs according to some embodiments of the inventive concept conduct during power frequency faults (i.e., short circuits) protecting the cable jacket from the induced overvoltages during these faults. To do that they have a lower maximum continuous operating voltage ($U_c$) and by extension a lower residual voltage. That means that during lightning events the SVL according to some embodiments of the inventive concept has the ability to better protect the cable jacket as it is stressed less due to the lower residual voltage.

To illustrate the differences between the traditional SVLs and the SVLs according to embodiments of the inventive concept, a simulation of a MV cable has been performed. This cable has the following characteristics:

The 30 kV line comprises of 3 single-core cables in trefoil formation (500 m).

The cable is single-core (SC) cable of type A2X(FL)2Y, 18/30 (36) kV, $3\times800$ mm$^2$ with aluminum conductors, XLPE main insulation, A1-PE sheath and HDPE jacket.

A nominal power of the line of 10 MW is assumed.

The single-phase short-circuit of the line is assumed to be 1.5 kA.

Figure 27:
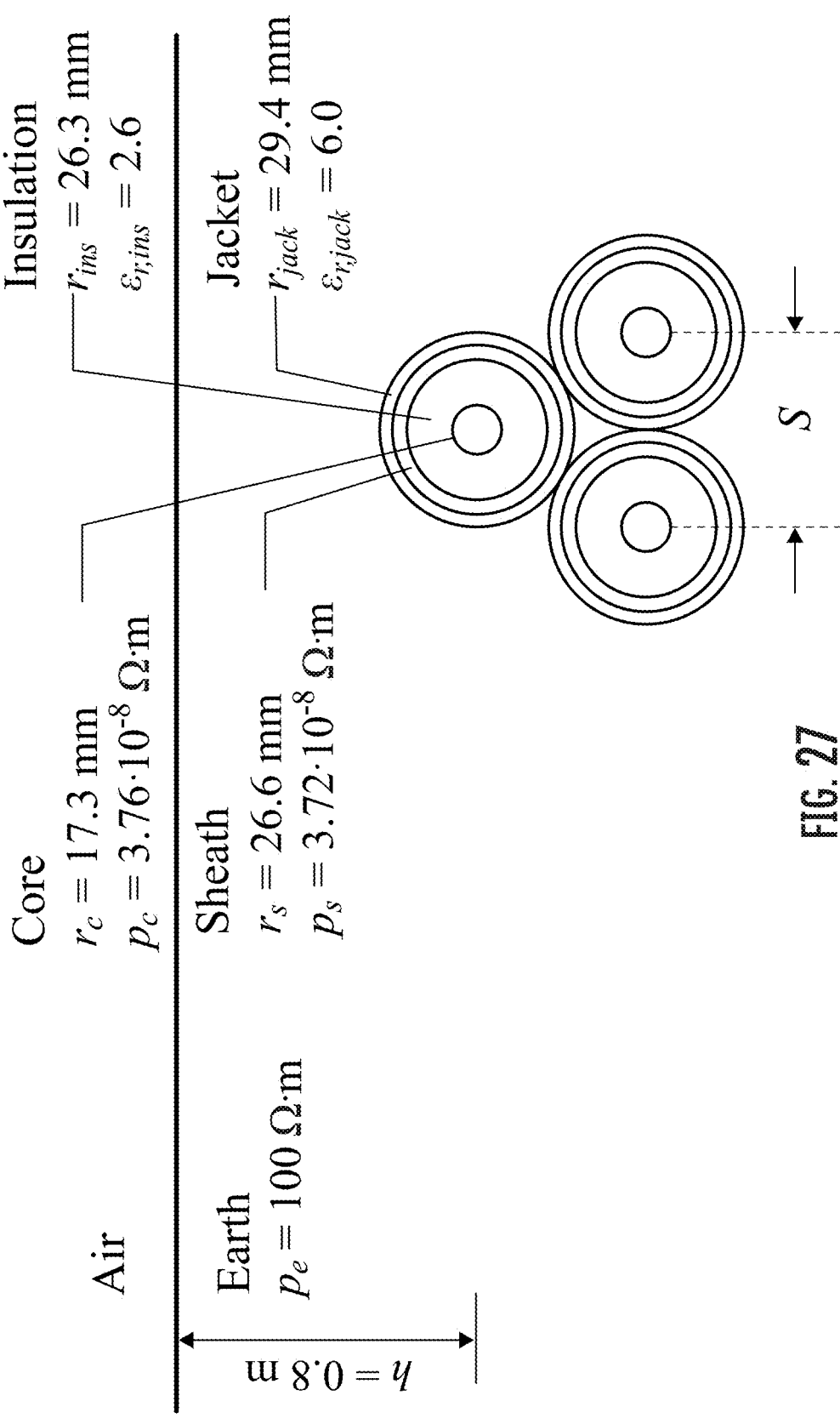
FIG. 27 is a cross-section of a simulated cable configured in a single point bonding configuration.

The cable configuration is shown in FIG. 27.

Figure 28:
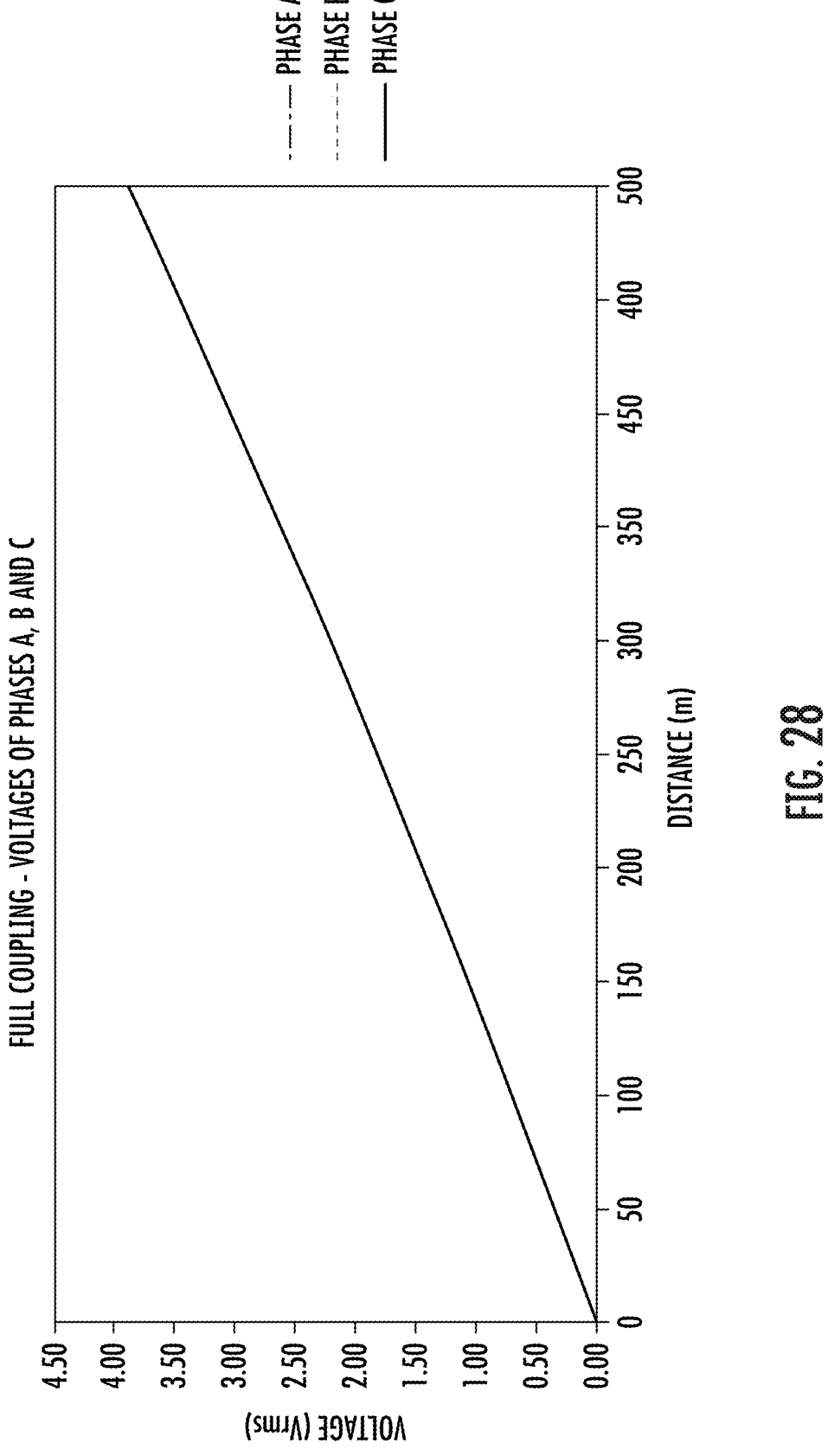
FIGS. 28-30 illustrate the sheath induced voltages and currents of the single pointed bonded cable during steady state.
Figure 29:
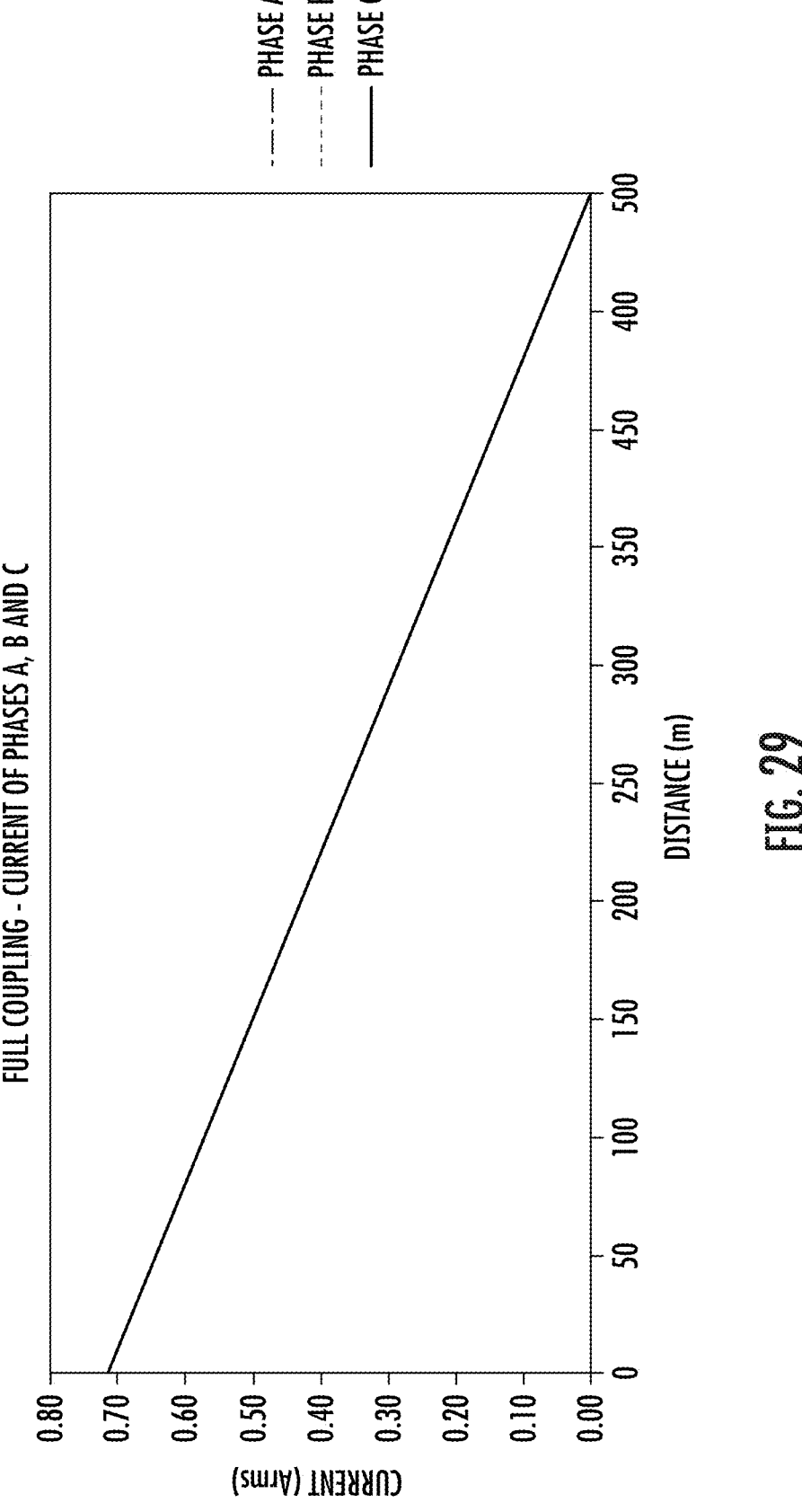
Figure 30:
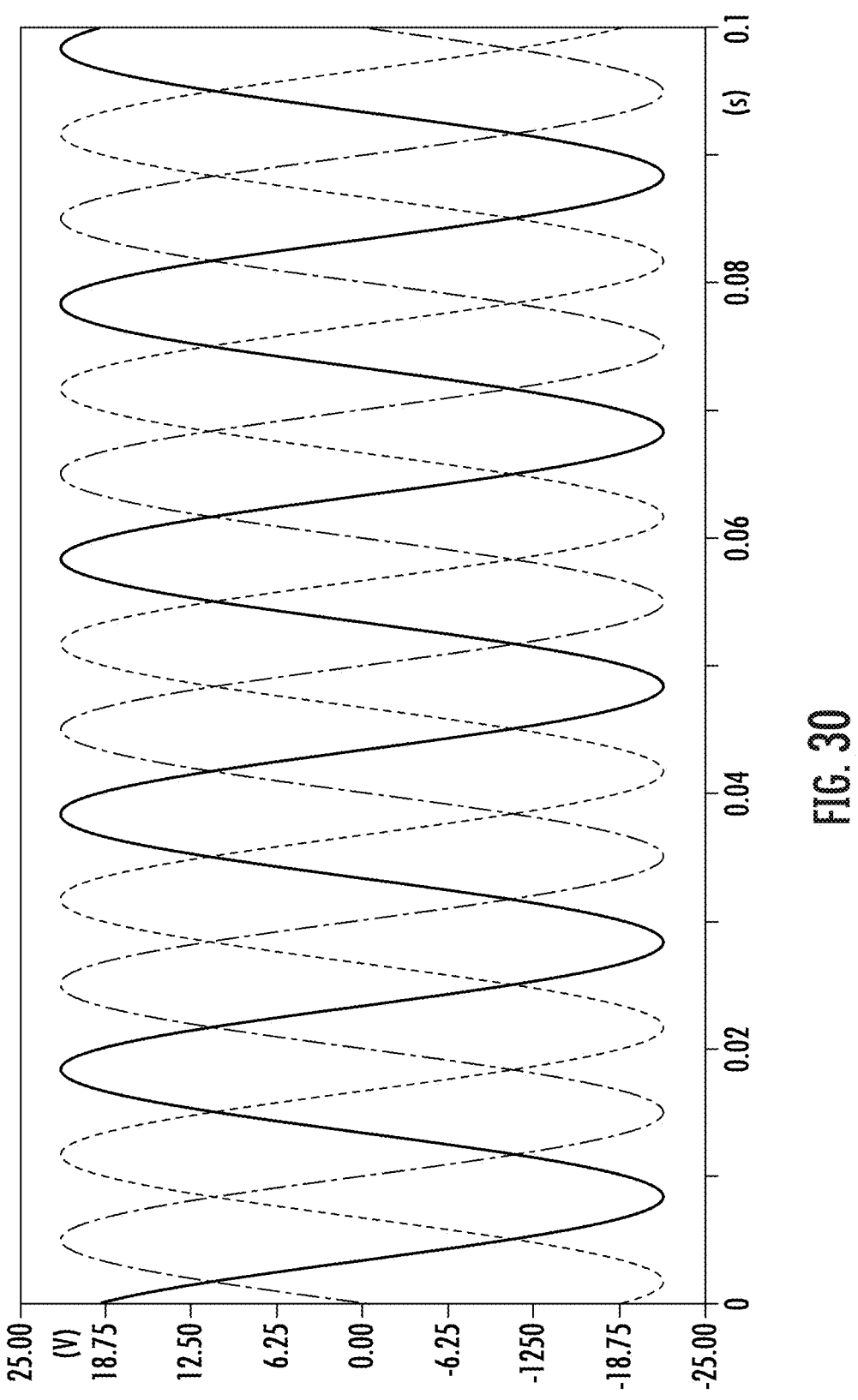

As shown in FIGS. 28-30, the voltage of the unearthed end of the line and the included voltages and currents across the cable line (0m—Wind/Solar Park & 500 m—Substation) show that during steady state both kinds of SVLs do not conduct.

Figure 31:
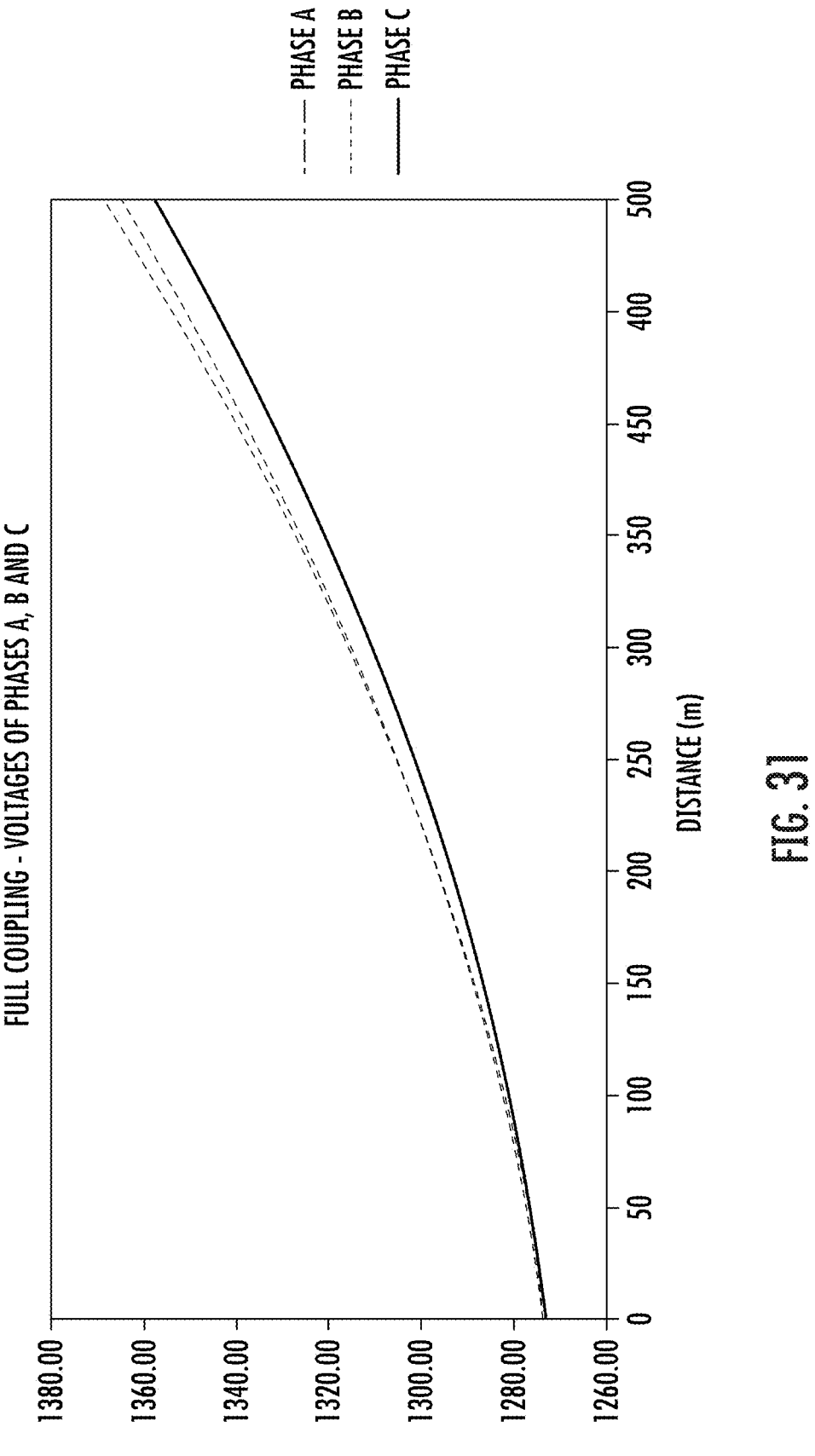
FIGS. 31 and 32 illustrate the sheath induced voltages of a traditional SVL and FIGS. 33 and 34 illustrate the sheath induced voltages on an SVL according to some embodiments of the inventive concept during a simulated power frequency fault.
Figure 32:
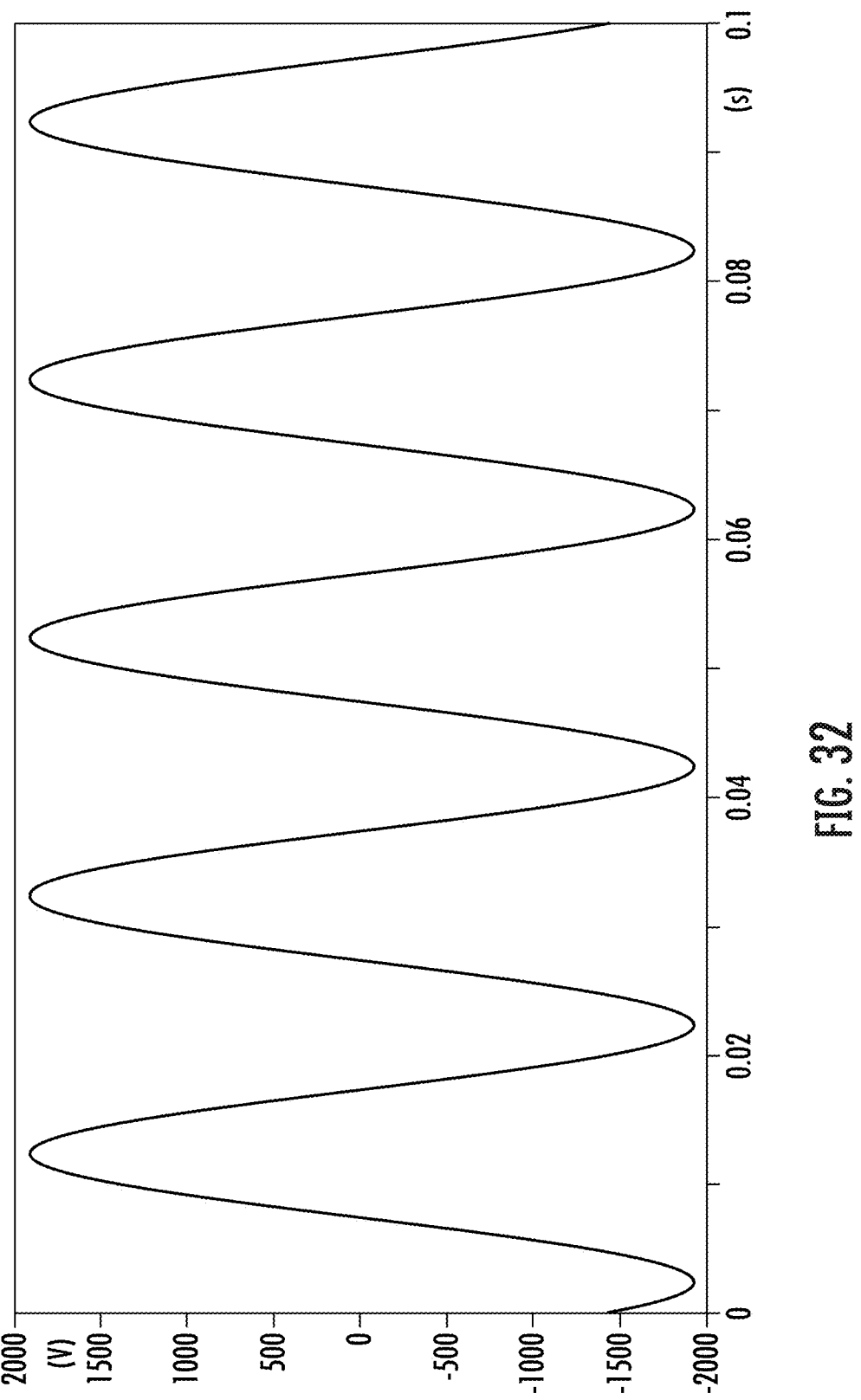
Figure 33:
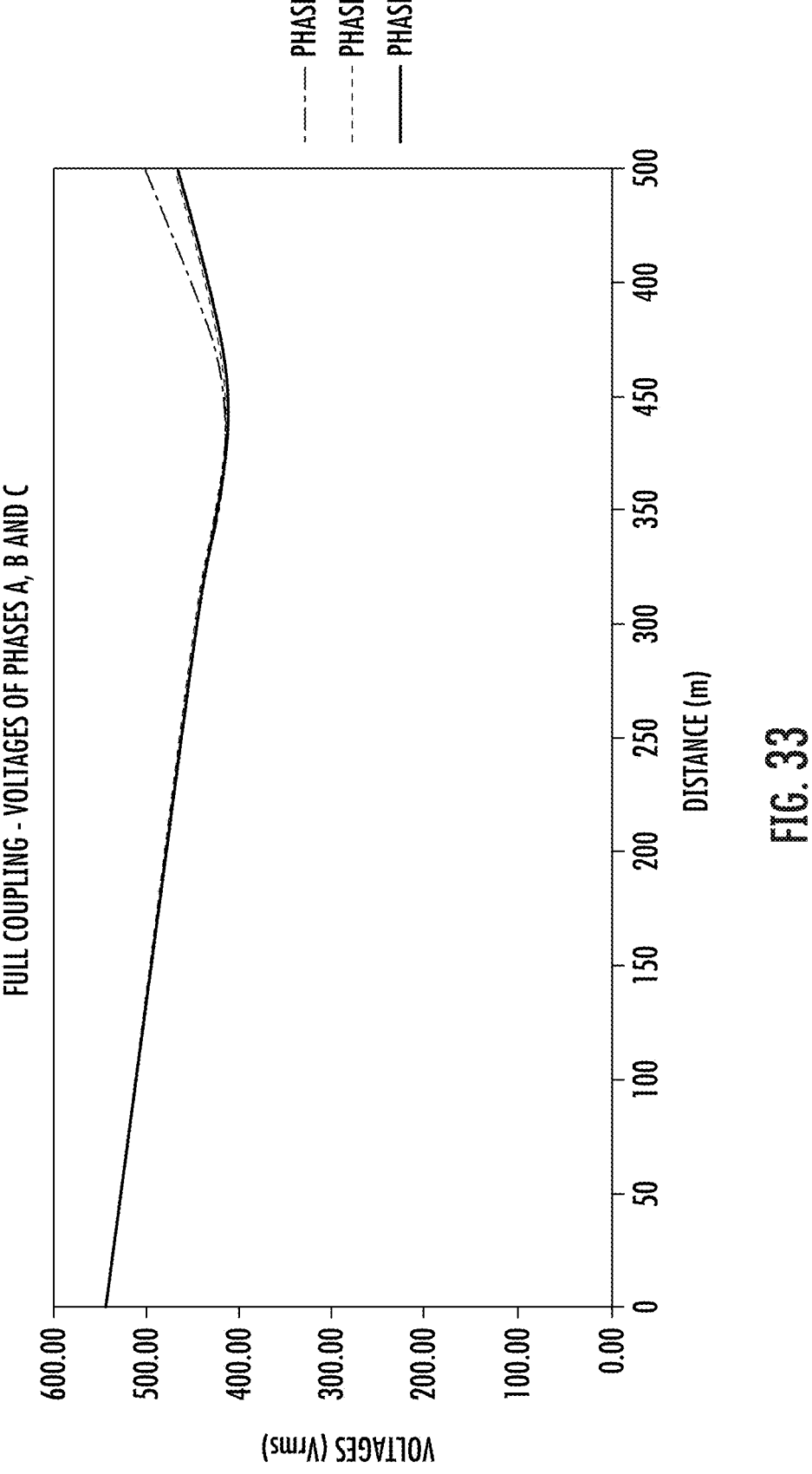
Figure 34:
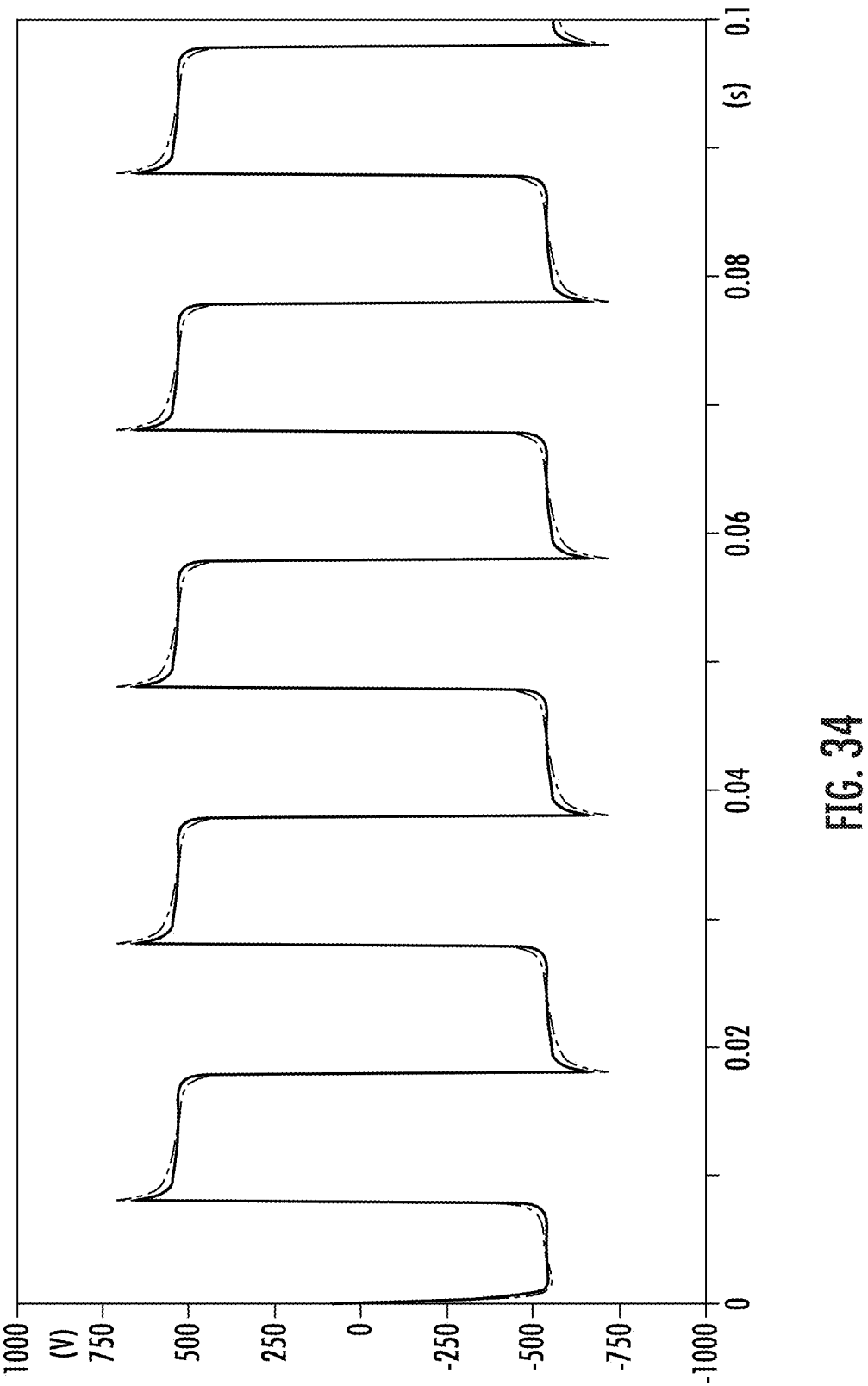

The differences between the two types of SVLs become apparent during faults. FIGS. 31 and 32 illustrate the sheath induced voltages of a traditional SVL and FIGS. 33 and 34 illustrate the sheath induced voltages on an SVL according to some embodiments of the inventive concept. The first fault that is simulated is a single-phase short-circuit of 1.5 kA. The short-circuit takes place at the earthed side. The clamping Voltage on the SVL according to some embodiments of the inventive concept (FIGS. 33 and 34) results in 60% reduced stress on the Jacket As shown in FIGS. 31-34, traditional SVLs do not conduct during the single-phase short-circuit and so a large overvoltage appears. The SVLs according to some embodiments of the inventive concept conduct during the short-circuit event and the overvoltage that appears is limited. The voltage is reduced by 60% (830$V_{rms}$ difference—from 1369$V_{rms}$ to 542$V_{rms}$).

| | Maximum Induced Sheath Voltage [V] |
|---|---|
| Traditional SVL | 1369 |
| SVL according to inventive concept | 542 |

Embodiments of the inventive concept may provide SVLs that are configured to protect cable line sheaths, such as sheaths used on medium voltage cable lines (5 kV-36 kV), from both TOV events, such as lightning strikes, along with power frequency faults, such as short circuits. The sheath induced voltage is influenced by the bonding configuration of the cable line. A special bonding configuration is used to reduce or minimize the induced sheath voltages and circulating currents. The selection of SVLs is done carefully, considering the sheath-induced voltage during steady state. The SVL is designed with a maximum continuous operating voltage that exceeds the steady state voltage to ensure non-conduction during that state. In some embodiments, the SVL is configured to have a residual voltage and MCOV that is less than a minimum induced voltage generated during a power frequency fault, but greater than the nominal operating voltage on the medium voltage cable, which may be, for example, about 5 kV to about 36 kV. During transient overvoltage events such as lightning strikes (TOV events) or single-phase short circuits (power frequency faults), the SVL limits the overvoltage by conducting from the sheath to ground. It effectively clamps the overvoltage, reducing it to the level of the SVL residual voltage. This protective measure is used to safeguard both the cable jacket and the cable accessories from potential damage due to overvoltages.

Furthermore, the SVL serves an additional function by providing a conductive path to ground. In the case of a lightning transient, this grounding path offers protection to the entire length of the cable by preventing or reducing the propagation of travelling waves. The SVL according to embodiments of the inventive concept may have a withstand energy associated therewith. When the energy associated with a TOV event (e.g., lightning strike) or power frequency fault is lower than the withstand energy of the SVL, the SVL device clamps the voltage and recovers. The SVL device can handle a substantial of these events without failing. In some embodiments, the withstand characteristic of each SVL circuit is 33 kA applied in a 10/350 μs profile.

If the energy of the TOV events or faults or the accumulated degradation caused by substantial TOV or fault events surpasses the withstand capability of the SVL device, then the SVL shorts to ground permanently.

While embodiments of the inventive concept have been described herein with respect to MV cable applications, similar cable cross-bonding arrangements may be used in high voltage (HV) cables. A short circuit type SVL with increased dimensions capable of withstanding higher energy can be used to protect HV cabling systems, such as those configured to carry 150 kV, 275 kV, 400 kV, and the like. An SVL designed to operate only above the steady state or nominal voltage may practically critically decrease the jacket insulation due to reduced residual voltage because the maximum continuous operating voltage of the HV SVL will start conducting in any fault, surge or lightning event while it will not conduct during the steady state condition. Typical screen to ground withstand levels such as 20-30 kV, 1.2/50 μs for >100 kVrms HV systems (SVLs for Ur=10-18 kVrms) may result in enhanced jacket insulation requirements, the latter can be reduced by using SVLs with Ur in the range of 100-500 Vrms having residual voltage <3 kVp.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A sheath bonding system, comprising:
a link box comprising:
a plurality of connectors configured to connect the link box with a plurality of transmission cables, each of the plurality of transmission cables including an inner conductor and a conductive sheath surrounding the inner conductor; and
one or more sheath voltage limiter (SVL) circuits configured for connection to the plurality of connectors and an electrical ground, the one or more SVL circuits having a residual voltage that is less than a minimum induced voltage generated during a power frequency fault on one or more of the plurality of conductive sheaths, but greater than a nominal operating voltage on the one or more of the plurality of conductive sheaths.

2. The sheath bonding system of claim 1, wherein the one or more SVL circuits has a maximum continuous operating voltage that is less than the minimum induced voltage generated during the power frequency fault on the one or more of the plurality of transmission cables, but greater than the nominal operating voltage on the one or more of the plurality of transmission cables.

3. The sheath bonding system of claim 2, wherein the maximum continuous operating voltage is about 10% greater than the nominal operating voltage on the one or more of the plurality of conductive sheaths.

4. The sheath bonding system of claim 1, wherein the one or more SVL circuits each has a withstand energy characteristic associated therewith; and
wherein each of the SVL circuits is configured to non-destructively process a power frequency fault or a transient overvoltage event when the power frequency fault or the transient overvoltage event does not exceed the withstand energy characteristic of the respective SVL circuit.

5. The sheath bonding system of claim 4, wherein the withstand characteristic of each of the one or more SVL circuits is 33 kA applied in a 10/350 μs profile.

6. The sheath bonding system of claim 1, wherein the one or more SVL circuits comprises one or more varistors; and
wherein each of the one or more varistors includes a first fail-safe system and a second fail-safe system.

7. The sheath bonding system of claim 6, wherein the first fail-safe system is configured to arc in response to current received through the respective varistor.

8. The sheath bonding system of claim 6, wherein the second fail-safe system is configured to operate in response to heat generated by current received through the respective varistor.

9. The sheath bonding system of claim 1, wherein the plurality of connectors are configured to connect the plurality of conductive sheaths to the one or more SVL circuits in a single point bonding arrangement.

10. A sheath bonding system, comprising:

a plurality of transmission cables, each of the plurality of transmission cables including an inner conductor and a conductive sheath surrounding the inner conductor; and one or more sheath voltage limiter (SVL) circuits configured for connection to the plurality of transmission cables and an electrical ground, the one or more SVL circuits having a residual voltage that is less than a minimum induced voltage generated during a power frequency fault on one or more of the plurality of conductive sheaths, but greater than a nominal operating voltage on the one or more of the plurality of conductive sheaths.

11. The sheath bonding system of claim 10, wherein the one or more SVL circuits has a maximum continuous operating voltage that is less than the minimum induced voltage generated during the power frequency fault on the one or more of the plurality of transmission cables, but greater than the nominal operating voltage on the one or more of the plurality of transmission cables.

12. The sheath bonding system of claim 11, wherein the maximum continuous operating voltage is about 10% greater than the nominal operating voltage on the one or more of the plurality of conductive sheaths.

13. The sheath bonding system of claim 10, wherein the conductive sheaths of the respective ones of the plurality of transmission cables are connected to each other in a cross-connect arrangement.

14. The sheath bonding system of claim 10, wherein the conductive sheaths are connected to the one or more SVL circuits in a single point bonding arrangement.

15. The sheath bonding system of claim 10, wherein the minimum induced voltage generated during a power frequency fault is about 500-1000 volts.

16. The sheath bonding system of claim 15, wherein the residual voltage is in a range of about 80%-90% of the minimum induced voltage generated during the power frequency fault.

17. A power generation system, comprising:

an electrical power source;

a transmission grid;

a plurality of transmission cables configured to couple the electrical power source to the transmission grid, each of the plurality of transmission cables including an inner conductor and a conductive sheath surrounding the inner conductor; and one or more sheath voltage limiter (SVL) circuits configured for connection to the plurality of transmission cables and an electrical ground, the one or more SVL circuits having a residual voltage that is less than a minimum induced voltage generated during a power frequency fault on one or more of the plurality of conductive sheaths, but greater than a nominal operating voltage on the one or more of the plurality of conductive sheaths.

18. The power generation system of claim 17, further comprising:

a medium voltage transformer configured to couple the electrical power source to the plurality of transmission cables; and generator cables that are configured to couple the medium voltage transformer to the electrical power source.

19. The power generation system of claim 18, further comprising:

a medium voltage-to-high voltage transformer configured to couple the plurality of transmission cables to the transmission grid;

wherein the plurality of transmission cables are further configured to couple the medium voltage transformer to the medium voltage-to-high voltage transformer.

20. The power generation system of claim 19, further comprising:

utility cables that are configured to couple the medium voltage-to-high voltage transformer to the transmission grid.

\* \* \* \* \*